(12) United States Patent
Shih et al.

(10) Patent No.: US 6,946,420 B2
(45) Date of Patent: Sep. 20, 2005

(54) COORDINATION CATALYST SYSTEMS EMPLOYING CHROMIUM SUPPORT-AGGLOMERATE AND METHOD OF THEIR PREPARATION

(75) Inventors: Keng-Yu Shih, Columbia, MD (US); Dean Alexander Denton, Baltimore, MD (US); Rimantas Glemza, Baltimore, MD (US)

(73) Assignee: W. R. Grace & Co.-Conn, Columbia, MD (US)

( * ) Notice: Subject to any disclaimer, the term of this patent is extended or adjusted under 35 U.S.C. 154(b) by 238 days.

(21) Appl. No.: 10/120,314

(22) Filed: Apr. 10, 2002

(65) Prior Publication Data

US 2003/0130111 A1 Jul. 10, 2003

Related U.S. Application Data

(60) Provisional application No. 60/287,600, filed on Apr. 30, 2001.

(51) Int. Cl.⁷ .............................................. B01J 31/18
(52) U.S. Cl. ...................... 502/155; 502/103; 502/117; 502/167; 502/120; 502/80; 526/161; 526/172
(58) Field of Search .......................... 526/43, 161, 172; 502/117, 155, 167, 120, 80, 103

(56) References Cited

U.S. PATENT DOCUMENTS

| | | | |
|---|---|---|---|
| 2,825,721 A | 3/1958 | Hogan et al. ............... 260/88.1 |
| 4,131,452 A | 12/1978 | Collin ........................... 75/60 |
| 4,176,090 A | 11/1979 | Vaughan et al. ............. 252/455 |
| 4,216,188 A | 8/1980 | Shabria et al. .............. 423/118 |
| 4,238,364 A | 12/1980 | Shabtai ........................ 252/455 |
| 4,248,739 A | 2/1981 | Vaughan et al. ............. 252/455 |
| 4,271,043 A | 6/1981 | Vaughan et al. ............. 252/455 |
| 4,367,163 A | 1/1983 | Pinnavaia et al. ........... 252/455 |
| 4,375,406 A | 3/1983 | Santilli ........................ 208/251 |
| 4,629,712 A | 12/1986 | Pinnavaia et al. ............. 502/63 |
| 4,637,992 A | 1/1987 | Lewis et al. ................... 502/84 |
| 4,761,391 A | 8/1988 | Occelli ........................... 502/63 |
| 4,859,648 A | 8/1989 | Landis et al. ................ 502/242 |
| 4,981,825 A | 1/1991 | Pinnavaia et al. ............. 502/63 |
| 4,995,964 A | 2/1991 | Gortsema et al. ........... 208/112 |
| 5,064,802 A | 11/1991 | Stevens et al. ............. 502/155 |
| 5,225,500 A | 7/1993 | Elder et al. ................. 526/127 |
| 5,238,892 A | 8/1993 | Chang ........................ 502/111 |
| 5,241,025 A | 8/1993 | Hlatky et al. ............... 526/129 |
| 5,243,002 A | 9/1993 | Razavi ....................... 526/170 |
| 5,250,277 A | 10/1993 | Kresge et al. ............. 423/329.1 |
| 5,308,811 A | 5/1994 | Suga et al. ................... 502/62 |
| 5,321,106 A | 6/1994 | LaPointe .................... 526/126 |
| 5,360,775 A | 11/1994 | Suda et al. ................... 502/84 |
| 5,362,825 A | 11/1994 | Hawley et al. ............. 526/126 |
| 5,395,808 A | 3/1995 | Miller et al. ................... 502/7 |
| 5,399,636 A | 3/1995 | Alt et al. ..................... 526/129 |
| 5,403,799 A | 4/1995 | Miller et al. .................. 502/64 |
| 5,403,809 A | 4/1995 | Miller et al. ................ 502/413 |
| 5,427,991 A | 6/1995 | Turner ........................ 502/103 |
| 5,541,272 A | 7/1996 | Schmid et al. ............. 526/160 |
| 5,569,634 A | 10/1996 | Miller et al. .................. 502/64 |
| 5,624,878 A | 4/1997 | Devore et al. .............. 502/152 |
| 5,633,419 A | 5/1997 | Spencer et al. ............. 585/522 |
| 5,643,847 A | 7/1997 | Walzer, Jr. .................. 502/117 |
| 5,714,424 A | 2/1998 | Warthen et al. ............. 502/105 |
| 5,753,577 A | 5/1998 | Hamura et al. ............. 502/113 |
| 5,807,800 A | 9/1998 | Shamshoum et al. ....... 502/104 |
| 5,807,938 A | 9/1998 | Kaneko et al. ............. 526/160 |
| 5,817,724 A | 10/1998 | Aoki et al. .................. 526/127 |
| 5,830,820 A | 11/1998 | Yano et al. ................... 502/62 |
| 5,866,663 A | 2/1999 | Brookhart et al. .......... 526/170 |
| 5,880,241 A | 3/1999 | Brookhart et al. .......... 526/348 |
| 5,880,323 A | 3/1999 | Brookhart, III et al. .... 585/527 |
| 5,886,224 A | 3/1999 | Brookhart et al. .......... 564/272 |
| 5,891,963 A | 4/1999 | Brookhart et al. ....... 525/326.1 |
| 5,928,982 A | 7/1999 | Suga et al. ................. 502/118 |
| 5,955,555 A | 9/1999 | Bennett ...................... 526/133 |
| 5,973,084 A | 10/1999 | Suga et al. ................. 526/129 |
| 6,110,858 A | 8/2000 | Kaneko et al. ............... 502/62 |
| 6,184,171 B1 | 2/2001 | Shih ........................... 502/158 |
| 6,214,761 B1 * | 4/2001 | Bennett ...................... 502/117 |
| 6,399,535 B1 * | 6/2002 | Shih et al. .................. 502/167 |

FOREIGN PATENT DOCUMENTS

| | | | |
|---|---|---|---|
| DE | 19943936 | 9/1999 | ............ C08F/4/52 |
| EP | 426637 | 5/1991 | .......... C08F/4/603 |
| EP | 426638 | 5/1991 | .......... C08F/4/602 |
| EP | 490226 | 6/1992 | ............. B01J/2/00 |
| EP | 0 546503 | * 6/1993 | |
| EP | 546503 | 5/1996 | .......... C08F/10/00 |
| EP | 849288 | 12/1997 | .......... C08F/10/00 |
| EP | 849292 | 6/1998 | .......... C08F/10/00 |
| EP | 874006 | 10/1998 | .......... C08F/10/00 |
| EP | 881232 | 12/1998 | .......... C08F/4/602 |
| JP | 2-78663 | 3/1990 | ........ C07D/213/53 |
| JP | 10-338516 | 12/1998 | .......... C01B/33/40 |
| JP | 11-292912 | 3/2000 | ............ C08F/4/52 |
| WO | WO 91/14713 | 10/1991 | .......... C08F/4/642 |
| WO | WO 92/00333 | 1/1992 | .......... C08F/10/00 |
| WO | WO 96/23010 | 8/1996 | ......... C08F/210/16 |

(Continued)

OTHER PUBLICATIONS

U.S. Appl. No. 09/431,803, filed Nov. 1, 199, Shih.
U.S. Appl. No. 10/120,289, filed Apr. 10, 2002, Shih et al.
U.S. Appl. No. 10/120,291, filed Apr. 10, 2002, Shih.

(Continued)

Primary Examiner—Ling-Siu Choi
(74) Attorney, Agent, or Firm—Howard Troffkin

(57) ABSTRACT

The present invention is directed to a coordinating catalyst system comprising at least one pre-catalyst selected from late transition metal bidentate or tridentate ligand containing compounds, at least one support-agglomerate having chromium immobilized thereto (e.g., spray dried silica/clay agglomerate), and optionally at least one organometallic compound in controlled amounts, and methods for preparing the same. The resulting catalyst system exhibits enhanced activity for polymerizing olefins and yields polymer products having very good morphology.

42 Claims, No Drawings

FOREIGN PATENT DOCUMENTS

| WO | WO 97/19959 | 10/1996 | ........... C08F/4/603 |
|----|-------------|---------|------------------------|
| WO | WO 97/48743 | 12/1997 | ........... C08F/10/00 |
| WO | WO 98/27124 | 6/1998  | ........... C08F/10/00 |
| WO | WO 98/30612 | 7/1998  | ........... C08F/10/06 |
| WO | WO 99/46302 | 9/1999  | ............ C08F/4/70 |
| WO | WO 99/46303 | 9/1999  | ........... C08F/10/00 |
| WO | WO 99/46304 | 9/1999  | ............ C08F/4/70 |
| WO | WO 00/50475 | 8/2000  | ........... C08F/10/02 |
| WO | WO 01/25149 | * 4/2001 | |
| WO | WO 01/32721 | 5/2001  | ........... C08F/10/00 |
| WO | WO 01/42320 | 6/2001  | ........... C08F/10/00 |
| WO | WO 01/49747 | 7/2001  | ............ C08F/4/02 |

OTHER PUBLICATIONS

U.S. Appl. No. 10/120,310, filed Apr. 10, 2002, Shih et al.
U.S. Appl. No. 10/120,317, filed Apr. 10, 2002, Shih.
U.S. Appl. No. 10/120,331, filed Apr. 10, 2002, Shih.
U.S. Appl. No. 60/287,601, Shih et al., filed Apr. 30, 2001.
U.S. Appl. No. 60/287,602, Shih et al., filed Apr. 30, 2001.
U.S. Appl. No. 60/287,607, Shih et al., filed Apr. 30, 2001.
U.S. Appl. No. 60/287,617, Shih et al., filed Apr. 30, 2001.
George J.P. Britovsek, Vernon C. Gibson, and Duncan F. Wass, Agnew. Chem. Int. Ed 1999, vol. 38, pp 428–447 "The Search for New–Generation Olefin Polymerization Catalysts: Life Beyond Metallocenes".
Pasquale Longo, Fabia Grisi, Antonio Proto, Adolfo Zambelli, "New Ni(II) based catalysts in the polymerization of olefins", Macromol. Rapid Commun. 19, 31–34 (1998).
Lynda K. Johnson, Stefan Mecking, and Maurice Brookhart, "Copolymerization of Ethylene and Propylene with Functionalized Vinyl Monomers by Palladium (II) Catalysts", 1996 American Chemical Society, vol. 118, No. 1, 1996.
Lynda K. Johnson, Christopher M. Killian, and Maurice Brookhart, "New Pd(II)– and Ni(II)–Based Catalysts for Polymerization of Ethylene and a–olefins", Journal American Chemical Society 1995, 177, 6414–6415.
"Novel polymerization reactions catalyzed by homogeneous Pd(II) and Ni(II) a–dimino complexes", CatTech Highlights, Mar. 1997; p. 65–66.
"Move Over Metallocenes", Chemical Week, Apr. 29, 1998, p. 72.
"New Catalysts to Polymerize Olefins", C&EN, Apr. 13, 1998, pp 11–12.
Rip A. Lee, Rene J. Lachicotte, and Guillermo C. Bazan, "Zirconium Complexes of 9–Phenyl–9–borataanthracene. Synthesis, Structural Characterization, and Reactivity", Journal American Chemical Society 1998, 120, 6037–6046.
Brooke L. Small, Maurice Brookhart, and Alison M.A. Bennett, "Highly Active Iron and Cobalt Catalysts for the Polymerization of Ethylene", Journal American Chemical Society 1998, 120, 4049–4050.
John A. Ewen, Robert L. Jones, A. Razavi, "Syndiospecific Propylene Polymerizations with Group 4 Metallocenes", J. Am. Chem. Soc. 1988, 110, 6255–6256.
Thomas J. Pinnavaia "Intercalated Clay Catalysts", Science, Apr. 22, 1983, vol. 220, No. 4595, pp 365–371.
Yoshinori Suga, Eiji Isobe, Toru Suzuki, Kiyotoshi Fujioka, "Novel Clay Mineral–Supported Metallocene Catalysts For Olefin Polymerization," Publication Presentation at MetCon 99: "Polymers in Transition," Jun. 9–10, 1999, Houston, Texas, United States of America.
Nakamura, Yuji et al., "Clay Column Chromatography for Optical Resolution: Partial Resolution of 1,1'–Binaphthol on Optically Active [Co(phen)3–x(am)x]n+–Montmorillonite Columns"; Clay Sci. (1990), 8(1), 17–23, XP000983072, p. 18.

* cited by examiner

COORDINATION CATALYST SYSTEMS EMPLOYING CHROMIUM SUPPORT-AGGLOMERATE AND METHOD OF THEIR PREPARATION

The present invention is made with respect to U.S. provisional application Ser. No. 60/287,600, filed on Apr. 30, 2001.

FIELD OF THE INVENTION

The invention relates to coordination catalyst systems comprising a chromium immobilized support-agglomerate having a coordination catalyst component bonded thereto and methods of their preparation.

BACKGROUND OF THE INVENTION

The present invention is directed to a coordination catalyst composition comprising a bidentate or a tridentate ligand containing transition metal pre-catalyst compound supported on a chromium immobilized support-agglomerate. Further, the present process provides a supported coordination catalyst composite which does not require a conventional cocatalyst compound to provide an active catalyst composition. The absence of such cocatalysts eliminates the need to handle flammable or hazardous compounds.

Coordination catalyst systems, which are usually based on transition metal compounds of Groups 3 to 10 and organo-metallic compounds of Group 13 of the Periodic Table of the Elements, are exceptionally diverse catalysts which are employed in chemical reactions of and with olefinically unsaturated compounds. Such reactions are embodied in processes for the preparation of olefin polymers by coordination polymerization. The preparation of polyethylene of increased density (high-density polyethylene, HDPE) and of polymers and copolymers of ethylene, propylene or other 1-alkenes is of considerable industrial importance.

The prevailing belief regarding the reaction mechanism of coordination catalysts is that a transition metal compound forms a catalytically active center to which the olefinically unsaturated compound bonds by coordination in a first step. Olefin polymerization takes place via coordination of the monomers and a subsequent insertion reaction into a transition metal-carbon or a transition metal-hydrogen bond.

The presence of activator compounds (e.g., borane, borate or alumoxane compounds such as methylalumoxane) in the coordination catalyst systems or during the catalyzed reaction is thought to be necessary in order to activate the catalyst. The chelate compound containing the transition metal atom is typically referred to as a "pre-catalyst." It is generally believed that certain compounds (e.g., MAO) that are known to be capable of causing alkylation of the transition metal atom and subsequent abstraction of hydrocarbyl group to provide an active catalytic site with respect to the pre-catalyst are required to activate the pre-catalyst. Such compounds are typically referred to as "co-catalysts" and are selected from alkyl alumoxanes or certain borane or borate compounds. The combination of a pre-catalyst with a co-catalyst is generally referred to as a "primary catalyst." These co-catalysts have certain drawbacks that have inhibited the use of the resultant complex in commercial applications. The alumoxanes are pyrophoric and require special handling when used. The borane and borate co-catalysts, although easier to handle, are more expensive due to their formation from reagents that are difficult to handle. Because each of the co-catalysts is used in large amounts to form a resultant catalytic complex system, the concerns related to each are substantial.

The best-known industrially used catalyst systems for coordination polymerization are those of the "Ziegler-Natta catalyst" type and the "Phillips catalyst" type. The former comprise the reaction product of a metal alkyl or hydride of elements of the first three main groups of the Periodic Table and a reducible compound of a transition metal element of Groups 4 to 7. The combination used most frequently comprising an aluminum alkyl, such as diethylaluminum chloride, and titanium (IV) chloride. More recent highly active Ziegler-Natta catalysts are systems in which the titanium compound is fixed chemically to the surface of magnesium compounds, such as, in particular, magnesium chloride.

The Phillips Process for ethylene polymerization developed around Phillips catalyst that is composed of chromium oxide on silica as the support. This catalyst was developed by Hogan and Banks and described in U.S. Pat. No. 2,825,721, as well as A. Clark et al. in Ind. Eng. Chem. 48, 1152 (1956). Commercialization of this process provided the first linear polyalkenes and accounts for a large amount of the high-density polyethylene (HDPE) produced today.

More recent developments have focused on single-site catalyst systems. Such systems are characterized by the fact that their metal centers behave alike during polymerization thus making very uniform polymers.

Catalysts are judged to behave in a single-site manner when the polymer they make meets some basic criteria (e.g., narrow molecular weight distribution, or uniform comonomer distribution). Thus, the metal can have any ligand set around it and be classified as "single-site" as long as the polymer that it produces has certain properties. Includable within single-site catalyst systems are metallocene catalysts and constrained geometry catalysts.

A "metallocene" is conventionally understood to mean a metal (e.g., Zr, Ti, Hf, Sc, Y, V or La) complex that is bound to two cyclopentadienyl (Cp) rings, or derivatives thereof, such as indenyl, tetrahydroindenyl, fluorenyl and mixtures. In addition to the two Cp ligands, other groups can be attached to the metal center, most commonly halides and alkyls. The Cp rings can be linked together (so-called "bridged metallocene" structure), as in most polypropylene catalysts, or they can be independent and freely rotating, as in most (but not all) metallocene-based polyethylene catalysts. The defining feature is the presence of two Cp ligands or derivatives.

Metallocene catalysts can be employed either as so-called "neutral metallocenes" in which case an alumoxane, such as methylalumoxane, is used as a co-catalyst, or they can be employed as so-called "cationic metallocenes" which incorporate a stable and loosely bound non-coordinating anion as a counter ion to a cationic metal metallocene center. Cationic metallocenes are disclosed in U.S. Pat. Nos. 5,064,802; 5,225,500; 5,243,002; 5,321,106; 5,427,991; 5,643,847; EP 426 637 and EP 426 638, the disclosures of which are incorporated herein in their entirety by reference.

"Constrained geometry" is a term that refers to a particular class of organometallic complexes in which the metal center is bound by only one modified Cp ring or derivative. The Cp ring is modified by bridging to a heteroatom such as nitrogen, phosphorus, oxygen, or sulfur, and this heteroatom also binds to the metal site. The bridged structure forms a fairly rigid system, thus the term "constrained geometry". By virtue of its open structure, the constrained geometry catalyst can produce resins (having long chain branching) that are not possible with normal metallocene catalysts.

The above-described single site catalyst systems are primarily based on early transition metal $d^0$ complexes useful in coordination polymerization processes. However, these catalysts are known to be oxophilic and, therefore, have low tolerance with respect to even small amounts of oxygenated impurities, such as oxygen, water and oxygenated hydrocarbons. Thus these materials are difficult to handle and use.

More recently, late transitional metal (e.g., Fe, Co, Ni, or Pd) bidentate and tridentate catalyst systems have been developed. Representative disclosures of such late transition metal catalysts are found in U.S. Pat. No. 5,880,241 and its divisional counterparts U.S. Pat. Nos. 5,880,323; 5,866,663; 5,886,224; and 5,891,963, and PCT International Application Nos. PCT/US98/00316; PCT/US97/23556; PCT/GB99/00714; PCT/GB99/00715; and PCT/GB99/00716.

It is commonly believed that both the single site and late transition metal pre-catalysts typically require activation to form a cationic metal center by an organometal Lewis acid (e.g., methyl alumoxane (MAO)) (characterized as operating through a hydrocarbyl abstraction mechanism). Such activators or cocatalysts are pyrophoric (or require pyrophoric reagents to make the same), and are typically employed in quantities which are multiples of the catalyst. Attempts to avoid such disadvantages have led to the development of borane (e.g., trispentaflurophenylborane) and borate (e.g., ammonium tetrakispentaflurophenylborate) activators that are non-pyrophoric but more expensive to manufacture. These factors complicate the development of heterogeneous versions of such catalyst systems in terms of meeting cost and performance targets.

Use of these catalysts and related types in various polymerization processes can give products with sometimes extremely different properties. In the case of olefin polymers, which are generally known to be important as materials, the suitability for particular applications depends, on the one hand, on the nature of the monomers on which they are based and on the choice and ratio of comonomers and the typical physical parameters which characterize the polymer, such as average molecular weight, molecular weight distribution, degree of branching, crosslinking, crystallinity, density, presence of functional groups in the polymer and the like, and on the other hand, on properties resulting from the process, such as content of low molecular weight impurities and presence of catalyst residues, and last but not least on costs.

In addition to realization of the desired product properties, other factors are decisive for evaluating the efficiency of a coordination catalyst system, such as the activity of the catalyst system, that is to say the amount of catalyst required for economic conversion of a given amount of olefin, the product conversion per unit time and the product yield. Catalyst systems such as the Fe or Co catalysts described herein, which exhibit high productivity and high specificity in favor of a low degree of branching of the polymer, are sought for certain applications. Catalyst systems utilizing the Ni and Pd catalysts described herein seek to achieve highly branched polymers with reasonable productivity.

The stability and ease of handling of the catalyst or its components is another factor which affects the choice of commercial embodiments thereof. Practically all known coordination catalysts are extremely sensitive to air and moisture. Coordination catalysts are typically reduced in their activity or irreversibly destroyed by access to (atmospheric) oxygen and/or water. Most Ziegler-Natta and metallocene catalysts, for example, deactivate spontaneously on access to air and become unusable. Most coordination catalysts must therefore typically be protected from air and moisture during preparation, storage and use, which of course makes handling difficult and increases the expenditure required.

A still further factor to be considered is the ability to utilize the coordination catalyst as a heterogeneous catalyst system. The advantages of a heterogeneous catalyst system are more fully realized in a slurry polymerization process. More specifically, slurry polymerizations are often conducted in a reactor wherein monomer, catalysts, and diluent are continuously fed into the reactor. The solid polymer that is produced is not dissolved in the diluent and is allowed to settle out before being periodically withdrawn form the reactor. In this kind of polymerization, factors other than activity and selectivity, which are always present in solution processes, become of paramount importance.

For example, in the slurry process it is desired to have a supported catalyst that produces relatively high bulk density polymer. If the bulk density is too low, the handling of the solid polymer becomes impractical. It is also an advantage to have the polymer formed as uniform, spherical particles that are relatively free of fines. Although fines can have a high bulk density, they also do not settle as well as larger particles and they present additional handling problems with the later processing of the polymer fluff.

Furthermore, slurry polymerization processes differ in other fundamental ways from the typical solution polymerization processes. Solution polymerization is conducted at high reaction temperatures (>130° C.) and pressures (>450 psi) and often results in lower molecular weight polymers. The lower molecular weight is attributed to the rapid chain-termination rates under such reaction conditions. Although lowering the reaction temperature and/or pressure, or changing molecular structure of the catalyst used in a solution process may produce higher molecular weight polymer, it becomes impractical to process the resulting high molecular weight polymers in the downstream equipment due to the high solution viscosity.

In contrast, a slurry reaction process overcomes many of the above disadvantages by simply operating at lower temperature (<110° C.). As a result, a higher molecular weight polymer with a uniform particle size and morphology can be routinely obtained. It is also advantageous to carry out slurry reactions with sufficiently high polymerization efficiencies such that residues from the polymerization catalysts do not have to be removed from the resulting polymers.

The above-discussed advantages of slurry polymerization processes provide incentive for developing coordination catalysts in heterogeneous form. Thus far, gas phase polymerization processes are only practical with a heterogeneous catalyst system.

Finally, evaluation of a coordination catalyst system must include process considerations which influence the morphology (e.g., bulk density) of the resulting polymer, the environmental friendliness of the process, and avoidance of reactor fouling. Thus, there has been a continuing search to develop a coordination catalyst system, preferably a heterogeneous coordination catalyst system, which demonstrates high catalyst activity, is free of reactor fouling, produces polymer products having good morphology while simultaneously being very process friendly (e.g., easy to make) and inexpensive to make. Further, it is highly desired to have a coordination catalyst system which does not require the addition of a co-catalyst component, especially those conventionally used which are difficult, and even dangerous to handle.

There has also been a particular need to discover compounds that are less sensitive to deactivation and/or less hazardous and still suitable as activating components in coordination catalyst systems. The present invention was developed in response to these needs.

Others have made various efforts in this area as shown by the references discussed herein below.

International application No. PCT/US97/11953 (International Publication No. WO 97/48743) is directed to frangible, spray dried agglomerate catalyst supports of silica gel, which possess a controlled morphology of microspheroidal shape, rough scabrous appearance, and interstitial void spaces which penetrate the agglomerate surface and are of substantially uniform size and distribution. The agglomerates also possess a 1–250 micron particle size, 1–1000 $m^2/g$ surface area, and an Attrition Quality Index (AQI) of at least 10. The agglomerates are derived from a mixture of dry milled inorganic oxide particles, e.g., silica gel and optionally but preferably wet milled inorganic oxide particles, e.g., silica gel particles (which preferably contain a colloidal particles of less than 1 micron particle size), slurried in water for spray drying. The high AQI assures that the agglomerates are frangible and that the polymerization performance is improved. The controlled morphology is believed to permit the constituent particles of the agglomerates to be more uniformly impregnated or coated with conventional olefin polymerization catalysts. Clay is not disclosed as suitable metal oxide.

U.S. Pat. No. 5,633,419 discloses the use of spray dried silica gel agglomerates as supports for Ziegler-Natta catalyst systems.

U.S. Pat. No. 5,395,808 discloses bodies made by preparing a mixture of ultimate particles of bound clay, with one or more optional ingredients such as inorganic binders, extrusion or forming aids, burnout agents or forming liquid, such as water. Preferably, the ultimate particles are formed by spray drying. Suitable binders include silica when Kaolin clay is used as the inorganic oxide. The bodies are made from the ultimate particles and useful methods for forming the bodies include extrusion, pelletization, balling, and granulating. Porosity is introduced into the bodies during their assembly from the ultimate particles, and results primarily from spaces between the starting particles. The porous bodies are disclosed to be useful as catalyst supports. See also U.S. Pat. Nos. 5,569,634; 5,403,799; and 5,403,809; and EP 490 226 for similar disclosures.

U.S. Pat. No. 5,362,825 discloses olefin polymerization catalysts produced by contacting a pillared clay with a Ziegler-Natta catalyst, i.e., a soluble complex produced from the mixture of a metal dihalide with at least one transition metal compound in the presence of a liquid diluent. The resulting mixture is in turn contacted with an organoaluminum halide to produce the catalyst.

U.S. Pat. No. 5,807,800 is directed to a supported metallocene catalyst comprising a particulate catalyst support, such as a molecular sieve zeolite, and a stereospecific metallocene, supported on the particulate support and incorporating a metallocene ligand structure having two sterically dissimilar cyclopentadienyl ring structures coordinated with a central transition metal atom. At column 4 of the background discussion, it is disclosed that cationic metallocenes that incorporate a stable non-coordinating anion normally do not require the use of alumoxane.

U.S. Pat. No. 5,238,892 discloses the use of undehydrated silica as a support for metallocene and trialkylaluminum compounds.

U.S. Pat. No. 5,308,811 discloses an olefin polymerization catalyst obtained by contacting (a) a metallocene-type transition metal compound, (b) at least one member selected from the group consisting of clay, clay minerals, ion exchanging layered compounds, diatomaceous earth, silicates and zeolites, and (c) an organoaluminum compound. Component (b) may be subjected to chemical treatment, which, for example, utilizes ion exchangeability to substitute interlaminar exchangeable ions of the clay with other large bulky ions to obtain a layered substance having the interlaminar distance enlarged. Such bulky ions play the role of pillars, supporting the layered structure, and are therefore called pillars. Guest compounds, which can be intercalated, include cationic inorganic compounds derived from such materials as titanium tetrachloride and zirconium tetrachloride. $SiO_2$ may be present during such intercalation of guest compounds. The preferred clay is montmorillonite. Silica gel is not disclosed as a suitable component (b).

U.S. Pat. No. 5,714,424 discloses a method of forming a polyolefin composite catalyst particle comprising two or more distinct supported catalyst components in a single catalyst particle in order to polymerize a polyolefin having two or more melt indices. The catalyst types are selected from chrome-silica, Ziegler-Natta and metallocene catalysts. The catalyst components can be sized by co-milling and the particles isolated from a solvent preparation step by spray drying. The inventors describe multiple catalyst components but do not disclose an agglomerated support or such a support including an integrated ion containing layered material having Lewis acidity for activating the catalyst components. In fact, it is stated that the composition of the invention of the reference "does not depend in any manner on the pore structure of the support. The only requirement is that the individual (catalyst) components have different melt index potentials . . . and that have approximately the same activity." (Column 3, lines 30–35). The supports used in the examples were prepared using one or more of washed filter cake silica; dried, coarse milled and washed silica hydrogel; and dried, sized and calcined silica/titania cogel.

U.S. Pat. No. 5,753,577 discloses a polymerization catalyst comprising a metallocene compound, a co-catalyst such as proton acids, ionized compounds, Lewis acids and Lewis acidic compounds, as well as clay mineral. The clay can be modified by treatment with acid or alkali to remove impurities from the mineral and possibly to elute part of the metallic cations from the crystalline structure of the clay. Examples of acids which can effect such modification include Bronsted acids such as hydrochloric, sulfuric, nitric and acetic acids. The preferred modification of the clay is accomplished by exchanging metallic ions originally present in the clay with specific organic cations such as aliphatic ammonium cations, oxonium ions, and onium compounds such as aliphatic amine hydrochloride salts. Such polymerization catalysts may optionally be supported by fine particles of $SiO_2$, $Al_2O_3$, $ZrO_2$, $B_2O_3$, $CaO$, $ZnO$, $MgCl_2$, $CaCl_2$, and mixtures thereof. (Col. 3, line 48; Col. 21, line 10 et seq.). The fine particle support may be of any shape preferably having a particle size in the range of 5–200 microns, and pore size ranges of from 20–100 Å. Use of metal oxide support is not described in the examples.

U.S. Pat. No. 5,399,636 discloses a composition comprising a bridged metallocene which is chemically bonded to an inorganic moiety such as clay or silica. Silica is illustrated in the working examples as a suitable support, but not clay.

EP 849 292 discloses an olefin polymerization catalyst consisting essentially of a metallocene compound, a modified clay compound, and an organoaluminum compound.

The modification of the clay is accomplished by reaction with specific amine salts such as a proton acid salt obtained by the reaction of an amine with a proton acid (hydrochloric acid). The specifically disclosed proton acid amine salt is hexylamine hydrochloride. The modification of the clay results in exchange of the ammonium cation component of the proton acid amine salt with the cations originally present in the clay to form the mineral/organic ion complex.

U.S. Pat. No. 5,807,938 discloses an olefin polymerization catalyst obtained by contacting a metallocene compound, an organometallic compound, and a solid catalyst component comprising a carrier and an ionized ionic compound capable of forming a stable anion on reaction with the metallocene compound. Suitable carriers disclosed include inorganic compounds or organic polymeric compounds. The inorganic compounds include inorganic oxides, such as alumina, silica, silica-alumina, silica magnesia; clay minerals; and inorganic halides. The ionized ionic compound contains an anionic component and a cationic component. The cationic component preferably comprises a Lewis Base functional group containing an element of the Group 15 or 16 of the Periodic Table such as ammonium, oxionium, sulfonium, and phosphonium, cations. The cation component may also contain a functional group other than Lewis Base function groups, such as carbonium, tropinium, and a metal cation. The anion component includes those containing a boron, aluminum, phosphorous or antimony atom, such as an organoboron, organoaluminum, organophosphorous, and organoantimony anions. The cationic component is fixed on the surface of the carrier. Only silica or chlorinated silica are employed in the working examples as a carrier. In many examples, the silica surface is modified with a silane.

U.S. Pat. No. 5,830,820 discloses an olefin polymerization catalyst comprising a modified clay mineral, a metallocene compound, and an organoaluminum compound. The clay mineral is modified with a compound capable of introducing a cation into the layer interspaces of the clay mineral. Suitable cations which are inserted into the clay include those having a proton, namely, Bronsted acids such trimethylammonium, as well as carbonium ions, oxonium ions, and sulfonium ions. Representative anions include chlorine ion, bromide ion, and iodide ion.

EP 881 232 is similar to U.S. Pat. No. 5,830,820, except that the average particle size of the clay is disclosed as being less than 10 microns.

EP 849 288 discloses an olefin polymerization catalyst consisting essentially of a metallocene compound, an organoaluminum compound, and a modified clay compound. The clay is modified by contact with a proton acid salt of certain specific amine compounds, such as hexylamine chloride.

JP Kokai Patent HEI 10-338516 discloses a method for producing a metallic oxide intercalated in a clay mineral which comprises swelling and diluting the clay mineral, having a laminar structure, with water to form a sol; adding an organometallic compound to an aqueous solution containing organic acid to form a sol that contains the metallic compound; mixing the swelling clay mineral sol with the metallic compound containing sol and agitating to intercalate the metallic compound between the layers in the swollen clay mineral; and washing, dehydrating, drying and roasting the clay mineral that has the metallic compound intercalated therein. Suitable metallic oxides include those of titanium, zinc, iron, and tin.

U.S. Pat. No. 4,981,825 is directed to a dried solid composition comprising clay particles and inorganic metal oxide particles substantially segregated from the clay particles. More specifically, the metal oxide particles are sol particles which tend to fuse upon sintering. Consequently, by segregating the sol particles with smectite-type clay particles, fusion of the sol particles is reduced under sintering conditions thereby preventing a loss of surface area. The preferred metal oxide is colloidal silica having an average particle size between 40 and 800 angstroms (0.004 and 0.08 microns), preferably 40 and 80 angstroms. The ratio of the metal oxide to clay is between about 1:1 to 20:1, preferably 4:1 to 10:1. The end product is described at Column 3, line 50 et seq. as sol particle-clay composites in which the clay platelets inhibit aggregation of the sol particles. Such products are made up entirely of irregular sol-clay networks in which the clay platelets are placed between the sol particles. The result is a composite with very high surface area, and ability to retain such high surface area at elevated temperatures. This arrangement is also distinguished from intercalation of the clay by the silica. The subject compositions are disclosed in the abstract to be useful for catalytic gaseous reactions and removal of impurities from gas streams. Specific catalysts systems are not disclosed.

U.S. Pat. No. 4,761,391 discloses delaminated clays whose x-ray defraction patterns do not contain a distinct first order reflection. Such clays are made by reacting synthetic or natural swelling clays with a pillaring agent selected from the group consisting of polyoxymetal cations, mixtures of polyoxymetal cations, colloidal particles comprising alumina, silica, titania, chromia, tin oxide, antimony oxide or mixtures thereof, and cationic metal clusters comprising nickel, molybdenum, cobalt, or tungsten. The resulting reaction product is dried in a gaseous medium, preferable by spray drying. The resulting acidic delaminated clays may be used as the active component of cracking and hydroprocessing catalysts. The ratio of clay to pillaring agent is disclosed to be between about 0.1 and about 10. To obtain the delaminated clay, a suspension of swelling clay, having the proper morphology, e.g., colloidal particle size, is mixed with a solution or a suspension of the pillaring agent at the aforedescribed ratios. As the reactants are mixed, the platelets of clay rapidly sorb the pillaring agent producing a flocculated mass comprised of randomly oriented pillared platelet aggregates. The flocculated reaction product or gel is then separated from any remaining liquid by techniques such as centrifugation filtration and the like. The gel is then washed in warm water to remove excess reactants and then preferably spray dried. The pillaring agent upon heating is converted to metal oxide clusters which prop apart the platelets of the clay and impart the acidity which is responsible for the catalytic activity of the resultant delaminated clay. The x-ray defraction pattern of such materials contains no distinct first order of reflection which is indicative of platelets randomly oriented in the sense that, in addition to face-to-face linkages of platelets, there are also face-to-edge and edge-to-edge linkages. The utilities described at Column 8, Lines 55 et seq. include use as components of catalyst, particularly hydrocarbon conversion catalysts, and most preferably as components of cracking and hydrocracking catalysts. This stems from the fact that the because the clay contains macropores as well as micropores, large molecules that normally cannot enter the pores of zeolites will have access to the acid sites in the delaminated clays making such materials more efficient in cracking of high molecular weight hydrocarbon constituents. (See also U.S. Pat. No. 5,360,775.)

U.S. Pat. No. 4,375,406 discloses compositions containing fibrous clays and precalcined oxides prepared by forming a fluid suspension of the clay with the precalcined oxide particles, agitating the suspension to form a co-dispersion, and shaping and drying the co-dispersion. Suitable fibrous clays include aluminosilicates, magnesium silicates, and aluminomagnesium silicates. Examples of suitable fibrous clays are attapulgite, playgorskite, sepiolite, haloysite, endellite, chrysotile asbestos, and imogolite. Suitable oxides include silica. The ratio of fibrous clay to precalcined oxide is disclosed to vary from 20:1 to 1:5 by weight.

WO 0125149 A2 discloses a composition comprising an acid treated cation exchanging layered substrate material dispersed in silica gel as a support for a metallocene polymerization catalyst. Acidification is accomplished using a Bronsted acid such as sulfuric acid or an acidified amine, e.g., ammonium sulfate in a mixture with alkaline metal silicate such that the latter precipitates as silica hydrogel. The resulting slurry is dried, e.g., spray dried, and contacted with a metallocene catalyst. Preferably the layered silicate material is fully acid exchanged.

WO 0149747A1 discloses a supported catalyst composition comprising an organoaluminum compound, an organometal compound and an oxide matrix support wherein the latter is a mixture of an oxide precursor compound such as a silica source and a substantially decomposed (exfoliated) layered mineral such as a clay. Decomposition of the clay is achieved, for example, by solvent digestion in a strong acidic and basic medium at elevated temperatures combined with high energy or high shear mixing to product a colloidal suspension. Decomposition (exfoliation) converts the material to its residual mineral components and is said to be complete when the layered mineral no longer has its original layered structure.

WO 0142320 discloses a clay or expanded clay useful as a polymerization catalyst support. The support comprises the reaction product of the clay or expanded clay with an organometallic, or organometalloid, compound in order to reduce, cap or remove residual hydroxyl or other polar functionality of the clay and replace such groups with the organometallic compound. An organometallic or organometalloid derivative is bound to the support through the support oxygen or other polar functionality. Prior to reaction with the organometallic compound, the clay can be ion exchanged to replace at least a portion of alkali or alkali earth metal cations, e.g. sodium or magnesium, originally present in the clay. The chemically modified clay may be calcined either before or after treatment with the organometallic compound; prior treatment is preferred. The organometallic or organometalloid compound contains Mg, Zn or boron, preferably Zn, and the organic group preferably is a $C_1$–$C_{10}$ alkyl.

Additional patents, which disclose intercalated clays, are U.S. Pat. Nos. 4,629,712 and 4,637,992. Additional patents, which disclose pillared clays, include U.S. Pat. Nos. 4,995,964 and 5,250,277.

A paper presented at the MetCon '99 Polymers in Transition Conference in Houston, Tex., on Jun. 9–10, 1999, entitled "Novel Clay Mineral-Supported Metallocene Catalysts for Olefin Polymerization" by Yoshinor Suga, Eiji Isobe, Toru Suzuki, Kiyotoshi Fujioka, Takashi Fujita, Yoshiyuki Ishihama, Takehiro Sagae, Shigeo Go, and Yumito Uehara discloses olefin polymerization catalysts comprising metallocene compounds supported on dehydrated clay minerals optionally in the presence of organoaluminum compounds. At page 5 it is disclosed that catalysts prepared with fine clay mineral particles have had operational difficulties such as fouling which make them unsuitable for slurry and gas phase processes. Thus, a granulation method was developed to give the clay minerals a uniform spherical shape. The method for producing this spherical shape is not disclosed.

PCT International Application No. PCT/US96/17140, corresponding to U.S. Ser. No. 562,922, discloses a support for metallocene olefin polymerizations comprising the reaction product of an inorganic oxide comprising a solid matrix having reactive hydroxyl groups or reactive silane functionalized derivatives of hydroxyl groups on the surface thereof, and an activator compound. The activator compound comprises a cation which is capable of reacting with the metallocene compound to form a catalytically active transition metal complex and a compatible anion containing at least one substituent able to react with the inorganic oxide matrix through residual hydroxyl functionalities or through the reactive silane moiety on the surface thereof. The representative example of a suitable anion activator is tris(pentafluorophenyl)(4-hydroxyphenyl)borate. Suitable inorganic oxides disclosed include silica, alumina, and aluminosilicates.

U.S. Pat. No. 5,880,241 discloses various late transition metal bidentate catalyst compositions. At column 52, lines 18 et seq., it is disclosed that the catalyst can be heterogenized through a variety of means including the use of heterogeneous inorganic materials as non-coordinating counter ions. Suitable inorganic materials disclosed include aluminas, silicas, silica/aluminas, cordierites, clays, and $MgCl_2$ but mixtures are not disclosed. Spray drying the catalyst with its associated non-coordinating anion onto a polymeric support is also contemplated. Examples 433 and 434 employ montmorillonite clay as a support but polymer morphology is not disclosed for these examples.

PCT International Application No. PCT/US97/23556 discloses a process for polymerizing ethylene by contact with Fe or Co tridentate ionic complex formed either through alkylation or abstraction of the metal alkyl by a strong Lewis acid compound, e.g., MAO, or by alkylation with a weak Lewis acid, e.g., triethylaluminum and, subsequent abstraction of the resulting alkyl group on the metal center with a stronger Lewis acid, e.g., $B(C_6F_5)_3$. The Fe or Co tridentate compound may be supported by silica or alumina and activated with a Lewis or Bronsted acid such as an alkyl aluminum compound (pg. 19, line 1 et seq.). Acidic clay (e.g., montmorillonite) may function as the support and replace the Lewis or Bronsted acid. Examples 43–45 use silica supported MAO, and Example 56 employs dehydrated silica as a support for the Co complex. Polymer morphology is not discussed.

PCT International Application No. PCT/US98/00316 discloses a process for polymerizing propylene using catalysts similar to the above discussed PCT-23556 application.

U.S. Ser. No. 09/166,545, filed Oct. 5, 1998, by Keng-Yu Shih, an inventor of the present application, discloses a supported late transition metal bidentate or tridentate catalyst system containing anion and cation components wherein the anion component contains boron, aluminum, gallium, indium, tellurium and mixtures thereof covalently bonded to an inorganic support (e.g. $SiO_2$) through silane derived intermediates such as a silica-tethered anilinium borate.

U.S. Ser. No. 09/431,803, filed on Nov. 1, 1999 by Keng-Yu Shih discloses the use of silica agglomerates as a support for transition metal catalyst systems employing specifically controlled (e.g., very low) amounts of non-abstracting aluminum alkyl activators.

U.S. Ser. No. 09/431,771, filed on Nov. 1, 1999 by Keng-Yu Shih et al. discloses a coordination catalyst system comprising a bidentate or tridentate pre-catalyst transition metal compound, at least one support-agglomerate, e.g., spray dried silica/clay agglomerate, and optionally an organometallic compound and methods for their preparation.

U.S. Ser. No. 09/432,008, filed on Nov. 1, 1999 by Keng-Yu Shih et al. discloses a coordination catalyst system comprising a metallocene or constrained geometry pre-catalyst transition metal compound, at least one support-agglomerate, e.g., spray dried silica/clay agglomerate, and optionally an organometallic compound and methods for their preparation.

In addition, the following applications are known to the present inventors:

U.S. application Ser. No. 60/287,601, filed on Apr. 30, 2001 discloses a catalyst composition composed of a support-agglomerate comprising (A) at least one inorganic oxide component, and (B) at least one ion-containing layered component, and the support-agglomerate has chromium atoms immobilized thereto.

U.S. application Ser. No. 60/287,607, filed on Apr. 30, 2001 discloses a process for forming a catalyst composition comprising substantially simultaneously contacting at least one bidentate ligand forming compound or at least one tridentate ligand forming compound or mixtures thereof with a transition metal compound and with a support-agglomerate comprising (A) at least one inorganic oxide component, and (B) at least one ion-containing layered component. The reference further is directed to the resultant catalyst composition for which the support-agglomerate functions as the activator.

U.S. application Ser. No. 60/287,602, filed on Apr. 30, 2001 discloses a catalyst composition composed of a support-agglomerate comprising (A) at least one inorganic oxide component, and (B) at least one ion-containing layered component. The agglomerate provides a support for a combination of catalysts comprising at least one metallocene catalyst and at least one coordination catalyst of a bidentate or tridentate pre-catalyst transition metal compound. The support-agglomerate functions as an activator for the catalyst system.

U.S. application Ser. No. 60/287,617, filed on Apr. 30, 2001 discloses a catalyst composition formed by substantially simultaneously contacting at least one bidentate ligand forming compound or at least one tridentate ligand forming compound or mixtures thereof with a transition metal compound and with a support-agglomerate comprising (A) at least one inorganic oxide component, and (B) at least one ion-containing layered component, and the support-agglomerate has chromium atoms immobilized thereto. The reference is further directed to the resultant catalyst composition for which the support-agglomerate functions as the activator for the catalyst system.

In addition, the following U.S. patent application having Ser. No. 10/120,289; Ser. No. 10/120,291; Ser. No. 10/120,317; Ser. No. 10/120,331; Ser. No. 10/120,310 are concurrently filed with the subject application. The teachings of each of the above provisional and concurrently filed applications are incorporated herein in its entirety by reference.

Thus, there has been a continuing search to develop catalyst systems that demonstrate high catalyst activity, are readily formed in an inexpensive and efficient manner, does not require the use of costly and difficult to handle co-catalyst agents, and allows the polymerization process to be conducted as a cost effective one-step polymerization reaction.

SUMMARY OF THE INVENTION

The present composition provides for a catalyst system that can be used to produce polymers having bimodal molecular weight distribution.

Accordingly, in one aspect of the invention there is provided a heterogeneous polymerization catalyst system that comprises a transition metal coordination pre-catalyst supported by a chromium immobilized support-agglomerate. The catalyst system comprises:

I. as a pre-catalyst, at least one non-metallocene, non-constrained geometry, bidentate ligand containing transition metal compound or tridentate ligand containing transition metal compound or mixtures thereof capable of (A) being activated upon contact with the chromium immobilized support-agglomerate, or (B) being converted, upon contact with an organometallic compound, to an intermediate capable of being activated upon contact with the chromium oxide support-agglomerate, wherein the transition metal is at least one member selected from Groups 3 to 10 of the Periodic Table; in intimate contact with II. chromium immobilized support-agglomerate comprising a composite of
(A) at least one inorganic oxide component, wherein said component is selected from $SiO_2$, $Al_2O_3$, MgO, $AlPO_4$, $TiO_2$, $ZrO_2$, or mixed oxides thereof including $SiO_2.Al_2O_3$, $MgO.SiO_2$, $MgO.SiO_2.Al_2O_3$, $SiO_2.TiO_2$, $SiO_2.TiO_2.Al_2O_3$, $SiO_2.Cr_2O_3.Al_2O_3$ and $SiO_2.Cr_2O_3.TiO_2$, and mixtures thereof; and
(B) at least one ion containing layered material, wherein said layered material has interspaces between the layers and sufficient Lewis acidity, when present within the support-agglomerate, to activate the pre-catalyst when the pre-catalyst is in contact with the support-agglomerate. The layered material has a cationic component and an anionic component, wherein said cationic component is present within the interspace of the layered material, said layered material being intimately dispersed with said inorganic oxide component within the agglomerate in an amount sufficient to provide good catalytic activity of the resultant coordinating catalyst system for the polymerization of ethylene monomer, expressed as g polyethylene/g of catalyst/hour. The support-agglomerate further has chromium atoms immobilized to the support-agglomerate (e.g., covalently bonded to oxygen atoms attached to Si atoms of the support-agglomerate).

The amount of the pre-catalyst (I) and chromium immobilized support-agglomerate (II) which are in intimate contact is sufficient to provide a ratio of micromoles of pre-catalyst to grams of support-agglomerate of from about 5:1 to about 500:1.

In another aspect of the present invention, there is provided a process for making the above catalyst system which comprises:

1. forming a support-agglomerate composite capable of activating pre-catalysts by agglomerating
(A) at least one inorganic oxide component wherein said component is selected from $SiO_2$, $Al_2O_3$, MgO, $AlPO_4$, $TiO_2$, $ZrO_2$, or mixed oxides thereof including $SiO_2.Al_2O_3$, $MgO.SiO_2$, $MgO.SiO_2.Al_2O_3$, $SiO_2.TiO_2$, $SiO_2.TiO_2.Al_2O_3$, $SiO_2.Cr_2O_3.Al_2O_3$ and $SiO_2.Cr_2O_3.TiO_2$; and mixtures thereof with (B) at least one ion containing layered material, wherein said layered material has interspaces between the layers and sufficient Lewis acidity, when present within the support-agglomerate, to activate the transition metal of the pre-catalyst compound when its i sin contact with the support-agglomerate. The layered material has a cationic component and an anionic component, wherein said cationic component is present within the interspace of the layered material, said layered material being intimately dispersed with said inorganic oxide component within said agglomerate in an amount sufficient to provide good catalytic activity of a resultant coordinating catalyst system for the polymerization of ethylene monomer, expressed as grams polyethylene per gram of catalyst per hour; and (C) contacting in a liquid media, the support-agglomerate component (A) or Component (B) or mixtures of Components (A) and (B) before, during or after agglomerate formation with a chromium compound having at least partial solubility in the liquid media;

2. subjecting the chromium treated support-agglomerate to oxidation at elevated temperatures to cause the chromium be oxidized to a higher oxidation state (e.g. +3, +4 or +6, preferably +3 or +4);

3. providing, as a pre-catalyst, at least one non-metallocene, non-constrained geometry pre-catalyst transition metal compound selected from bidentate ligand containing transition metal compounds, tridentate ligand containing transition metal compounds or mixtures thereof, capable of (A) being activated upon contact with the chromium immobilized support-agglomerate, or (B) being converted, upon contact with an organometallic compound, to an intermediate capable of being activated upon contact with the chromium immobilized support-agglomerate, wherein the transition metal is at least one member selected from Groups 3 to 10 of the Periodic Table;

4. contacting in an inert liquid hydrocarbon the chromium immobilized support-agglomerate and pre-catalyst in a ratio of micromoles of pre-catalyst to grams of chromium immobilized support-agglomerate of from about 5:1 to about 500:1, to cause absorption and/or adsorption of the pre-catalyst by the support-agglomerate.

DESCRIPTION OF PREFERRED EMBODIMENTS

The present invention employs a non-metallocene, non-constrained geometry late transition metal bidentate or tridentate ligand containing compound as a pre-catalyst which can be activated by contact with a chromium immobilized support-agglomerate and, optionally, an organometallic compound, as described hereinafter.

The term "immobilized" as used herein and in the appended claims with reference to the incorporation of chromium atoms as part of the subject support-agglomerate refers to physical or chemical adsorption (adhesion to the surface of the support-agglomerate) and/or absorption (penetration into the inner structure of the support-agglomerate), preferably by chemadsorption and/or chemabsorption of the chromium atoms generated from the chromium atom containing precursor, as described below, on and/or into the support-agglomerate. Without wishing to be bound to any particular theory, it is believed that the chromium atom forms a bond with the surface atoms of the support-agglomerate. The structure of such bonds may be ionic, dative and/or covalent bonds. For example, the chromium atom may be covalently bonded to oxygen atoms at the surface of the particles of support-agglomerate and/or as part of the interior of such particles. Such immobilization may take place by formation of a solution or suspension of the subject support-agglomerate and a chromium atom containing precursor species followed by reaction of the precursor species with residual hydroxyl groups contained in the support-agglomerate, such as associated with the inorganic oxide Component (A) of the support-agglomerate.

The present invention, although not meant to be limited by the following observations, relys on the discovery that certain support-agglomerate composite particles of (A) at least one inorganic oxide (e.g., silica) and (B) at least one ion exchanging layered compound (e.g., clay) that further has chromium atoms immobilized thereto, are believed to possess enhanced Lewis acidity dispersion and accessibility which renders them extremely proficient support-agglomerates for certain non-metallocene and non-constrained geometry bi- and tridentate transition metal compound pre-catalysts. More specifically, it is believed that the chromium immobilized support-agglomerate particles incorporate the ionizable clay particles in such a way that their known Lewis acidity is more uniformly dispersed throughout the particle while simultaneously being made more accessible for interaction with the presently described pre-catalyst. It is believed that this permits the chromium immobilized support-agglomerate to effectively activate, e.g., ionize, the pre-catalyst when in a pre-activated (e.g., ionizable) state as well as support the active catalyst during polymerization. This eliminates the need to use additional ionizing agents, such as borane or borate or MAO activators, which are expensive, and introduce added complexity to the system. In contrast, the present chromium immobilized support-agglomerate can be formed in an inexpensive manner. This further reduces the catalyst system costs, and eliminates the need for expensive MAO or borate activators of the prior art while simultaneously achieving extremely high activity.

A still further aspect of the discovery of the present invention is that the chromium immobilized support-agglomerate apparently also immobilizes the pre-catalyst by adsorption and/or absorption, preferably by chemadsorption and/or chemabsorption from a slurry of the same without any special impregnation steps, which slurry can actually be used directly for the slurry polymerization of unsaturated monomers, e.g. olefins. The resulting polymer morphology is indicative of a heterogeneous polymerization which is consistent with the observation (based on x-ray powder diffraction, cross-section microprobe elemental analysis and the color induced in the support-agglomerate) that the chromium immobilized support-agglomerate is readily impregnated by the pre-catalyst such that it is believed to react with the same. Moreover, the microspheroidal morphology of the catalyst system coupled with the immobilization of the active catalyst therein is believed to contribute to the extremely desirable observed polymer morphology because it prevents reactor fouling, eliminates polymer fines and results in the production of polymers that exhibit a high bulk density. The catalyst system can be employed as a slurry or dry powder.

A still even further aspect of the discovery of the present invention is the functional interrelationship which exists between the inorganic oxide, the layered material, the presence of chromium (probably bonded to oxygen atoms of either the (A) or (B) or both components forming the support-agglomerate), and the calcination temperature on the one hand, and the catalyst activity on the other hand, such that these variables can be controlled to exceed the activity of the same pre-catalyst supported and/or activated by the inorganic oxide alone, or the layered material (e.g., clay) alone, while simultaneously producing good polymer morphology.

An activated transition metal compound is one (a) in which the central transition metal atom, such as that represented by Z in the following formulas, is changed, such as by transforming into a state of full or partial positive charge, that is, the transition metal compound becomes a cation or cation-like, in its association with a stable anion or anion-like moiety and (b) that is capable of catalyzing the polymerization of olefins under polymerization conditions.

More specifically, the transition metal pre-catalyst can be at least one bidentate ligand containing transition metal compound, at least one tridentate ligand containing transition metal compound or mixtures thereof capable of (A) being activated upon contact with the chromium immobilized support-agglomerate or (B) being converted upon contact with an organometallic compound, to an intermediate which is capable of being activated upon contact with the chromium immobilized support-agglomerate.

The bidentate ligand containing transition metal pre-catalyst compounds can be generically represented by the formula:

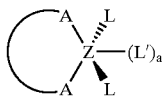

I and the tridentate ligand containing transition metal pre-catalyst compounds can be generically represented by the formula:

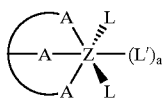

II wherein in each of formulas I and II above:
each A independently represents an atom selected from oxygen, sulfur, phosphorous or nitrogen, and preferably represents oxygen or nitrogen or a combination thereof, and most preferably each A in I and at least two A's of II represent nitrogen;
"a" is an integer of 0, 1 or 2 which represents the number of (L') groups bound to Z to provide a neutral complex, the value of "a" being dependent on the oxidation state of Z and whether a particular A-Z bond is dative or covalent, and if covalent whether it is a single or double bond;
Z represents at least one of Group 3 to 10 transition metals of the Periodic Table, preferably transition metals selected from Fe, Co, Ni, Ru, Rh, Pd, Os, Ir, Pt in the +2 (a=0) or +3 (a=1) oxidation state or Ti, V, Cr, Mn, Zr, Hf in the +2 (a=0), +3 (a=1) or +4 (a=2) oxidation states, more preferably a Group 8 to 10 late transition metal selected from iron, cobalt, nickel or palladium and most preferably iron or cobalt; and
each L and L' (when present) independently represents a ligand selected from the group of hydrogen, halo, and hydrocarbon based radical or group such as methyl, ethyl, propyl (all isomers), butyl (all isomers) dimethylamine, 1,3,-butadiene -1,4-diyl, $C_4$ or $C_5$ alkylene and the like, associated through a covalent or dative bond to Z, or both L groups together represent a hydrocarbon based radical, preferably a $C_3$ to $C_{24}$ hydrocarbylene group, associated through a covalent or dative bond to Z, and which, together with Z, constitute a ring or fused ring structure, typically a 3 to 7, preferably 4 to 7 member heterocyclic ring structure when the line joining A to Z represents a covalent bond.

As used herein, the term "hydrocarbon-based radical or group" denotes a radical or group having a carbon atom directly attached to the remainder of the molecule and having a predominantly hydrocarbon character within the context of this invention. Moreover, in this context the terms "group" and "radical" are used interchangeably. Such radicals include the following:

Hydrocarbon radicals; that is, aliphatic radicals, aromatic- and alicyclic-substituted radicals, and the like, of the type known to those skilled in art.

Substituted hydrocarbon radicals; that is, radicals containing pendant non-hydrocarbon substituents, that in the context of this invention, do not alter the predominantly hydrocarbon character of the radical or constitute a poison for the pre-catalyst. Those skilled in the art will be aware of suitable substituents; examples are halo, nitro, hydroxy, alkoxy, carbalkoxy, and alkythio.

Hetero radicals; that is, radicals which, while predominantly hydrocarbon in character within the context of this invention, contain atoms other than carbon present as a member of the linear structure of a chain or ring otherwise composed of carbon atoms. Suitable heteroatoms will be apparent to those skilled in the art and include, for example, nitrogen, oxygen and sulfur. In general, no more than three substituents or hetero atoms, and preferably no more than one, will be present for each 10 carbon atoms in the hydrocarbon based radical.

More specifically, the hydrocarbon based radical or group of L and L' can be substituted or unsubstituted, cyclic or non-cyclic, linear or branched, aliphatic, aromatic, or mixed aliphatic and aromatic including hydrocarbyl, hydrocarbylene, hydrocarbyloxy, hydrocarbylsilyl, hydrocarbylamino, and hydrocarbylsiloxy radicals having up to 50 non-hydrogen atoms. The preferred L and L' groups are independently selected from halo, hydrocarbyl, and substituted hydrocarbyl radicals. The hydrocarbon based radical may typically contain from 1 to about 24 carbon atoms, preferably from 1 to about 12 carbon atoms and the substituent group is preferably a halogen atom.

The lines joining each A to each other A represent a hydrocarbon based radical, (typically a $C_2$ to $C_{90}$ (e.g., $C_2$ to $C_{20}$) preferably $C_3$ to $C_{30}$ (e.g., $C_3$ to $C_{12}$) hydrocarbon based radical, such as a hydrocarbylene radical providing a ring or fused ring hydrocarbylene structure or substituted hydrocarbylene structure. Portions of the structure may be comprised of carbon-carbon double bonds, carbon-carbon single bonds, carbon-A atom double bonds and carbon-A atom single bonds. Each A will further represent hydrocarbon groups covalently bonded thereto to fulfill its valence state.

Typically, for the bidentate and tridentate ligand containing transition metal compounds (sometimes herein referred to as "pre-catalyst"), A, Z and the carbons includable in the lines connecting the (A) groups collectively can be joined to typically make a 4 to 7, preferably 5 to 7 member ring structures.

The bonds between each A atom of the pre-catalyst and the transition metal Z and between L and Z can be either dative or covalent. Dative bonds represent a relationship between an electron rich A atom and the metal Z whereby the electron density of the metal is increased by providing electrons to the empty orbitals of the metal and do not induce any change in the oxidation state of the metal Z. Similar considerations apply to the relationship between Z and L.

The above described bidentate and tridentate ligand containing transition metal pre-catalyst compounds from which the subject catalyst is derived are known. The disclosure of such components and the methods of forming the same have been described in various publications, including PCT Pub. Nos. WO 96/23010; WO 99/46302; WO 99/46303; and WO 99146304; U.S. Pat. Nos. 5,880,241; 5,880,323; 5,866,663; 5,886,224; and 5,891,963; Journal of the American Chemical Society (JACS) 1998, 120, 6037–6046, JACS 1995, 117, 6414–6415 and Supplemental Teachings; JACS 1996, 118, 1518; Macromol. Rapid Commun. 19, 31–34 (1998); Caltech Highlights 1997, 65–66; Chem Week Apr. 29, 1998, 72; C&EN Apr. 13, 1998 11–12; JACS 1998, 120, 4049–4050; Japanese Patent Application 02-078,663, and Angew. Chem. Int. Ed. 1999, vol. 38, pp 428–447, The Search for New-Generation Olefin Polymerization Catalysts: Life Beyond Metallocenes. The teaching of each of the above cited references are incorporated herein in its entirety by reference.

In formulas I and II, each L and L' group is preferably a halogen atom, an unsubstituted hydrocarbyl or a hydrocarbyloxy group. The most preferred compounds are those having each L being halogen.

Preferred bidentate pre-catalyst compounds may, for example be represented as compounds of the formula:

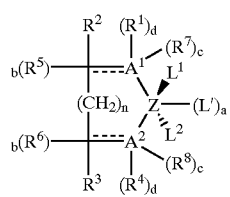

Ia' wherein n is an integer, which can vary from 0 to 3, preferably 0 or 1;

a is an integer as defined above;

b, c, and d each independently represents 1 or 0 to indicate whether its associated R group is present (1) or not (0);

$R^1$ and $R^4$ are each independently selected from an unsubstituted or substituted $C_1-C_{20}$, preferably $C_3-C_{20}$ hydrocarbyl, such as alkyl, aryl, alkaryl or aralkyl group, as for example, i-propyl; t-butyl; 2,4,6-trimethylphenyl; 2-methylphenyl; 2,6-diisopropylphenyl; their fluorinated derivatives and the like; or with adjacent groups, together, may represent a $C_3-C_{20}$ hydrocarbylene group;

$R^2, R^3, R^5, R^6, R^7$, and $R^8$ are each independently selected from hydrogen, an unsubstituted or substituted $C_1-C_{20}$ hydrocarbyl group such as an alkyl, aryl, alkaryl or aralkyl group, as for example, methyl, ethyl, i-propyl, butyl (all isomers), phenyl, toluyl, 2,6-diisopropylphenyl and the like; or any R groups and adjacent carbon atoms, such as $R^2$ and $R^3$, taken together can provide an unsubstituted or substituted $C_3-C_{20}$ ring forming hydrocarbylene group, such as hexylene, 1,8-naphthylene and the like;

Z, A and each L and L' are as defined above in connection with Formula I. It is preferred that Z be selected from iron or cobalt and that each L and L' be independently selected from chlorine, bromine, iodine or a $C_1-C_8$ (more preferably $C_1-C_4$) alkyl. The bonds depicted by a dotted line signify the possibility that the atoms bridged by said dotted line may be bridged by a single or double bond.

It will be understood that the particular identity of b, c, and d in Formula I will be dependent on (i) the identity of Z, (ii) the identity of heteroatom A, (iii) whether the bond between heteroatom A and its adjacent ring carbon is single or double, and (iv) whether the bond between heteroatom A and Z is dative or covalent.

More specifically, when $A^1$ in Formula Ia' is nitrogen it will always have at least 3 available vacancies for bonding. If the bond between such N and its adjacent ring carbon is a double covalent bond, the b for $R^5$ will be zero, and only one further vacancy will be available in the N for either a covalent bond with Z, in which case c and d are zero, or if the bond with Z is dative, the N can covalently bond with its associated $R^1$ or $R^7$ group in which case either d or c is 1. Similarly, if the bonds between the N and the adjacent ring carbon and between N and Z are single covalent, the b of $R^5$ can be 1, and either d or the c of $R^7$ will be 1. Alternatively, if the bond between N and Z is dative in this scenario, both d, and the c of $R^7$ can be 1.

The above rules are modified when $A^1$ in Formula Ia' is oxygen because oxygen has only 2 available vacancies rather than the 3 vacancies for N. Thus, when $A^1$ is oxygen and is double covalently bonded to the adjacent ring carbon, the bond between $A^1$ and Z will be dative and b of $R^5$, c of $R^7$ and d of $R^1$ will be 0. If such double bond is replaced by a single bond, the b of $R^5$ can be 1 and either the bond between $A^1$ and Z is single covalent, in which case c of $R^2$ and d of $R^1$ are both 0, or if dative, either c of $R^7$ or d of $R^1$ can be 1.

The vacancy rules when $A^1$ is sulfur are the same as for $A^1$ being oxygen. Phosphorous typically has 3 available vacancies for 3 single covalent bonds or 1 double covalent bond and 1 single covalent bond. Phosphorous will typically not covalently bond with Z, its association with Z being that of a dative bond.

Similar considerations to those described above for $A^1$ apply in respect to $A^2$ of Formula Ia' and in respect to all A groups and a, b, c, of Formula IIa' discussed hereinafter.

Illustrative of bidentate ligand containing transition metal pre-catalyst compounds which are useful in providing the catalyst composition of the present invention are compounds of Ia' having the following combination of groups:

TABLE I

Ia'

| | n | R¹/R⁴ | R²/R³ | R⁵/R⁶ | A¹ | A² | L¹ | L²' | a | b | c | d | Z |
|---|---|---|---|---|---|---|---|---|---|---|---|---|---|
| 1 | 0 | 2,6-iPr₂Ph | Me | N/A | N | N | Me | e | 0 | 0 | 0 | 1 | Pd |
| 2 | 0 | 2,6-iPr₂Ph | Me | N/A | N | N | Me | Me | 0 | 0 | 0 | 1 | Pd |
| 3 | 0 | 2,6-iPr₂Ph | Me | N/A | N | N | Me | Br | 0 | 0 | 0 | 1 | Pd |
| 4 | 0 | 2,6-iPr₂Ph | Me | N/A | N | N | Me | Cl | 0 | 0 | 0 | 1 | Pd |
| 5 | 0 | 2,6-iPr₂Ph | Me | N/A | N | N | Br | Br | 0 | 0 | 0 | 1 | Pd |
| 6 | 0 | 2,6-iPr₂Ph | Me | N/A | N | N | Cl | Cl | 0 | 0 | 0 | 1 | Pd |
| 7 | 0 | 2,6-iPr₂Ph | Me | N/A | N | N | Br | Br | 0 | 0 | 0 | 1 | Ni |
| 8 | 0 | 2,6-iPr₂Ph | Me | N/A | N | N | Cl | Cl | 0 | 0 | 0 | 1 | Ni |
| 9 | 0 | 2,6-iPr₂Ph | Me | N/A | N | N | Me | Me | 0 | 0 | 0 | 1 | Ni |
| 10 | 0 | 2,6-iPr₂Ph | Me | N/A | N | N | Me | Br | 0 | 0 | 0 | 1 | Ni |
| 11 | 0 | 2,6-iPr₂Ph | Me | N/A | N | N | Me | Cl | 0 | 0 | 0 | 1 | Ni |
| 12 | 0 | 2,6-iPr₂Ph | Me | N/A | O | N | Me | e | 0 | 0 | 0 | 0 | Pd |
| 13 | 0 | 2,6-iPr₂Ph | Me | N/A | O | N | Me | Me | 0 | 0 | 0 | 0 | Pd |
| 14 | 0 | 2,6-iPr₂Ph | Me | N/A | O | N | Me | Br | 0 | 0 | 0 | 0 | Pd |
| 15 | 0 | 2,6-iPr₂Ph | Me | N/A | O | N | Me | Cl | 0 | 0 | 0 | 0 | Pd |
| 16 | 0 | 2,6-iPr₂Ph | Me | N/A | O | N | Br | Br | 0 | 0 | 0 | 0 | Pd |
| 17 | 0 | 2,6-iPr₂Ph | Me | N/A | O | N | Cl | Cl | 0 | 0 | 0 | 0 | Pd |
| 18 | 0 | 2,6-iPr₂Ph | Me | N/A | O | N | Br | Br | 0 | 0 | 0 | 0 | Ni |
| 19 | 0 | 2,6-iPr₂Ph | Me | N/A | O | N | Cl | Cl | 0 | 0 | 0 | 0 | Ni |
| 20 | 0 | 2,6-iPr₂Ph | Me | N/A | O | N | Me | Me | 0 | 0 | 0 | 0 | Ni |
| 21 | 0 | 2,6-iPr₂Ph | Me | N/A | O | N | Me | Br | 0 | 0 | 0 | 0 | Ni |
| 22 | 0 | 2,6-iPr₂Ph | Me | N/A | O | N | Me | Cl | 0 | 0 | 0 | 0 | Ni |
| 23 | 1 | 2,6-iPr₂Ph | Me | N/A | N | N | Me | e | 0 | 0 | 0 | 1 | Pd |
| 24 | 1 | 2,6-iPr₂Ph | Me | N/A | N | N | Me | Me | 0 | 0 | 0 | 1 | Pd |
| 25 | 1 | 2,6-iPr₂Ph | Me | N/A | N | N | Me | Br | 0 | 0 | 0 | 1 | Pd |
| 26 | 1 | 2,6-iPr₂Ph | Me | N/A | N | N | Me | Cl | 0 | 0 | 0 | 1 | Pd |
| 27 | 1 | 2,6-iPr₂Ph | Me | N/A | N | N | Br | Br | 0 | 0 | 0 | 1 | Pd |
| 28 | 1 | 2,6-iPr₂Ph | Me | N/A | N | N | Cl | Cl | 0 | 0 | 0 | 1 | Pd |
| 29 | 1 | 2,6-iPr₂Ph | Me | N/A | N | N | Br | Br | 0 | 0 | 0 | 1 | Ni |
| 30 | 1 | 2,6-iPr₂Ph | Me | N/A | N | N | Cl | Cl | 0 | 0 | 0 | 1 | Ni |
| 31 | 1 | 2,6-iPr₂Ph | Me | N/A | N | N | Me | Me | 0 | 0 | 0 | 1 | Ni |
| 32 | 1 | 2,6-iPr₂Ph | Me | N/A | N | N | Me | Br | 0 | 0 | 0 | 1 | Ni |
| 33 | 1 | 2,6-iPr₂Ph | Me | N/A | N | N | Me | Cl | 0 | 0 | 0 | 1 | Ni |
| 34 | 0 | 2,5-iPr₂C₄H₂N | Me | N/A | N | N | Br | Br | 0 | 0 | 0 | 1 | Ni |
| 35 | 0 | 2,5-iPr₂C₄H₂N | Me | N/A | N | N | Cl | Cl | 0 | 0 | 0 | 1 | Ni |
| 36 | 0 | 2,5-iPr₂C₄H₂N | Me | N/A | N | N | Me | Me | 0 | 0 | 0 | 1 | Ni |
| 37 | 0 | 2,5-iPr₂C₄H₂N | Me | N/A | N | N | Me | Br | 0 | 0 | 0 | 1 | Ni |
| 38 | 0 | 2,5-iPr₂C₄H₂N | Me | N/A | N | N | Me | Cl | 0 | 0 | 0 | 1 | Ni |
| 39 | 0 | 2,6-Me₂Ph | Me | N/A | N | N | Me | e | 0 | 0 | 0 | 1 | Pd |
| 40 | 0 | 2,6-Me₂Ph | Me | N/A | N | N | Me | Me | 0 | 0 | 0 | 1 | Pd |
| 41 | 0 | 2,6-Me₂Ph | Me | N/A | N | N | Me | Br | 0 | 0 | 0 | 1 | Pd |
| 42 | 0 | 2,6-Me₂Ph | Me | N/A | N | N | Me | Cl | 0 | 0 | 0 | 1 | Pd |
| 43 | 0 | 2,6-Me₂Ph | Me | N/A | N | N | Br | Br | 0 | 0 | 0 | 1 | Pd |
| 44 | 0 | 2,6-Me₂Ph | Me | N/A | N | N | Cl | Cl | 0 | 0 | 0 | 1 | Pd |
| 45 | 0 | 2,6-iPr₂Ph | H | N/A | N | N | Me | e | 0 | 0 | 0 | 1 | Pd |
| 46 | 0 | 2,6-iPr₂Ph | H | N/A | N | N | Me | Me | 0 | 0 | 0 | 1 | Pd |
| 47 | 0 | 2,6-iPr₂Ph | H | N/A | N | N | Me | Br | 0 | 0 | 0 | 1 | Pd |
| 48 | 0 | 2,6-iPr₂Ph | H | N/A | N | N | Me | Cl | 0 | 0 | 0 | 1 | Pd |
| 49 | 0 | 2,6-iPr₂Ph | H | N/A | N | N | Br | Br | 0 | 0 | 0 | 1 | Pd |
| 50 | 0 | 2,6-iPr₂Ph | H | N/A | N | N | Cl | Cl | 0 | 0 | 0 | 1 | Pd |
| 51 | 0 | 2,6-iPr₂Ph | H | N/A | N | N | Br | Br | 0 | 0 | 0 | 1 | Ni |
| 52 | 0 | 2,6-iPr₂Ph | H | N/A | N | N | Cl | Cl | 0 | 0 | 0 | 1 | Ni |
| 53 | 0 | 2,6-iPr₂Ph | H | N/A | N | N | Me | Me | 0 | 0 | 0 | 1 | Ni |
| 54 | 0 | 2,6-iPr₂Ph | H | N/A | N | N | Me | Br | 0 | 0 | 0 | 1 | Ni |
| 55 | 0 | 2,6-iPr₂Ph | H | N/A | N | N | Me | Cl | 0 | 0 | 0 | 1 | Ni |
| 56 | 0 | 2,5-iPr₂C₄H₂N | H | N/A | N | N | Br | Br | 0 | 0 | 0 | 1 | Ni |
| 57 | 0 | 2,5-iPr₂C₄H₂N | H | N/A | N | N | Cl | Cl | 0 | 0 | 0 | 1 | Ni |
| 58 | 0 | 2,5-iPr₂C₄H₂N | H | N/A | N | N | Me | Me | 0 | 0 | 0 | 1 | Ni |
| 59 | 0 | 2,5-iPr₂C₄H₂N | H | N/A | N | N | Me | Br | 0 | 0 | 0 | 1 | Ni |
| 60 | 0 | 2,5-iPr₂C₄H₂N | H | N/A | N | N | Me | Cl | 0 | 0 | 0 | 1 | Ni |
| 61 | 0 | 2,6-iPr₂Ph | An | N/A | N | N | Me | e | 0 | 0 | 0 | 1 | Pd |
| 62 | 0 | 2,6-iPr₂Ph | An | N/A | N | N | Me | Me | 0 | 0 | 0 | 1 | Pd |
| 63 | 0 | 2,6-iPr₂Ph | An | N/A | N | N | Me | Br | 0 | 0 | 0 | 1 | Pd |
| 64 | 0 | 2,6-iPr₂Ph | An | N/A | N | N | Me | Cl | 0 | 0 | 0 | 1 | Pd |
| 65 | 0 | 2,6-iPr₂Ph | An | N/A | N | N | Br | Br | 0 | 0 | 0 | 1 | Pd |
| 66 | 0 | 2,6-iPr₂Ph | An | N/A | N | N | Cl | Cl | 0 | 0 | 0 | 1 | Pd |

TABLE I-continued

Ia'

$$\begin{array}{c} R^2 \;\; (R^1)_d \\ \mid \;\; / (R^7)_c \\ {}_b(R^5)\text{---}A^1 \\ \qquad \quad \diagdown L^1 \\ (CH_2)_n \quad Z\text{---}(L')_a \\ \qquad \quad \diagup L^2 \\ {}_b(R^6)\text{---}A^2 \\ \mid \;\; \diagdown (R^8)_c \\ R^3 \;\; (R^4)_d \end{array}$$

| | n | $R^1/R^4$ | $R^2/R^3$ | $R^5/R^6$ | $A^1$ | $A^2$ | $L^1$ | $L^{2'}$ | a | b | c | d | Z |
|---|---|---|---|---|---|---|---|---|---|---|---|---|---|
| 67 | 0 | 2,5-iPr$_2$C$_4$H$_2$N | An | N/A | N | N | Me | e | 0 | 0 | 0 | 1 | Pd |
| 68 | 0 | 2,5-iPr$_2$C$_4$H$_2$N | An | N/A | N | N | Me | Me | 0 | 0 | 0 | 1 | Pd |
| 69 | 0 | 2,5-iPr$_2$C$_4$H$_2$N | An | N/A | N | N | Me | Br | 0 | 0 | 0 | 1 | Pd |
| 70 | 0 | 2,5-iPr$_2$C$_4$H$_2$N | An | N/A | N | N | Me | Cl | 0 | 0 | 0 | 1 | Pd |
| 71 | 0 | 2,5-iPr$_2$C$_4$H$_2$N | An | N/A | N | N | Br | Br | 0 | 0 | 0 | 1 | Pd |
| 72 | 0 | 2,5-iPr$_2$C$_4$H$_2$N | An | N/A | N | N | Cl | Cl | 0 | 0 | 0 | 1 | Pd |
| 73 | 0 | 2,6-iPr$_2$Ph | An | N/A | N | N | Br | Br | 0 | 0 | 0 | 1 | Ni |
| 74 | 0 | 2,6-iPr$_2$Ph | An | N/A | N | N | Cl | Cl | 0 | 0 | 0 | 1 | Ni |
| 75 | 0 | 2,6-iPr$_2$Ph | An | N/A | N | N | Me | Me | 0 | 0 | 0 | 1 | Ni |
| 76 | 0 | 2,6-iPr$_2$Ph | An | N/A | N | N | Me | Br | 0 | 0 | 0 | 1 | Ni |
| 77 | 0 | 2,6-iPr$_2$Ph | An | N/A | N | N | Me | Cl | 0 | 0 | 0 | 1 | Ni |
| 78 | 0 | 2,5-iPr$_2$C$_4$H$_2$N | An | N/A | N | N | Br | Br | 0 | 0 | 0 | 1 | Ni |
| 79 | 0 | 2,5-iPr$_2$C$_4$H$_2$N | An | N/A | N | N | Cl | Cl | 0 | 0 | 0 | 1 | Ni |
| 80 | 0 | 2,5-iPr$_2$C$_4$H$_2$N | An | N/A | N | N | Me | Me | 0 | 0 | 0 | 1 | Ni |
| 81 | 0 | 2,5-iPr$_2$C$_4$H$_2$N | An | N/A | N | N | Me | Br | 0 | 0 | 0 | 1 | Ni |
| 82 | 0 | 2,5-iPr$_2$C$_4$H$_2$N | An | N/A | N | N | Me | Cl | 0 | 0 | 0 | 1 | Ni |
| 83 | 0 | 2,6-iPr$_2$Ph | k | N/A | N | N | Me | e | 0 | 0 | 0 | 1 | Pd |
| 84 | 0 | 2,6-iPr$_2$Ph | k | N/A | N | N | Me | Me | 0 | 0 | 0 | 1 | Pd |
| 85 | 0 | 2,6-iPr$_2$Ph | k | N/A | N | N | Me | Br | 0 | 0 | 0 | 1 | Pd |
| 86 | 0 | 2,6-iPr$_2$Ph | k | N/A | N | N | Me | Cl | 0 | 0 | 0 | 1 | Pd |
| 87 | 0 | 2,6-iPr$_2$Ph | k | N/A | N | N | Br | Br | 0 | 0 | 0 | 1 | Pd |
| 88 | 0 | 2,6-iPr$_2$Ph | k | N/A | N | N | Cl | Cl | 0 | 0 | 0 | 1 | Pd |
| 89 | 0 | 2,6-iPr$_2$Ph | k | N/A | N | N | Br | Br | 0 | 0 | 0 | 1 | Ni |
| 90 | 0 | 2,6-iPr$_2$Ph | k | N/A | N | N | Cl | Cl | 0 | 0 | 0 | 1 | Ni |
| 91 | 0 | 2,6-iPr$_2$Ph | k | N/A | N | N | Me | Me | 0 | 0 | 0 | 1 | Ni |
| 92 | 0 | 2,6-iPr$_2$Ph | k | N/A | N | N | Me | Br | 0 | 0 | 0 | 1 | Ni |
| 93 | 0 | 2,6-iPr$_2$Ph | k | N/A | N | N | Me | Cl | 0 | 0 | 0 | 1 | Ni |
| 94 | 0 | 2,5-iPr$_2$C$_4$H$_2$N | k | N/A | N | N | Me | e | 0 | 0 | 0 | 1 | Pd |
| 95 | 0 | 2,5-iPr$_2$C$_4$H$_2$N | k | N/A | N | N | Me | Me | 0 | 0 | 0 | 1 | Pd |
| 96 | 0 | 2,5-iPr$_2$C$_4$H$_2$N | k | N/A | N | N | Me | Br | 0 | 0 | 0 | 1 | Pd |
| 97 | 0 | 2,5-iPr$_2$C$_4$H$_2$N | k | N/A | N | N | Me | Cl | 0 | 0 | 0 | 1 | Pd |
| 98 | 0 | 2,5-iPr$_2$C$_4$H$_2$N | k | N/A | N | N | Br | Br | 0 | 0 | 0 | 1 | Pd |
| 99 | 0 | 2,5-iPr$_2$C$_4$H$_2$N | k | N/A | N | N | Cl | Cl | 0 | 0 | 0 | 1 | Pd |
| 100 | 0 | 2,5-iPr$_2$C$_4$H$_2$N | k | N/A | N | N | Br | Br | 0 | 0 | 0 | 1 | Ni |
| 101 | 0 | 2,5-iPr$_2$C$_4$H$_2$N | k | N/A | N | N | Cl | Cl | 0 | 0 | 0 | 1 | Ni |
| 102 | 0 | 2,5-iPr$_2$C$_4$H$_2$N | k | N/A | N | N | Me | Me | 0 | 0 | 0 | 1 | Ni |
| 103 | 0 | 2,5-iPr$_2$C$_4$H$_2$N | k | N/A | N | N | Me | Br | 0 | 0 | 0 | 1 | Ni |
| 104 | 0 | 2,5-iPr$_2$C$_4$H$_2$N | k | N/A | N | N | Me | Cl | 0 | 0 | 0 | 1 | Ni |
| 105 | 0 | 2,6-Me$_2$Ph | An | N/A | N | N | Me | e | 0 | 0 | 0 | 1 | Pd |
| 106 | 0 | 2,6-Me$_2$Ph | An | N/A | N | N | Me | Me | 0 | 0 | 0 | 1 | Pd |
| 107 | 0 | 2,6-Me$_2$Ph | An | N/A | N | N | Me | Br | 0 | 0 | 0 | 1 | Pd |
| 108 | 0 | 2,6-Me$_2$Ph | An | N/A | N | N | Me | Cl | 0 | 0 | 0 | 1 | Pd |
| 109 | 0 | 2,6-Me$_2$Ph | An | N/A | N | N | Br | Br | 0 | 0 | 0 | 1 | Pd |
| 110 | 0 | 2,6-Me$_2$Ph | An | N/A | N | N | Cl | Cl | 0 | 0 | 0 | 1 | Pd |
| 111 | 0 | 2,6-Me$_2$Ph | H | N/A | N | N | Me | e | 0 | 0 | 0 | 1 | Pd |
| 112 | 0 | 2,6-Me$_2$Ph | H | N/A | N | N | Me | Me | 0 | 0 | 0 | 1 | Pd |
| 113 | 0 | 2,6-Me$_2$Ph | H | N/A | N | N | Me | Br | 0 | 0 | 0 | 1 | Pd |
| 114 | 0 | 2,6-Me$_2$Ph | H | N/A | N | N | Me | Cl | 0 | 0 | 0 | 1 | Pd |
| 115 | 0 | 2,6-Me$_2$Ph | H | N/A | N | N | Br | Br | 0 | 0 | 0 | 1 | Pd |
| 116 | 0 | 2,6-Me$_2$Ph | H | N/A | N | N | Cl | Cl | 0 | 0 | 0 | 1 | Pd |
| 117 | 0 | 2,6-Me$_2$Ph | k | N/A | N | N | Me | e | 0 | 0 | 0 | 1 | Pd |
| 118 | 0 | 2,6-Me$_2$Ph | k | N/A | N | N | Me | Me | 0 | 0 | 0 | 1 | Pd |
| 119 | 0 | 2,6-Me$_2$Ph | k | N/A | N | N | Me | Br | 0 | 0 | 0 | 1 | Pd |
| 120 | 0 | 2,6-Me$_2$Ph | k | N/A | N | N | Me | Cl | 0 | 0 | 0 | 1 | Pd |
| 121 | 0 | 2,6-Me$_2$Ph | k | N/A | N | N | Br | Br | 0 | 0 | 0 | 1 | Pd |
| 122 | 0 | 2,6-Me$_2$Ph | k | N/A | N | N | Cl | Cl | 0 | 0 | 0 | 1 | Pd |
| 123 | 0 | 2,5-iPr$_2$C$_4$H$_2$N | k | N/A | N | N | Me | e | 0 | 0 | 0 | 1 | Pd |
| 124 | 0 | 2,5-iPr$_2$C$_4$H$_2$N | k | N/A | N | N | Me | Me | 0 | 0 | 0 | 1 | Pd |
| 125 | 0 | 2,5-iPr$_2$C$_4$H$_2$N | k | N/A | N | N | Me | Br | 0 | 0 | 0 | 1 | Pd |
| 126 | 0 | 2,5-iPr$_2$C$_4$H$_2$N | k | N/A | N | N | Me | Cl | 0 | 0 | 0 | 1 | Pd |
| 127 | 0 | 2,5-iPr$_2$C$_4$H$_2$N | k | N/A | N | N | Br | Br | 0 | 0 | 0 | 1 | Pd |
| 128 | 0 | 2,5-iPr$_2$C$_4$H$_2$N | k | N/A | N | N | Cl | Cl | 0 | 0 | 0 | 1 | Pd |
| 129 | 0 | 2,6-Me$_2$Ph | Me | N/A | N | N | Br | Br | 0 | 0 | 0 | 1 | Ni |
| 130 | 0 | 2,6-Me$_2$Ph | Me | N/A | N | N | Cl | Cl | 0 | 0 | 0 | 1 | Ni |
| 131 | 0 | 2,6-Me$_2$Ph | Me | N/A | N | N | Me | Me | 0 | 0 | 0 | 1 | Ni |
| 132 | 0 | 2,6-Me$_2$Ph | Me | N/A | N | N | Me | Br | 0 | 0 | 0 | 1 | Ni |

TABLE I-continued

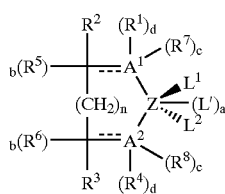

Ia'

| | n | $R^1/R^4$ | $R^2/R^3$ | $R^5/R^6$ | $A^1$ | $A^2$ | $L^1$ | $L^{2'}$ | a | b | c | d | Z |
|---|---|---|---|---|---|---|---|---|---|---|---|---|---|
| 133 | 0 | 2,6-Me$_2$Ph | Me | N/A | N | N | Me | Cl | 0 | 0 | 0 | 1 | Ni |
| 134 | 0 | 2,6-Me$_2$Ph | k | N/A | N | N | Br | Br | 0 | 0 | 0 | 1 | Ni |
| 135 | 0 | 2,6-Me$_2$Ph | k | N/A | N | N | Cl | Cl | 0 | 0 | 0 | 1 | Ni |
| 136 | 0 | 2,6-Me$_2$Ph | k | N/A | N | N | Me | Me | 0 | 0 | 0 | 1 | Ni |
| 137 | 0 | 2,6-Me$_2$Ph | k | N/A | N | N | Me | Br | 0 | 0 | 0 | 1 | Ni |
| 138 | 0 | 2,6-Me$_2$Ph | k | N/A | N | N | Me | Cl | 0 | 0 | 0 | 1 | Ni |
| 139 | 0 | 2,5-iPr$_2$C$_4$H$_2$N | k | N/A | N | N | Br | Br | 0 | 0 | 0 | 1 | Ni |
| 140 | 0 | 2,5-iPr$_2$C$_4$H$_2$N | k | N/A | N | N | Cl | Cl | 0 | 0 | 0 | 1 | Ni |
| 141 | 0 | 2,5-iPr$_2$C$_4$H$_2$N | k | N/A | N | N | Me | Me | 0 | 0 | 0 | 1 | Ni |
| 142 | 0 | 2,5-iPr$_2$C$_4$H$_2$N | k | N/A | N | N | Me | Br | 0 | 0 | 0 | 1 | Ni |
| 143 | 0 | 2,5-iPr$_2$C$_4$H$_2$N | k | N/A | N | N | Me | Cl | 0 | 0 | 0 | 1 | Ni |
| 144 | 0 | 2,4,6-Me$_3$Ph | Me | N/A | N | N | Me | e | 0 | 0 | 0 | 1 | Pd |
| 145 | 0 | 2,4,6-Me$_3$Ph | Me | N/A | N | N | Me | Me | 0 | 0 | 0 | 1 | Pd |
| 146 | 0 | 2,4,6-Me$_3$Ph | Me | N/A | N | N | Me | Br | 0 | 0 | 0 | 1 | Pd |
| 147 | 0 | 2,4,6-Me$_3$Ph | Me | N/A | N | N | Me | Cl | 0 | 0 | 0 | 1 | Pd |
| 148 | 0 | 2,4,6-Me$_3$Ph | Me | N/A | N | N | Br | Br | 0 | 0 | 0 | 1 | Pd |
| 149 | 0 | 2,4,6-Me$_3$Ph | Me | N/A | N | N | Cl | Cl | 0 | 0 | 0 | 1 | Pd |
| 150 | 0 | 2,4,6-Me$_3$Ph | Me | N/A | N | N | Br | Br | 0 | 0 | 0 | 1 | Ni |
| 151 | 0 | 2,4,6-Me$_3$Ph | Me | N/A | N | N | Cl | Cl | 0 | 0 | 0 | 1 | Ni |
| 152 | 0 | 2,4,6-Me$_3$Ph | Me | N/A | N | N | Me | Me | 0 | 0 | 0 | 1 | Ni |
| 153 | 0 | 2,4,6-Me$_3$Ph | Me | N/A | N | N | Me | Br | 0 | 0 | 0 | 1 | Ni |
| 154 | 0 | 2,4,6-Me$_3$Ph | Me | N/A | N | N | Me | Cl | 0 | 0 | 0 | 1 | Ni |
| 155 | 0 | 2,4,6-Me$_3$Ph | H | N/A | N | N | Me | e | 0 | 0 | 0 | 1 | Pd |
| 156 | 0 | 2,4,6-Me$_3$Ph | H | N/A | N | N | Me | Me | 0 | 0 | 0 | 1 | Pd |
| 157 | 0 | 2,4,6-Me$_3$Ph | H | N/A | N | N | Me | Br | 0 | 0 | 0 | 1 | Pd |
| 158 | 0 | 2,4,6-Me$_3$Ph | H | N/A | N | N | Me | Cl | 0 | 0 | 0 | 1 | Pd |
| 159 | 0 | 2,4,6-Me$_3$Ph | H | N/A | N | N | Br | Br | 0 | 0 | 0 | 1 | Pd |
| 160 | 0 | 2,4,6-Me$_3$Ph | H | N/A | N | N | Cl | Cl | 0 | 0 | 0 | 1 | Pd |
| 161 | 0 | 2,4,6-Me$_3$Ph | H | N/A | N | N | Br | Br | 0 | 0 | 0 | 1 | Ni |
| 162 | 0 | 2,4,6-Me$_3$Ph | H | N/A | N | N | Cl | Cl | 0 | 0 | 0 | 1 | Ni |
| 163 | 0 | 2,4,6-Me$_3$Ph | H | N/A | N | N | Me | Me | 0 | 0 | 0 | 1 | Ni |
| 164 | 0 | 2,4,6-Me$_3$Ph | H | N/A | N | N | Me | Br | 0 | 0 | 0 | 1 | Ni |
| 165 | 0 | 2,4,6-Me$_3$Ph | H | N/A | N | N | Me | Cl | 0 | 0 | 0 | 1 | Ni |
| 166 | 0 | 2,4,6-Me$_3$Ph | An | N/A | N | N | Me | e | 0 | 0 | 0 | 1 | Pd |
| 167 | 0 | 2,4,6-Me$_3$Ph | An | N/A | N | N | Me | Me | 0 | 0 | 0 | 1 | Pd |
| 168 | 0 | 2,4,6-Me$_3$Ph | An | N/A | N | N | Me | Br | 0 | 0 | 0 | 1 | Pd |
| 169 | 0 | 2,4,6-Me$_3$Ph | An | N/A | N | N | Me | Cl | 0 | 0 | 0 | 1 | Pd |
| 170 | 0 | 2,4,6-Me$_3$Ph | An | N/A | N | N | Br | Br | 0 | 0 | 0 | 1 | Pd |
| 171 | 0 | 2,4,6-Me$_3$Ph | An | N/A | N | N | Cl | Cl | 0 | 0 | 0 | 1 | Pd |
| 172 | 0 | 2,4,6-Me$_3$Ph | An | N/A | N | N | Br | Br | 0 | 0 | 0 | 1 | Ni |
| 173 | 0 | 2,4,6-Me$_3$Ph | An | N/A | N | N | Cl | Cl | 0 | 0 | 0 | 1 | Ni |
| 174 | 0 | 2,4,6-Me$_3$Ph | An | N/A | N | N | Me | Me | 0 | 0 | 0 | 1 | Ni |
| 175 | 0 | 2,4,6-Me$_3$Ph | An | N/A | N | N | Me | Br | 0 | 0 | 0 | 1 | Ni |
| 176 | 0 | 2,4,6-Me$_3$Ph | An | N/A | N | N | Me | Cl | 0 | 0 | 0 | 1 | Ni |
| 177 | 0 | Ph | j | N/A | N | N | Me | Me | 0 | 0 | 0 | 1 | Pd |
| 178 | 0 | Ph | Me | N/A | N | N | Me | Me | 0 | 0 | 0 | 1 | Pd |
| 179 | 0 | Ph | H | N/A | N | N | Me | Me | 0 | 0 | 0 | 1 | Pd |
| 180 | 0 | Ph | An | N/A | N | N | Me | Me | 0 | 0 | 0 | 1 | Pd |
| 181 | 0 | Ph | j | N/A | N | N | Me | Cl | 0 | 0 | 0 | 1 | Pd |
| 182 | 0 | Ph | Me | N/A | N | N | Me | Cl | 0 | 0 | 0 | 1 | Pd |
| 183 | 0 | Ph | H | N/A | N | N | Me | Cl | 0 | 0 | 0 | 1 | Pd |
| 184 | 0 | Ph | An | N/A | N | N | Me | Cl | 0 | 0 | 0 | 1 | Pd |
| 185 | 0 | 2-PhPh | j | N/A | N | N | Me | Me | 0 | 0 | 0 | 1 | Pd |
| 186 | 0 | 2-PhPh | Me | N/A | N | N | Me | Me | 0 | 0 | 0 | 1 | Pd |
| 187 | 0 | 2-PhPh | H | N/A | N | N | Me | Me | 0 | 0 | 0 | 1 | Pd |
| 188 | 0 | 2-PhPh | An | N/A | N | N | Me | Me | 0 | 0 | 0 | 1 | Pd |
| 189 | 0 | 2-PhPh | j | N/A | N | N | Me | Cl | 0 | 0 | 0 | 1 | Pd |
| 190 | 0 | 2-PhPh | Me | N/A | N | N | Me | Cl | 0 | 0 | 0 | 1 | Pd |
| 191 | 0 | 2-PhPh | H | N/A | N | N | Me | Cl | 0 | 0 | 0 | 1 | Pd |
| 192 | 0 | 2-PhPh | An | N/A | N | N | Me | Cl | 0 | 0 | 0 | 1 | Pd |
| 193 | 0 | 2,6-EtPh | j | N/A | N | N | Me | Me | 0 | 0 | 0 | 1 | Pd |
| 194 | 0 | 2,6-EtPh | Me | N/A | N | N | Me | Me | 0 | 0 | 0 | 1 | Pd |

TABLE I-continued

Ia'

| | n | R$^1$/R$^4$ | R$^2$/R$^3$ | R$^5$/R$^6$ | A$^1$ | A$^2$ | L$^1$ | L$^{2'}$ | a | b | c | d | Z |
|---|---|---|---|---|---|---|---|---|---|---|---|---|---|
| 195 | 0 | 2,6-EtPh | H | N/A | N | N | Me | Me | 0 | 0 | 0 | 1 | Pd |
| 196 | 0 | 2,6-EtPh | An | N/A | N | N | Me | Me | 0 | 0 | 0 | 1 | Pd |
| 197 | 0 | 2,6-EtPh | j | N/A | N | N | Me | Cl | 0 | 0 | 0 | 1 | Pd |
| 198 | 0 | 2,6-EtPh | Me | N/A | N | N | Me | Cl | 0 | 0 | 0 | 1 | Pd |
| 199 | 0 | 2,6-EtPh | H | N/A | N | N | Me | Cl | 0 | 0 | 0 | 1 | Pd |
| 200 | 0 | 2,6-EtPh | An | N/A | N | N | Me | Cl | 0 | 0 | 0 | 1 | Pd |
| 201 | 0 | 2-t-BuPh | j | N/A | N | N | Me | Me | 0 | 0 | 0 | 1 | Pd |
| 202 | 0 | 2-t-BuPh | Me | N/A | N | N | Me | Me | 0 | 0 | 0 | 1 | Pd |
| 203 | 0 | 2-t-BuPh | H | N/A | N | N | Me | Me | 0 | 0 | 0 | 1 | Pd |
| 204 | 0 | 2-t-BuPh | An | N/A | N | N | Me | Me | 0 | 0 | 0 | 1 | Pd |
| 205 | 0 | 2-t-BuPh | j | N/A | N | N | Me | Cl | 0 | 0 | 0 | 1 | Pd |
| 206 | 0 | 2-t-BuPh | Me | N/A | N | N | Me | Cl | 0 | 0 | 0 | 1 | Pd |
| 207 | 0 | 2-t-BuPh | H | N/A | N | N | Me | Cl | 0 | 0 | 0 | 1 | Pd |
| 208 | 0 | 2-t-BuPh | An | N/A | N | N | Me | Cl | 0 | 0 | 0 | 1 | Pd |
| 209 | 0 | 1-Np | j | N/A | N | N | Me | Me | 0 | 0 | 0 | 1 | Pd |
| 210 | 0 | 1-Np | Me | N/A | N | N | Me | Me | 0 | 0 | 0 | 1 | Pd |
| 211 | 0 | 1-Np | H | N/A | N | N | Me | Me | 0 | 0 | 0 | 1 | Pd |
| 212 | 0 | 1-Np | An | N/A | N | N | Me | Me | 0 | 0 | 0 | 1 | Pd |
| 213 | 0 | PhMe | j | N/A | N | N | Me | Cl | 0 | 0 | 0 | 1 | Pd |
| 214 | 0 | PhMe | Me | N/A | N | N | Me | Cl | 0 | 0 | 0 | 1 | Pd |
| 215 | 0 | PhMe | H | N/A | N | N | Me | Cl | 0 | 0 | 0 | 1 | Pd |
| 216 | 0 | PhMe | An | N/A | N | N | Me | Cl | 0 | 0 | 0 | 1 | Pd |
| 217 | 0 | PhMe | j | N/A | N | N | Me | Me | 0 | 0 | 0 | 1 | Pd |
| 218 | 0 | PhMe | Me | N/A | N | N | Me | Me | 0 | 0 | 0 | 1 | Pd |
| 219 | 0 | PhMe | H | N/A | N | N | Me | Me | 0 | 0 | 0 | 1 | Pd |
| 220 | 0 | PhMe | An | N/A | N | N | Me | Me | 0 | 0 | 0 | 1 | Pd |
| 221 | 0 | PhMe | j | N/A | N | N | Me | Cl | 0 | 0 | 0 | 1 | Pd |
| 222 | 0 | PhMe | Me | N/A | N | N | Me | Cl | 0 | 0 | 0 | 1 | Pd |
| 223 | 0 | PhMe | H | N/A | N | N | Me | Cl | 0 | 0 | 0 | 1 | Pd |
| 224 | 0 | PhMe | An | N/A | N | N | Me | Cl | 0 | 0 | 0 | 1 | Pd |
| 225 | 0 | Ph$_2$Me | j | N/A | N | N | Me | Me | 0 | 0 | 0 | 1 | Pd |
| 226 | 0 | Ph$_2$Me | Me | N/A | N | N | Me | Me | 0 | 0 | 0 | 1 | Pd |
| 227 | 0 | Ph$_2$Me | H | N/A | N | N | Me | Me | 0 | 0 | 0 | 1 | Pd |
| 228 | 0 | Ph$_2$Me | An | N/A | N | N | Me | Me | 0 | 0 | 0 | 1 | Pd |
| 229 | 0 | Ph$_2$Me | j | N/A | N | N | Me | Cl | 0 | 0 | 0 | 1 | Pd |
| 230 | 0 | Ph$_2$Me | Me | N/A | N | N | Me | Cl | 0 | 0 | 0 | 1 | Pd |
| 231 | 0 | Ph$_2$Me | H | N/A | N | N | Me | Cl | 0 | 0 | 0 | 1 | Pd |
| 232 | 0 | Ph$_2$Me | An | N/A | N | N | Me | Cl | 0 | 0 | 0 | 1 | Pd |
| 233 | 0 | 2,6-t-BuPh | j | N/A | N | N | Me | Me | 0 | 0 | 0 | 1 | Pd |
| 234 | 0 | 2,6-t-BuPh | Me | N/A | N | N | Me | Me | 0 | 0 | 0 | 1 | Pd |
| 235 | 0 | 2,6-t-BuPh | H | N/A | N | N | Me | Me | 0 | 0 | 0 | 1 | Pd |
| 236 | 0 | 2,6-t-BuPh | An | N/A | N | N | Me | Me | 0 | 0 | 0 | 1 | Pd |
| 237 | 0 | 2,6-t-BuPh | j | N/A | N | N | Me | Cl | 0 | 0 | 0 | 1 | Pd |
| 238 | 0 | 2,6-t-BuPh | Me | N/A | N | N | Me | Cl | 0 | 0 | 0 | 1 | Pd |
| 239 | 0 | 2,6-t-BuPh | H | N/A | N | N | Me | Cl | 0 | 0 | 0 | 1 | Pd |
| 240 | 0 | 2,6-t-BuPh | An | N/A | N | N | Me | Cl | 0 | 0 | 0 | 1 | Pd |
| 241 | 0 | 2,6-t-BuPh | H | N/A | N | N | Br | Br | 0 | 0 | 0 | 1 | Ni |
| 242 | 0 | 2,6-t-Bu$_2$Ph | Me | N/A | N | N | Br | Br | 0 | 0 | 0 | 1 | Ni |
| 243 | 0 | 2,6-t-Bu$_2$Ph | An | N/A | N | N | Br | Br | 0 | 0 | 0 | 1 | Ni |
| 244 | 0 | 2,6-t-Bu$_2$Ph | H | N/A | N | N | Br | Br | 0 | 0 | 0 | 1 | Ni |
| 245 | 0 | 2,6-t-Bu$_2$Ph | Me | N/A | N | N | Br | Br | 0 | 0 | 0 | 1 | Ni |
| 246 | 0 | 2-6-t-Bu$_2$Ph | An | N/A | N | N | Br | Br | 0 | 0 | 0 | 1 | Ni |
| 247 | 0 | Ph | H | N/A | N | N | Br | Br | 0 | 0 | 0 | 1 | Ni |
| 248 | 0 | Ph | Me | N/A | N | N | Br | Br | 0 | 0 | 0 | 1 | Ni |
| 249 | 0 | Ph | An | N/A | N | N | Br | Br | 0 | 0 | 0 | 1 | Ni |
| 250 | 0 | 2-PhPh | H | N/A | N | N | Br | Br | 0 | 0 | 0 | 1 | Ni |
| 251 | 0 | 2-PhPh | Me | N/A | N | N | Br | Br | 0 | 0 | 0 | 1 | Ni |
| 252 | 0 | 2-PhPh | An | N/A | N | N | Br | Br | 0 | 0 | 0 | 1 | Ni |
| 253 | 0 | 2-iPr-6-MePh | H | N/A | N | N | Br | Br | 0 | 0 | 0 | 1 | Ni |
| 254 | 0 | 2-iPr-6-MePh | Me | N/A | N | N | Br | Br | 0 | 0 | 0 | 1 | Ni |
| 255 | 0 | 2-iPr-6-MePh | An | N/A | N | N | Br | Br | 0 | 0 | 0 | 1 | Ni |
| 256 | 0 | 2,5-t-BuPh | H | N/A | N | N | Br | Br | 0 | 0 | 0 | 1 | Ni |

TABLE I-continued

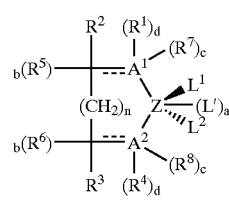

Ia'

| | n | $R^1/R^4$ | $R^2/R^3$ | $R^5/R^6$ | $A^1$ | $A^2$ | $L^1$ | $L^{2'}$ | a | b | c | d | Z |
|---|---|---|---|---|---|---|---|---|---|---|---|---|---|
| 257 | 0 | 2,5-t-BuPh | Me | N/A | N | N | Br | Br | 0 | 0 | 0 | 1 | Ni |
| 258 | 0 | 2,5-t-BuPh | An | N/A | N | N | Br | Br | 0 | 0 | 0 | 1 | Ni |
| 259 | 0 | 2,6-EtPh | H | N/A | N | N | Br | Br | 0 | 0 | 0 | 1 | Ni |
| 260 | 0 | 2,6-EtPh | Me | N/A | N | N | Br | Br | 0 | 0 | 0 | 1 | Ni |
| 261 | 0 | 2,6-EtPh | An | N/A | N | N | Br | Br | 0 | 0 | 0 | 1 | Ni |
| 262 | 0 | 1-Np | H | N/A | N | N | Br | Br | 0 | 0 | 0 | 1 | Ni |
| 263 | 0 | 1-Np | Me | N/A | N | N | Br | Br | 0 | 0 | 0 | 1 | Ni |
| 264 | 0 | 1-Np | An | N/A | N | N | Br | Br | 0 | 0 | 0 | 1 | Ni |
| 265 | 0 | Ph | Ph | N/A | N | N | Br | Br | 0 | 0 | 0 | 1 | Ni |
| 266 | 0 | 2,4,6-Me$_3$Ph | H | N/A | N | N | Br | Br | 0 | 0 | 0 | 1 | Ni |
| 267 | 0 | 2,4,6-Me$_3$Ph | Me | N/A | N | N | Br | Br | 0 | 0 | 0 | 1 | Ni |
| 268 | 0 | 2,4,6-Me$_3$Ph | An | N/A | N | N | Br | Br | 0 | 0 | 0 | 1 | Ni |
| 269 | 0 | 2,4,6-Me$_3$Ph | Ph | N/A | N | N | Br | Br | 0 | 0 | 0 | 1 | Ni |
| 270 | 1 | 2,6-Pr$_2$Pr | H | H | N | N | Cl | Cl | 0 | 0 | 0 | 1 | SY |
| 271 | 2 | 2,6-Pr$_2$Pr | H | H | N | N | Cl | Cl | 0 | 0 | 0 | 1 | SY |
| 272 | 3 | 2,6-Pr$_2$Pr | H | H | N | N | Cl | Cl | 0 | 0 | 0 | 1 | SY |
| 273 | 1 | 2,6-Pr$_2$Pr | Me | Me | N | N | Cl | Cl | 0 | 0 | 0 | 1 | SY |
| 274 | 2 | 2,6-Pr$_2$Pr | Me | Me | N | N | Cl | Cl | 0 | 0 | 0 | 1 | SY |
| 275 | 3 | 2,6-Pr$_2$Pr | Me | Me | N | N | Cl | Cl | 0 | 0 | 0 | 1 | SY |
| 276 | 1 | 2,6-Me$_2$Ph | H | H | N | N | Cl | Cl | 0 | 0 | 0 | 1 | SY |
| 277 | 2 | 2,6-Me$_2$Ph | H | H | N | N | Cl | Cl | 0 | 0 | 0 | 1 | SY |
| 278 | 3 | 2,6-Me$_2$Ph | H | H | N | N | Cl | Cl | 0 | 0 | 0 | 1 | SY |
| 279 | 1 | 2,6-Me$_2$Ph | Me | Me | N | N | Cl | Cl | 0 | 0 | 0 | 1 | SY |
| 280 | 2 | 2,6-Me$_2$Ph | Me | Me | N | N | Cl | Cl | 0 | 0 | 0 | 1 | SY |
| 281 | 3 | 2,6-Me$_2$Ph | Me | Me | N | N | Cl | Cl | 0 | 0 | 0 | 1 | SY |
| 282 | 1 | 2,4,6-Me$_3$Ph | H | H | N | N | Cl | Cl | 0 | 0 | 0 | 1 | SY |
| 283 | 2 | 2,4,6-Me$_3$Ph | H | H | N | N | Cl | Cl | 0 | 0 | 0 | 1 | SY |
| 284 | 3 | 2,4,6-Me$_3$Ph | H | H | N | N | Cl | Cl | 0 | 0 | 0 | 1 | SY |
| 285 | 1 | 2,4,6-Me$_3$Ph | Me | Me | N | N | Cl | Cl | 0 | 0 | 0 | 1 | SY |
| 286 | 2 | 2,4,6-Me$_3$Ph | Me | Me | N | N | Cl | Cl | 0 | 0 | 0 | 1 | SY |
| 287 | 3 | 2,4,6-Me$_3$Ph | Me | Me | N | N | Cl | Cl | 0 | 0 | 0 | 1 | SY |
| 288 | 1 | 2,6-iPr$_2$Ph | H | H | N | N | Cl | Cl | 1 | 0 | 0 | 1 | CMW |
| 289 | 2 | 2,6-iPr$_2$Ph | H | H | N | N | Cl | Cl | 1 | 0 | 0 | 1 | CMW |
| 290 | 3 | 2,6-iPr$_2$Ph | H | H | N | N | Cl | Cl | 1 | 0 | 0 | 1 | CMW |
| 291 | 1 | 2,6-iPrPh | Me | Me | N | N | Cl | Cl | 1 | 0 | 0 | 1 | CMW |
| 292 | 2 | 2,6-iPrPh | Me | Me | N | N | Cl | Cl | 1 | 0 | 0 | 1 | CMW |
| 293 | 3 | 2,6-iPrPh | Me | Me | N | N | Cl | Cl | 1 | 0 | 0 | 1 | CMW |
| 294 | 1 | 2,6,Me$_2$Ph | H | H | N | N | Cl | Cl | 1 | 0 | 0 | 1 | CMW |
| 295 | 2 | 2,6,Me$_2$Ph | H | H | N | N | Cl | Cl | 1 | 0 | 0 | 1 | CMW |
| 296 | 3 | 2,6,Me$_2$Ph | H | H | N | N | Cl | Cl | 1 | 0 | 0 | 1 | CMW |
| 297 | 1 | 2,6,Me$_2$Ph | Me | Me | N | N | Cl | Cl | 1 | 0 | 0 | 1 | CMW |
| 298 | 2 | 2,6,Me$_2$Ph | Me | Me | N | N | Cl | Cl | 1 | 0 | 0 | 1 | CMW |
| 299 | 3 | 2,6,Me$_2$Ph | Me | Me | N | N | Cl | Cl | 1 | 0 | 0 | 1 | CMW |
| 300 | 1 | 2,4,6-Me$_3$Ph | H | H | N | N | Cl | Cl | 1 | 0 | 0 | 1 | CMW |
| 301 | 2 | 2,4,6-Me$_3$Ph | H | H | N | N | Cl | Cl | 1 | 0 | 0 | 1 | CMW |
| 302 | 3 | 2,4,6-Me$_3$Ph | H | H | N | N | Cl | Cl | 1 | 0 | 0 | 1 | CMW |
| 303 | 1 | 2,4,6-Me$_3$Ph | Me | Me | N | N | Cl | Cl | 1 | 0 | 0 | 1 | CMW |
| 304 | 2 | 2,4,6-Me$_3$Ph | Me | Me | N | N | Cl | Cl | 1 | 0 | 0 | 1 | CMW |
| 305 | 3 | 2,4,6-Me$_3$Ph | Me | Me | N | N | Cl | Cl | 1 | 0 | 0 | 1 | CMW |
| 306 | 1 | 2,6-iPr$_2$Ph | H | H | N | N | Cl | Cl | 1 | 0 | 0 | 1 | TZH |
| 307 | 2 | 2,6-iPr$_2$Ph | H | H | N | N | Cl | Cl | 1 | 0 | 0 | 1 | TZH |
| 308 | 3 | 2,6-iPr$_2$Ph | H | H | N | N | Cl | Cl | 1 | 0 | 0 | 1 | TZH |
| 309 | 1 | 2,6-iPr$_2$Ph | Me | Me | N | N | Cl | Cl | 1 | 0 | 0 | 1 | TZH |
| 310 | 2 | 2,6-iPr$_2$Ph | Me | Me | N | N | Cl | Cl | 1 | 0 | 0 | 1 | TZH |
| 311 | 3 | 2,6-iPr$_2$Ph | Me | Me | N | N | Cl | Cl | 1 | 0 | 0 | 1 | TZH |
| 312 | 1 | 2,6-Me$_2$Ph | H | H | N | N | Cl | Cl | 1 | 0 | 0 | 1 | TZH |
| 313 | 2 | 2,6-Me$_2$Ph | H | H | N | N | Cl | Cl | 1 | 0 | 0 | 1 | TZH |
| 314 | 3 | 2,6-Me$_2$Ph | H | H | N | N | Cl | Cl | 1 | 0 | 0 | 1 | TZH |
| 315 | 1 | 2,6-Me$_2$Ph | Me | Me | N | N | Cl | Cl | 1 | 0 | 0 | 1 | TZH |
| 316 | 2 | 2,6-Me$_2$Ph | Me | Me | N | N | Cl | Cl | 1 | 0 | 0 | 1 | TZH |
| 317 | 3 | 2,6-Me$_2$Ph | Me | Me | N | N | Cl | Cl | 1 | 0 | 0 | 1 | TZH |
| 318 | 1 | 2,4,6-Me$_3$Ph | H | H | N | N | Cl | Cl | 1 | 0 | 0 | 1 | TZH |

TABLE I-continued

Ia'

| | n | R¹/R⁴ | R²/R³ | R⁵/R⁶ | A¹ | A² | L¹ | L²' | a | b | c | d | Z |
|---|---|---|---|---|---|---|---|---|---|---|---|---|---|
| 319 | 2 | 2,4,6-Me₃Ph | H | H | N | N | Cl | Cl | 1 | 0 | 0 | 1 | TZH |
| 320 | 3 | 2,4,6-Me₃Ph | H | H | N | N | Cl | Cl | 1 | 0 | 0 | 1 | TZH |
| 321 | 1 | 2,4,6-Me₃Ph | Me | Me | N | N | Cl | Cl | 1 | 0 | 0 | 1 | TZH |
| 322 | 2 | 2,4,6-Me₃Ph | Me | Me | N | N | Cl | Cl | 1 | 0 | 0 | 1 | TZH |
| 323 | 3 | 2,4,6-Me₃Ph | Me | Me | N | N | Cl | Cl | 1 | 0 | 0 | 1 | TZH | e = the group $(CH_2)_3CO_2Me$
*L' is Cl, Br or I for #'s 288 to 323;
An = 1,8-naphthalene;
j is the group —$C(Me)_2$—$CH_2$—$C(Me)_2$—;
e = the group $(CH_2)_3CO_2Me$ and
N/A = not applicable.;
k = —$SCH_2CH_2S$—
Note - In Table I, above, the following convention and abbreviations are used. For R¹ and R⁴, when a substituted phenyl ring is present, the amount of substitution is indicated by the number of numbers indicating positions on the phenyl ring, as, for example, 2,6-iPr₂Ph represents 2,6-diisopropyl phenyl; iPr = isopropyl; Pr = propyl; Me = methyl; Et = ethyl; t-Bu = tert-butyl; Ph = phenyl; Np = naphthyl; An = 1,8-naphthalene; j is the group —$C(Me)_2$—$CH_2$—$C(Me)_2$—; and e is the group $(CH_2)_3$CO₂Me—, SY = Sc or Y; CMW = Cr, Mo or W; TZH = Ti, Zr, or Hf and N/A = not applicable.

The typical tridentate ligand containing transition metal pre-catalyst compounds may, for example, be represented by the formula:

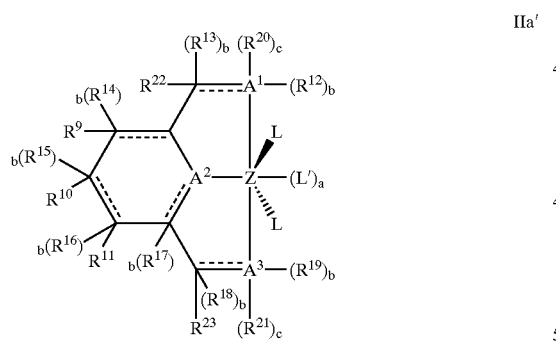

IIa' wherein:

$R^{20}$ and $R^{21}$ are each independently selected from hydrogen, or an unsubstituted or substituted aryl group wherein said substitution is an alkyl or a functional hetero group which is inert with respect to the contemplated polymerization;

$R^{22}$ and $R^{23}$ are each independently selected from hydrogen, an unsubstituted or substituted $C_1-C_{20}$ (preferably $C_1-C_6$) hydrocarbyl as, for example, alkyl (methyl, ethyl, propyl, pentyl and the like); aryl (phenyl, toluyl and the like) or a functional group which is inert with respect to the polymerization (e.g., nitro, halo and the like);

$R^9$ to $R^{19}$ are each independently selected from hydrogen, an unsubstituted or substituted $C_1-C_{20}$ hydrocarbyl or an inert functional group, all as described above for $R^7$;

a is an integer as defined above;

b and c are each independently 0 or 1 and represent whether their associated R group is present or not;

Z is a transition metal as defined above, preferably Fe(II), Co(II) or Fe(III);

each $A^1$ to $A^3$ is independently selected as defined in connection with A of Formula Ia';

and each L and L' is independently selected from a halogen such as chlorine, bromine, iodine or a $C_1-C_8$ (preferably $C_1-C_5$) alkyl, or any two L groups, together in combination, represent an unsubstituted or substituted, saturated or unsaturated, hydrocarbon group, such as a hydrocarbylene group, which together with Z forms a cyclic group, preferably a 3 to 7, most preferably 3 to 5 member ring cyclic group.

Preferred compounds of IIa' are those wherein each $R^9$, $R^{10}$ and $R^{11}$ are hydrogen; b is 0, c is 1, and $R^{22}$ and $R^{23}$ are each independently selected from halogen, hydrogen or a $C_1-C_6$ alkyl, preferably each is independently selected from methyl or hydrogen; and wherein $R^{20}$ and $R^{21}$ of IIa' are each an aryl or substituted aryl group, preferably wherein the aryl contains substitution in the 2 position, the 2, 6 positions or the 2, 4, 6 positions which is selected from a $C_1-C_6$ (most preferably $C_1-C_3$) alkyl and the remaining positions are each independently selected from hydrogen (most preferred), halogen or a $C_1-C_6$ (preferably $C_1-C_3$) alkyl.

Illustrative examples of tridentate ligand containing transition metal pre-catalyst compounds which are useful in providing the catalyst composition of the present invention are compounds of Formula IIa' having the following combination of groups shown in Table II below:

TABLE II

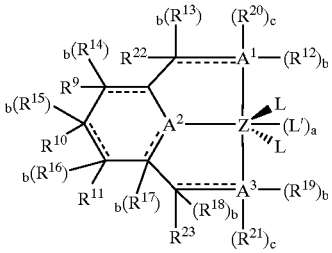

IIa'

| # | $R^{20}/R^{21}$ | $R^{22}/R^{23}$ | $R^9$ | $R^{10}$ | $R^{11}$ | $A^1$ | $A^2$ | $A^3$ | a | b | c | L | L' | Z |
|---|---|---|---|---|---|---|---|---|---|---|---|---|---|---|
| 1 | 2,6-iPr$_2$Ph | Me | H | H | H | N | N | N | 0 | 0 | 1 | * | NA | Fe |
| 2 | 2,6-Cl$_2$Ph | Me | H | H | H | N | N | N | 0 | 0 | 1 | * | NA | Fe |
| 3 | 2,6-Cl$_2$Ph | Me | H | H | H | N | N | N | 0 | 0 | 1 | * | NA | Fe |
| 4 | 2,6-Br$_2$Ph | Me | H | H | H | N | N | N | 0 | 0 | 1 | * | NA | Fe |
| 5 | 2,6-Br$_2$Ph | Me | H | H | H | N | N | N | 0 | 0 | 1 | * | NA | Fe |
| 6 | 2,6-Br$_2$-4-Me—Ph | Me | H | H | H | N | N | N | 0 | 0 | 1 | * | NA | Fe |
| 7 | 2,6-Cl$_2$-4-Me—Ph | Me | H | H | H | N | N | N | 0 | 0 | 1 | * | NA | Fe |
| 8 | 2,5-iPr$_2$C$_4$H$_2$N | Me | H | H | H | N | N | N | 0 | 0 | 1 | * | NA | Fe |
| 9 | 2,5-iPr$_2$C$_4$H$_2$N | Me | H | H | H | N | N | N | 0 | 0 | 1 | * | NA | Fe |
| 10 | 2-t-BuPh | Me | H | H | H | N | N | N | 0 | 0 | 1 | * | NA | Fe |
| 11 | Ph | Me | H | H | H | N | N | N | 0 | 0 | 1 | * | NA | Fe |
| 12 | 2,6-iPr$_2$Ph | Me | H | Me | H | N | N | N | 0 | 0 | 1 | * | NA | Fe |
| 13 | 2,6-iPr$_2$Ph | Me | H | Me | H | N | N | N | 0 | 0 | 1 | * | NA | Fe |
| 14 | 2-t-BuPh | Me | H | Me | H | N | N | N | 0 | 0 | 1 | * | NA | Fe |
| 15 | Ph | Me | H | Me | H | N | N | N | 0 | 0 | 1 | * | NA | Fe |
| 16 | 2,6-iPr$_2$Ph | Me | Me | Me | Me | N | N | N | 0 | 0 | 1 | * | NA | Fe |
| 17 | 2,6-iPr$_2$Ph | Me | Me | Me | Me | N | N | N | 0 | 0 | 1 | * | NA | Fe |
| 18 | 2-t-BuPh | Me | Me | Me | Me | N | N | N | 0 | 0 | 1 | * | NA | Fe |
| 19 | Ph | Me | Me | Me | Me | N | N | N | 0 | 0 | 1 | * | NA | Fe |
| 20 | 2,4,6-Me$_3$Ph | Me | H | H | H | N | N | N | 0 | 0 | 1 | * | NA | Fe |
| 21 | 2,5-iPr$_2$C$_4$H$_2$N | Me | H | H | H | N | N | N | 0 | 0 | 1 | * | NA | Fe |
| 22 | 2,3,4,5,6-Me$_5$Ph | Me | H | H | H | N | N | N | 0 | 0 | 1 | * | NA | Fe |
| 23 | (2-tBuMe$_2$Sil)Bz | Me | H | H | H | N | N | N | 0 | 0 | 1 | * | NA | Fe |
| 24 | (2-Me$_3$Sil)Bz | Me | H | H | H | N | N | N | 0 | 0 | 1 | * | NA | Fe |
| 25 | (2-PhMe$_2$Sil)Bz | Me | H | H | H | N | N | N | 0 | 0 | 1 | * | NA | Fe |
| 26 | (2-PhMeSil)Bz | Me | H | H | H | N | N | N | 0 | 0 | 1 | * | NA | Fe |
| 27 | (2-Me$_2$Sil)Bz | Me | H | H | H | N | N | N | 0 | 0 | 1 | * | NA | Fe |
| 28 | 2,6-iPr$_2$Ph | Me | H | H | H | N | N | N | 0 | 0 | 1 | * | NA | Co |
| 29 | 2,5-iPr$_2$C$_4$H$_2$N | Me | H | H | H | N | N | N | 0 | 0 | 1 | * | NA | Co |
| 30 | 2-t-BuPh | Me | H | H | H | N | N | N | 0 | 0 | 1 | * | NA | Co |
| 31 | Ph | Me | H | H | H | N | N | N | 0 | 0 | 1 | * | NA | Co |
| 32 | 2,6-iPr$_2$Ph | Me | H | Me | H | N | N | N | 0 | 0 | 1 | * | NA | Co |
| 33 | 2,6-iPr$_2$Ph | Me | H | Me | H | N | N | N | 0 | 0 | 1 | * | NA | Co |
| 34 | 2-t-BuPh | Me | H | Me | H | N | N | N | 0 | 0 | 1 | * | NA | Co |
| 35 | Ph | Me | H | Me | H | N | N | N | 0 | 0 | 1 | * | NA | Co |
| 36 | 2,6-iPr$_2$Ph | Me | Me | Me | Me | N | N | N | 0 | 0 | 1 | * | NA | Co |
| 37 | 2,6-iPr$_2$Ph | Me | Me | Me | Me | N | N | N | 0 | 0 | 1 | * | NA | Co |
| 38 | 2-t-BuPh | Me | Me | Me | Me | N | N | N | 0 | 0 | 1 | * | NA | Co |
| 39 | Ph | Me | Me | Me | Me | N | N | N | 0 | 0 | 1 | * | NA | Co |
| 40 | 2,4,6-(Me)$_3$Ph | Me | H | H | H | N | N | N | 0 | 0 | 1 | * | NA | Co |
| 41 | 2,3,4,5,6-Me$_5$Ph | Me | H | H | H | N | N | N | 0 | 0 | 1 | * | NA | Co |
| 42 | (2-tBuMe$_2$Sil)Bz | Me | H | H | H | N | N | N | 0 | 0 | 1 | * | NA | Co |
| 43 | 2-MePh | Me | H | H | H | N | N | N | 0 | 0 | 1 | * | NA | Fe |
| 44 | (2-Me$_3$Sil)Bz | Me | H | H | H | N | N | N | 0 | 0 | 1 | * | NA | Co |
| 45 | (2-PhMe$_2$Sil)Bz | Me | H | H | H | N | N | N | 0 | 0 | 1 | * | NA | Co |
| 46 | (2-PhMeSil)Bz | Me | H | H | H | N | N | N | 0 | 0 | 1 | * | NA | Co |
| 47 | (2-Me$_3$Sil)Bz | Me | H | H | H | O | N | 0 | 0 | 0 | 0 | * | NA | Co |
| 48 | NA | Me | H | H | H | O | N | 0 | 0 | 0 | 0 | * | NA | Fe |
| 49 | NA | Me | H | Me | H | O | N | 0 | 0 | 0 | 0 | * | NA | Fe |
| 50 | NA | i-Pr | H | H | H | O | N | 0 | 0 | 0 | 0 | * | NA | Fe |
| 51 | NA | i-Pr | H | Me | H | O | N | 0 | 0 | 0 | 0 | * | NA | Fe |
| 52 | NA | i-Pr | Me | Me | Me | O | N | 0 | 0 | 0 | 0 | * | NA | Fe |
| 53 | NA | Ph | H | H | H | O | N | 0 | 0 | 0 | 0 | * | NA | Fe |
| 54 | NA | Ph | H | Me | H | O | N | 0 | 0 | 0 | 0 | * | NA | Fe |
| 55 | NA | Me | H | H | H | O | N | 0 | 0 | 0 | 0 | * | NA | Co |
| 56 | NA | Me | H | Me | H | O | N | 0 | 0 | 0 | 0 | * | NA | Co |
| 57 | NA | i-Pr | H | H | H | O | N | 0 | 0 | 0 | 0 | * | NA | Co |
| 58 | NA | i-Pr | H | Me | H | O | N | 0 | 0 | 0 | 0 | * | NA | Co |
| 59 | NA | i-Pr | Me | Me | Me | O | N | 0 | 0 | 0 | 0 | * | NA | Co |
| 60 | NA | Ph | H | H | H | O | N | 0 | 0 | 0 | 0 | * | NA | Co |
| 61 | NA | Ph | H | Me | H | O | N | 0 | 0 | 0 | 0 | * | NA | Co |
| 62 | 2,6-iPr$_2$Ph | Me | H | H | H | N | N | N | 1 | 0 | 1 | * | H$_2$O | Fe |
| 63 | 2,6-iPr$_2$Ph | Me | H | H | H | N | N | N | 1 | 0 | 1 | * | THF | Fe |

TABLE II-continued

IIa'

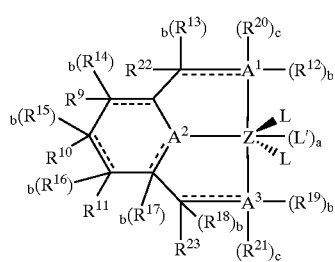

| # | R20/R21 | R22/R23 | R9 | R10 | R11 | A1 | A2 | A3 | a | b | c | L | L' | Z |
|---|---|---|---|---|---|---|---|---|---|---|---|---|---|---|
| 64 | 2,6-iPr2Ph | Me | H | H | H | N | N | N | 1 | 0 | 1 | * | ROH | Fe |
| 65 | 2,6-iPr2Ph | Me | H | H | H | N | N | N | 1 | 0 | 1 | * | RSH | Fe |
| 66 | 2,6-iPr2Ph | Me | H | H | H | N | N | N | 1 | 0 | 1 | * | RNH2 | Fe |
| 67 | 2,6-Cl2Ph | Me | H | H | H | N | N | N | 1 | 0 | 1 | * | H2O | Fe |
| 68 | 2,6-Cl2Ph | Me | H | H | H | N | N | N | 1 | 0 | 1 | * | THF | Fe |
| 69 | 2,6-Cl2Ph | Me | H | H | H | N | N | N | 1 | 0 | 1 | * | ROH | Fe |
| 70 | 2,6-Cl2Ph | Me | H | H | H | N | N | N | 1 | 0 | 1 | * | RSH | Fe |
| 71 | 2,6-Cl2Ph | Me | H | H | H | N | N | N | 1 | 0 | 1 | * | RNH2 | Fe |
| 72 | 2,6-Br2Ph | Me | H | H | H | N | N | N | 1 | 0 | 1 | * | H2O | Fe |
| 73 | 2,6-Br2Ph | Me | H | H | H | N | N | N | 1 | 0 | 1 | * | THF | Fe |
| 74 | 2,6-Br2Ph | Me | H | H | H | N | N | N | 1 | 0 | 1 | * | ROH | Fe |
| 75 | 2,6-Br2Ph | Me | H | H | H | N | N | N | 1 | 0 | 1 | * | RSH | Fe |
| 76 | 2,6-Br2Ph | Me | H | H | H | N | N | N | 1 | 0 | 1 | * | RNH2 | Fe |
| 77 | 2,6-Br2-4-Me—Ph | Me | H | H | H | N | N | N | 1 | 0 | 1 | * | H2O | Fe |
| 78 | 2,6-Br2-4-Me—Ph | Me | H | H | H | N | N | N | 1 | 0 | 1 | * | THF | Fe |
| 79 | 2,6-Br2-4-Me—Ph | Me | H | H | H | N | N | N | 1 | 0 | 1 | * | ROH | Fe |
| 80 | 2,6-Br2-4-Me—Ph | Me | H | H | H | N | N | N | 1 | 0 | 1 | * | RSH | Fe |
| 81 | 2,6-Br2-4-Me—Ph | Me | H | H | H | N | N | N | 1 | 0 | 1 | * | RNH2 | Fe |
| 82 | 2,6-Cl2-4-Me—Ph | Me | H | H | H | N | N | N | 1 | 0 | 1 | * | H2O | Fe |
| 83 | 2,6-Cl2-4-Me—Ph | Me | H | H | H | N | N | N | 1 | 0 | 1 | * | THF | Fe |
| 84 | 2,6-Cl2-4-Me—Ph | Me | H | H | H | N | N | N | 1 | 0 | 1 | * | ROH | Fe |
| 85 | 2,6-Cl2-4-Me—Ph | Me | H | H | H | N | N | N | 1 | 0 | 1 | * | RSH | Fe |
| 86 | 2,6-Cl2-4-Me—Ph | Me | H | H | H | N | N | N | 1 | 0 | 1 | * | RNH2 | Fe |
| 87 | 2,5-iPr2C4H2N | Me | H | H | H | N | N | N | 1 | 0 | 1 | * | H2O | Fe |
| 88 | 2,5-iPr2C4H2N | Me | H | H | H | N | N | N | 1 | 0 | 1 | * | THF | Fe |
| 89 | 2,5-iPr2C4H2N | Me | H | H | H | N | N | N | 1 | 0 | 1 | * | ROH | Fe |
| 90 | 2,5-iPr2C4H2N | Me | H | H | H | N | N | N | 1 | 0 | 1 | * | RSH | Fe |
| 91 | 2,5-iPr2C4H2N | Me | H | H | H | N | N | N | 1 | 0 | 1 | * | RNH2 | Fe |
| 92 | 2,5-Me2C4H2N | Me | H | H | H | N | N | N | 1 | 0 | 1 | * | H2O | Fe |
| 93 | 2,5-Me2C4H2N | Me | H | H | H | N | N | N | 1 | 0 | 1 | * | THF | Fe |
| 94 | 2,5-Me2C4H2N | Me | H | H | H | N | N | N | 1 | 0 | 1 | * | ROH | Fe |
| 95 | 2,5-Me2C4H2N | Me | H | H | H | N | N | N | 1 | 0 | 1 | * | RSH | Fe |
| 96 | 2,5-Me2C4H2N | Me | H | H | H | N | N | N | 1 | 0 | 1 | * | RNH2 | Fe |
| 97 | 2-t-BuPh | Me | H | H | H | N | N | N | 0 | 0 | 1 | * | N/A | Fe |
| 98 | 2-t-BuPh | Me | H | H | H | N | N | N | 1 | 0 | 1 | * | H2O | Fe |
| 99 | 2-t-BuPh | Me | H | H | H | N | N | N | 1 | 0 | 1 | * | THF | Fe |
| 100 | 2-t-BuPh | Me | H | H | H | N | N | N | 1 | 0 | 1 | * | ROH | Fe |
| 101 | 2-t-BuPh | Me | H | H | H | N | N | N | 1 | 0 | 1 | * | RSH | Fe |
| 102 | 2-t-BuPh | Me | H | H | H | N | N | N | 1 | 0 | 1 | * | RNH2 | Fe |
| 103 | 2-Et—Ph | Me | H | H | H | N | N | N | 0 | 0 | 1 | * | NA | Fe |
| 104 | 2-Et—Ph | Me | H | H | H | N | N | N | 1 | 0 | 1 | * | H2O | Fe |
| 105 | 2-EtPh | Me | H | H | H | N | N | N | 1 | 0 | 1 | * | THF | Fe |
| 106 | 2-EtPh | Me | H | H | H | N | N | N | 1 | 0 | 1 | * | ROH | Fe |
| 107 | 2-EtPh | Me | H | H | H | N | N | N | 1 | 0 | 1 | * | RSH | Fe |
| 108 | 2-EtPh | Me | H | H | H | N | N | N | 1 | 0 | 1 | * | RNH2 | Fe |
| 109 | 2-Me—Ph | Me | H | H | H | N | N | N | 0 | 0 | 1 | * | NA | Fe |
| 110 | 2-Me—Ph | Me | H | H | H | N | N | N | 1 | 0 | 1 | * | H2O | Fe |
| 111 | 2-Me—Ph | Me | H | H | H | N | N | N | 1 | 0 | 1 | * | THF | Fe |
| 112 | 2-Me—Ph | Me | H | H | H | N | N | N | 1 | 0 | 1 | * | ROH | Fe |
| 113 | 2-Me—Ph | Me | H | H | H | N | N | N | 1 | 0 | 1 | * | RSH | Fe |
| 114 | 2-Me—Ph | Me | H | H | H | N | N | N | 1 | 0 | 1 | * | RNH2 | Fe |
| 115 | Ph | Me | H | H | H | N | N | N | 0 | 0 | 1 | * | NA | Fe |
| 116 | Ph | Me | H | H | H | N | N | N | 1 | 0 | 1 | * | H2O | Fe |
| 117 | Ph | Me | H | H | H | N | N | N | 1 | 0 | 1 | * | THF | Fe |
| 118 | Ph | Me | H | H | H | N | N | N | 1 | 0 | 1 | * | ROH | Fe |
| 119 | Ph | Me | H | H | H | N | N | N | 1 | 0 | 1 | * | RSH | Fe |
| 120 | Ph | Me | H | H | H | N | N | N | 1 | 0 | 1 | * | RNH2 | Fe |
| 121 | 2,6-iPr2Ph | Me | H | H | H | N | N | N | 1 | 0 | 1 | * | H2O | Fe |
| 122 | 2,6-iPr2Ph | Me | H | H | H | N | N | N | 1 | 0 | 1 | * | THF | Fe |
| 123 | 2,6-iPr2Ph | Me | H | H | H | N | N | N | 1 | 0 | 1 | * | ROH | Fe |
| 124 | 2,6-iPr2Ph | Me | H | H | H | N | N | N | 1 | 0 | 1 | * | RSH | Fe |
| 125 | 2,6-iPr2Ph | Me | H | H | H | N | N | N | 1 | 0 | 1 | * | RNH2 | Fe |
| 126 | 2,6-iPr2Ph | H | H | H | H | N | N | N | 1 | 0 | 1 | * | H2O | Fe |

TABLE II-continued

IIa'

| # | R20/R21 | R22/R23 | R9 | R10 | R11 | A1 | A2 | A3 | a | b | c | L | L' | Z |
|---|---|---|---|---|---|---|---|---|---|---|---|---|---|---|
| 127 | 2,6-iPr2Ph | H | H | H | H | N | N | N | 1 | 0 | 1 | * | THF | Fe |
| 128 | 2,6-iPr2Ph | H | H | H | H | N | N | N | 1 | 0 | 1 | * | ROH | Fe |
| 129 | 2,6-iPr2Ph | H | H | H | H | N | N | N | 1 | 0 | 1 | * | RSH | Fe |
| 130 | 2,6-iPr2Ph | H | H | H | H | N | N | N | 1 | 0 | 1 | * | RNH2 | Fe |
| 131 | 2,6-Cl2Ph | H | H | H | H | N | N | N | 1 | 0 | 1 | * | H2O | Fe |
| 132 | 2,6-Cl2Ph | H | H | H | H | N | N | N | 1 | 0 | 1 | * | THF | Fe |
| 133 | 2,6-Cl2Ph | H | H | H | H | N | N | N | 1 | 0 | 1 | * | ROH | Fe |
| 134 | 2,6-Cl2Ph | H | H | H | H | N | N | N | 1 | 0 | 1 | * | RSH | Fe |
| 135 | 2,6-Cl2Ph | H | H | H | H | N | N | N | 1 | 0 | 1 | * | RNH2 | Fe |
| 136 | 2,6-Br2Ph | H | H | H | H | N | N | N | 1 | 0 | 1 | * | H2O | Fe |
| 137 | 2,6-Br2Ph | H | H | H | H | N | N | N | 1 | 0 | 1 | * | THF | Fe |
| 138 | 2,6-Br2Ph | H | H | H | H | N | N | N | 1 | 0 | 1 | * | ROH | Fe |
| 139 | 2,6-Br2Ph | H | H | H | H | N | N | N | 1 | 0 | 1 | * | RSH | Fe |
| 140 | 2,6-Br2Ph | H | H | H | H | N | N | N | 1 | 0 | 1 | * | RNH2 | Fe |
| 141 | 2,6-Br2-4-Me—Ph | H | H | H | H | N | N | N | 1 | 0 | 1 | * | H2O | Fe |
| 142 | 2,6-Br2-4-Me—Ph | H | H | H | H | N | N | N | 1 | 0 | 1 | * | THF | Fe |
| 143 | 2,6-Br2-4-Me—Ph | H | H | H | H | N | N | N | 1 | 0 | 1 | * | ROH | Fe |
| 144 | 2,6-Br2-4-Me—Ph | H | H | H | H | N | N | N | 1 | 0 | 1 | * | RSH | Fe |
| 145 | 2,6-Br2-4-Me—Ph | H | H | H | H | N | N | N | 1 | 0 | 1 | * | RNH2 | Fe |
| 146 | 2,6-Cl2-4-Me—Ph | H | H | H | H | N | N | N | 1 | 0 | 1 | * | H2O | Fe |
| 147 | 2,6-Cl2-4-Me—Ph | H | H | H | H | N | N | N | 1 | 0 | 1 | * | THF | Fe |
| 148 | 2,6-Cl2-4-Me—Ph | H | H | H | H | N | N | N | 1 | 0 | 1 | * | ROH | Fe |
| 149 | 2,6-Cl2-4-Me—Ph | H | H | H | H | N | N | N | 1 | 0 | 1 | * | RSH | Fe |
| 150 | 2,6-Cl2-4-Me—Ph | H | H | H | H | N | N | N | 1 | 0 | 1 | * | RNH2 | Fe |
| 151 | 2,5-iPr2C4H2N | H | H | H | H | N | N | N | 1 | 0 | 1 | * | H2O | Fe |
| 152 | 2,5-iPr2C4H2N | H | H | H | H | N | N | N | 1 | 0 | 1 | * | THF | Fe |
| 153 | 2,5-iPr2C4H2N | H | H | H | H | N | N | N | 1 | 0 | 1 | * | ROH | Fe |
| 154 | 2,5-iPr2C4H2N | H | H | H | H | N | N | N | 1 | 0 | 1 | * | RSH | Fe |
| 155 | 2,5-iPr2C4H2N | H | H | H | H | N | N | N | 1 | 0 | 1 | * | RNH2 | Fe |
| 156 | 2,5-Me2C4H2N | H | H | H | H | N | N | N | 1 | 0 | 1 | * | H2O | Fe |
| 157 | 2,5-Me2C4H2N | H | H | H | H | N | N | N | 1 | 0 | 1 | * | THF | Fe |
| 158 | 2,5-Me2C4H2N | H | H | H | H | N | N | N | 1 | 0 | 1 | * | ROH | Fe |
| 159 | 2,5-Me2C4H2N | H | H | H | H | N | N | N | 1 | 0 | 1 | * | RSH | Fe |
| 160 | 2,5-Me2C4H2N | H | H | H | H | N | N | N | 1 | 0 | 1 | * | RNH2 | Fe |
| 161 | 2-t-BuPh | H | H | H | H | N | N | N | 0 | 0 | 1 | * | N/A | Fe |
| 162 | 2-t-BuPh | H | H | H | H | N | N | N | 1 | 0 | 1 | * | H2O | Fe |
| 163 | 2-t-BuPh | H | H | H | H | N | N | N | 1 | 0 | 1 | * | THF | Fe |
| 164 | 2-t-BuPh | H | H | H | H | N | N | N | 1 | 0 | 1 | * | ROH | Fe |
| 165 | 2-t-BuPh | H | H | H | H | N | N | N | 1 | 0 | 1 | * | RSH | Fe |
| 166 | 2-t-BuPh | H | H | H | H | N | N | N | 1 | 0 | 1 | * | RNH2 | Fe |
| 167 | 2-Et—Ph | H | H | H | H | N | N | N | 0 | 0 | 1 | * | NA | Fe |
| 168 | 2-Et—Ph | H | H | H | H | N | N | N | 1 | 0 | 1 | * | H2O | Fe |
| 169 | 2-EtPh | H | H | H | H | N | N | N | 1 | 0 | 1 | * | THF | Fe |
| 170 | 2-EtPh | H | H | H | H | N | N | N | 1 | 0 | 1 | * | ROH | Fe |
| 171 | 2-EtPh | H | H | H | H | N | N | N | 1 | 0 | 1 | * | RSH | Fe |
| 172 | 2-EtPh | H | H | H | H | N | N | N | 1 | 0 | 1 | * | RNH2 | Fe |
| 173 | 2-Me—Ph | H | H | H | H | N | N | N | 0 | 0 | 1 | * | NA | Fe |
| 174 | 2-Me—Ph | H | H | H | H | N | N | N | 1 | 0 | 1 | * | H2O | Fe |
| 175 | 2-Me—Ph | H | H | H | H | N | N | N | 1 | 0 | 1 | * | THF | Fe |
| 176 | 2-Me—Ph | H | H | H | H | N | N | N | 1 | 0 | 1 | * | ROH | Fe |
| 177 | 2-Me—Ph | H | H | H | H | N | N | N | 1 | 0 | 1 | * | RSH | Fe |
| 178 | 2-Me—Ph | H | H | H | H | N | N | N | 1 | 0 | 1 | * | RNH2 | Fe |
| 179 | Ph | H | H | H | H | N | N | N | 0 | 0 | 1 | * | NA | Fe |
| 180 | Ph | H | H | H | H | N | N | N | 1 | 0 | 1 | * | H2O | Fe |
| 181 | Ph | H | H | H | H | N | N | N | 1 | 0 | 1 | * | THF | Fe |
| 182 | Ph | H | H | H | H | N | N | N | 1 | 0 | 1 | * | ROH | Fe |
| 183 | Ph | H | H | H | H | N | N | N | 1 | 0 | 1 | * | RSH | Fe |
| 184 | Ph | H | H | H | H | N | N | N | 1 | 0 | 1 | * | RNH2 | Fe |
| 185 | 2,6-iPr2Ph | H | H | H | H | N | N | N | 0 | 0 | 1 | * | NA | Fe |
| 186 | 2,6-iPr2Ph | H | H | H | H | N | N | N | 1 | 0 | 1 | * | H2O | Fe |
| 187 | 2,6-iPr2Ph | H | H | H | H | N | N | N | 1 | 0 | 1 | * | THF | Fe |
| 188 | 2,6-iPr2Ph | H | H | H | H | N | N | N | 1 | 0 | 1 | * | ROH | Fe |
| 189 | 2,6-iPr2Ph | H | H | H | H | N | N | N | 1 | 0 | 1 | * | RSH | Fe |

TABLE II-continued

IIa'

| # | R20/R21 | R22/R23 | R9 | R10 | R11 | A1 | A2 | A3 | a | b | c | L | L' | Z |
|---|---------|---------|-----|------|------|-----|-----|-----|---|---|---|---|-----|-----|
| 190 | 2,6-iPr$_2$Ph | H | H | H | H | N | N | N | 1 | 0 | 1 | * | RNH$_2$ | Fe |
| 191 | 2,6-iPr$_2$Ph | Me | Me | Me | Me | N | N | N | 0 | 0 | 1 | * | NA | Fe |
| 192 | 2,6-iPr$_2$Ph | Me | Me | Me | Me | N | N | N | 0 | 0 | 1 | * | NA | Fe |
| 193 | 2-t-BuPh | Me | Me | Me | Me | N | N | N | 0 | 0 | 1 | * | NA | Fe |
| 194 | Ph | Me | Me | Me | Me | N | N | N | 0 | 0 | 1 | * | NA | Fe |
| 195 | 2,4,6-Me$_3$Ph | Me | H | H | H | N | N | N | 0 | 0 | 1 | * | NA | Fe |
| 196 | 2,5-iPr$_2$C$_4$H$_2$N | Me | H | H | H | N | N | N | 0 | 0 | 1 | * | NA | Fe |
| 197 | 2,3,4,5,6-Me$_5$Ph | Me | H | H | H | N | N | N | 0 | 0 | 1 | * | NA | Fe |
| 198 | (2-tBuMe$_2$Sil)Bz | Me | H | H | H | N | N | N | 0 | 0 | 1 | * | NA | Fe |
| 199 | (2-Me$_3$Sil)Bz | Me | H | H | H | N | N | N | 0 | 0 | 1 | * | NA | Fe |
| 200 | (2-PhMe$_2$Sil)Bz | Me | H | H | H | N | N | N | 0 | 0 | 1 | * | NA | Fe |
| 201 | (2-PhMeSil)Bz | Me | H | H | H | N | N | N | 0 | 0 | 1 | * | NA | Fe |
| 202 | (2-Me$_2$Sil)Bz | Me | H | H | H | N | N | N | 0 | 0 | 1 | * | NA | Fe |
| 203 | 2,6-iPr$_2$Ph | Me | H | H | H | N | N | N | 0 | 0 | 1 | * | NA | Co |
| 204 | 2,5-iPr$_2$C$_4$H$_2$N | Me | H | H | H | N | N | N | 0 | 0 | 1 | * | NA | Co |
| 205 | 2-t-BuPh | Me | H | H | H | N | N | N | 0 | 0 | 1 | * | NA | Co |
| 206 | Ph | Me | H | H | H | N | N | N | 0 | 0 | 1 | * | NA | Co |
| 207 | 2,6-iPr$_2$Ph | Me | H | Me | H | N | N | N | 0 | 0 | 1 | * | NA | Co |
| 208 | 2,6-iPr$_2$Ph | Me | H | Me | H | N | N | N | 0 | 0 | 1 | * | NA | Co |
| 209 | 2-t-BuPh | Me | H | Me | H | N | N | N | 0 | 0 | 1 | * | NA | Co |
| 210 | Ph | Me | H | Me | H | N | N | N | 0 | 0 | 1 | * | NA | Co |
| 211 | 2,6-iPr$_2$Ph | Me | Me | Me | Me | N | N | N | 0 | 0 | 1 | * | NA | Co |
| 212 | 2,6-iPr$_2$Ph | Me | Me | Me | Me | N | N | N | 0 | 0 | 1 | * | NA | Co |
| 213 | 2-t-BuPh | Me | Me | Me | Me | N | N | N | 0 | 0 | 1 | * | NA | Co |
| 214 | Ph | Me | Me | Me | Me | N | N | N | 0 | 0 | 1 | * | NA | Co |
| 215 | 2,4,6-(Me)$_3$Ph | Me | H | H | H | N | N | N | 0 | 0 | 1 | * | NA | Co |
| 216 | 2,3,4,5,6-Me$_5$Ph | Me | H | H | H | N | N | N | 0 | 0 | 1 | * | NA | Co |
| 217 | (2-tBuMe$_2$Sil)Bz | Me | H | H | H | N | N | N | 0 | 0 | 1 | * | NA | Co |
| 218 | 2-MePh | Me | H | H | H | N | N | N | 0 | 0 | 1 | * | NA | Fe |
| 219 | (2-Me$_3$Sil)Bz | Me | H | H | H | N | N | N | 0 | 0 | 1 | * | NA | Co |
| 220 | (2-PhMe$_2$Sil)Bz | Me | H | H | H | N | N | N | 0 | 0 | 1 | * | NA | Co |
| 221 | (2-PhMeSil)Bz | Me | H | H | H | N | N | N | 0 | 0 | 1 | * | NA | Co |
| 222 | (2-Me$_3$Sil)Bz | Me | H | H | H | O | N | 0 | 0 | 0 | 0 | * | NA | Co |
| 223 | NA | Me | H | H | H | O | N | 0 | 0 | 0 | 0 | * | NA | Fe |
| 224 | NA | Me | H | Me | H | O | N | 0 | 0 | 0 | 0 | * | NA | Fe |
| 225 | NA | i-Pr | H | H | H | O | N | 0 | 0 | 0 | 0 | * | NA | Fe |
| 226 | NA | i-Pr | H | Me | H | O | N | 0 | 0 | 0 | 0 | * | NA | Fe |
| 227 | NA | i-Pr | Me | Me | Me | O | N | 0 | 0 | 0 | 0 | * | NA | Fe |
| 228 | NA | Ph | H | H | H | O | N | 0 | 0 | 0 | 0 | * | NA | Fe |
| 229 | NA | Ph | H | Me | H | O | N | 0 | 0 | 0 | 0 | * | NA | Fe |
| 230 | NA | Me | H | H | H | O | N | 0 | 0 | 0 | 0 | * | NA | Co |
| 231 | NA | Me | H | Me | H | O | N | 0 | 0 | 0 | 0 | * | NA | Co |
| 232 | NA | i-Pr | H | H | H | O | N | 0 | 0 | 0 | 0 | * | NA | Co |
| 233 | NA | i-Pr | H | Me | H | O | N | 0 | 0 | 0 | 0 | * | NA | Co |
| 234 | NA | i-Pr | Me | Me | Me | O | N | 0 | 0 | 0 | 0 | * | NA | Co |
| 235 | NA | Ph | H | H | H | O | N | 0 | 0 | 0 | 0 | * | NA | Co |
| 236 | NA | Ph | H | Me | H | O | N | 0 | 0 | 0 | 0 | * | NA | Co |
| 237 | 2,6-iPr$_2$Ph | Me | H | F | H | N | N | N | 1 | 0 | 1 | Cl | Cl | VNT |
| 238 | 2,6-iPr$_2$Ph | Me | H | Cl | H | N | N | N | 1 | 0 | 1 | Cl | Cl | VNT |
| 239 | 2,6-iPr$_2$Ph | Me | H | Br | H | N | N | N | 1 | 0 | 1 | Cl | Cl | VNT |
| 240 | 2,6-iPr$_2$Ph | Me | H | I | H | N | N | N | 1 | 0 | 1 | Cl | Cl | VNT |
| 241 | 2,6-iPr$_2$Ph | Me | H | H | H | N | N | N | 1 | 0 | 1 | Cl | Cl | VNT |
| 242 | 2,6-iPr$_2$Ph | Me | H | H | H | N | N | N | 1 | 0 | 1 | Cl | Cl | VNT |
| 243 | 2,6-iPr$_2$Ph | H | H | F | H | N | N | N | 1 | 0 | 1 | Cl | Cl | VNT |
| 244 | 2,6-iPr$_2$Ph | H | H | Cl | H | N | N | N | 1 | 0 | 1 | Cl | Cl | VNT |
| 245 | 2,6-iPr$_2$Ph | H | H | Br | H | N | N | N | 1 | 0 | 1 | Cl | Cl | VNT |
| 246 | 2,6-iPr$_2$Ph | H | H | I | H | N | N | N | 1 | 0 | 1 | Cl | Cl | VNT |
| 247 | 2,6-Me$_2$Ph | Me | H | H | H | N | N | N | 1 | 0 | 1 | Cl | Cl | VNT |
| 248 | 2,6-Me$_2$Ph | Me | H | F | H | N | N | N | 1 | 0 | 1 | Cl | Cl | VNT |
| 249 | 2,6-Me$_2$Ph | Me | H | Cl | H | N | N | N | 1 | 0 | 1 | Cl | Cl | VNT |
| 250 | 2,6-Me$_2$Ph | Me | H | B | H | N | N | N | 1 | 0 | 1 | Cl | Cl | VNT |
| 251 | 2,6-Me$_2$Ph | Me | H | I | H | N | N | N | 1 | 0 | 1 | Cl | Cl | VNT |
| 252 | 2,6-Me$_2$Ph | H | H | H | H | N | N | N | 1 | 0 | 1 | Cl | Cl | VNT |

TABLE II-continued

IIa'

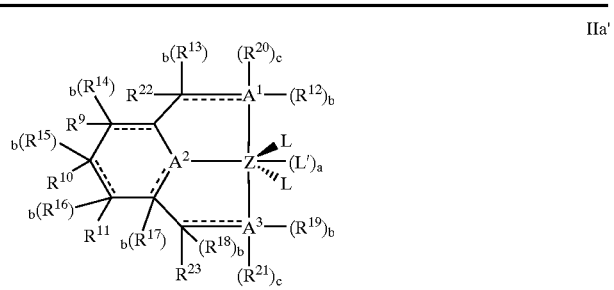

| # | $R^{20}/R^{21}$ | $R^{22}/R^{23}$ | $R^9$ | $R^{10}$ | $R^{11}$ | $A^1$ | $A^2$ | $A^3$ | a | b | c | L | L' | Z |
|---|---|---|---|---|---|---|---|---|---|---|---|---|---|---|
| 253 | 2,6-Me$_2$Ph | H | H | F | H | N | N | N | 1 | 0 | 1 | Cl | Cl | VNT |
| 254 | 2,6-Me$_2$Ph | H | H | Cl | H | N | N | N | 1 | 0 | 1 | Cl | Cl | VNT |
| 255 | 2,6-Me$_2$Ph | H | H | Br | H | N | N | N | 1 | 0 | 1 | Cl | Cl | VNT |
| 256 | 2,6-Me$_2$Ph | H | H | I | H | N | N | N | 1 | 0 | 1 | Cl | Cl | VNT |
| 257 | 2,4,6-Me$_3$Ph | Me | H | H | H | N | N | N | 1 | 0 | 1 | Cl | Cl | VNT |
| 258 | 2,4,6-Me$_3$Ph | Me | H | F | H | N | N | N | 1 | 0 | 1 | Cl | Cl | VNT |
| 259 | 2,4,6-Me$_3$Ph | Me | H | Cl | H | N | N | N | 1 | 0 | 1 | Cl | Cl | VNT |
| 260 | 2,4,6-Me$_3$Ph | Me | H | Br | H | N | N | N | 1 | 0 | 1 | Cl | Cl | VNT |
| 261 | 2,4,6-Me$_3$Ph | H | H | I | H | N | N | N | 1 | 0 | 1 | Cl | Cl | VNT |
| 262 | 2,4,6-Me$_3$Ph | H | H | H | H | N | N | N | 1 | 0 | 1 | Cl | Cl | VNT |
| 263 | 2,4,6-Me$_3$Ph | H | H | F | H | N | N | N | 1 | 0 | 1 | Cl | Cl | VNT |
| 264 | 2,4,6-Me$_3$Ph | H | H | Cl | H | N | N | N | 1 | 0 | 1 | Cl | Cl | VNT |
| 265 | 2,4,6-Me$_3$Ph | H | H | Br | H | N | N | N | 1 | 0 | 1 | Cl | Cl | VNT |
| 266 | 2,4,6-Me$_3$Ph | H | H | I | H | N | N | N | 1 | 0 | 1 | Cl | Cl | VNT |
| 267 | 2,6-iPr$_2$Ph | H | H | H | H | N | N | N | 1 | 0 | 1 | Cl | Cl | MTR |
| 268 | 2,6-iPr$_2$Ph | H | H | F | H | N | N | N | 1 | 0 | 1 | Cl | Cl | MTR |
| 269 | 2,6-iPr$_2$Ph | H | H | Cl | H | N | N | N | 1 | 0 | 1 | Cl | Cl | MTR |
| 270 | 2,6-iPr$_2$Ph | H | H | B | H | N | N | N | 1 | 0 | 1 | Cl | Cl | MTR |
| 271 | 2,6-iPr$_2$Ph | H | H | I | H | N | N | N | 1 | 0 | 1 | Cl | Cl | MTR |
| 272 | 2,6-iPr$_2$Ph | Me | H | H | H | N | N | N | 1 | 0 | 1 | Cl | Cl | MTR |
| 273 | 2,6-iPr$_2$Ph | Me | H | F | H | N | N | N | 1 | 0 | 1 | Cl | Cl | MTR |
| 274 | 2,6-iPr$_2$Ph | Me | H | Cl | H | N | N | N | 1 | 0 | 1 | Cl | Cl | MTR |
| 275 | 2,6-iPr$_2$Ph | Me | H | Br | H | N | N | N | 1 | 0 | 1 | Cl | Cl | MTR |
| 276 | 2,6-iPr$_2$Ph | Me | H | I | H | N | N | N | 1 | 0 | 1 | Cl | Cl | MTR |
| 277 | 2,6-Me$_2$Ph | H | H | H | H | N | N | N | 1 | 0 | 1 | Cl | Cl | MTR |
| 278 | 2,6-Me$_2$Ph | H | H | F | H | N | N | N | 1 | 0 | 1 | Cl | Cl | MTR |
| 279 | 2,6-Me$_2$Ph | H | H | Cl | H | N | N | N | 1 | 0 | 1 | Cl | Cl | MTR |
| 280 | 2,6-Me$_2$Ph | H | H | B | H | N | N | N | 1 | 0 | 1 | Cl | Cl | MTR |
| 281 | 2,6-Me$_2$Ph | H | H | I | H | N | N | N | 1 | 0 | 1 | Cl | Cl | MTR |
| 282 | 2,6-Me$_2$Ph | Me | H | H | H | N | N | N | 1 | 0 | 1 | Cl | Cl | MTR |
| 283 | 2,6-Me$_2$Ph | Me | H | F | H | N | N | N | 1 | 0 | 1 | Cl | Cl | MTR |
| 284 | 2,6-Me$_2$Ph | Me | H | Cl | H | N | N | N | 1 | 0 | 1 | Cl | Cl | MTR |
| 285 | 2,6-Me$_2$Ph | Me | H | Br | H | N | N | N | 1 | 0 | 1 | Cl | Cl | MTR |
| 286 | 2,6-Me$_2$Ph | Me | H | I | H | N | N | N | 1 | 0 | 1 | Cl | Cl | MTR |
| 287 | 2,4,6-Me$_3$Ph | H | H | H | H | N | N | N | 1 | 0 | 1 | Cl | Cl | MTR |
| 288 | 2,4,6-Me$_3$Ph | H | H | F | H | N | N | N | 1 | 0 | 1 | Cl | Cl | MTR |
| 289 | 2,4,6-Me$_3$Ph | H | H | Cl | H | N | N | N | 1 | 0 | 1 | Cl | Cl | MTR |
| 290 | 2,4,6-Me$_3$Ph | H | H | B | H | N | N | N | 1 | 0 | 1 | Cl | Cl | MTR |
| 291 | 2,4,6-Me$_3$Ph | H | H | I | H | N | N | N | 1 | 0 | 1 | Cl | Cl | MTR |
| 292 | 2,4,6-Me$_3$Ph | Me | H | H | H | N | N | N | 1 | 0 | 1 | Cl | Cl | MTR |
| 293 | 2,4,6-Me$_3$Ph | Me | H | F | H | N | N | N | 1 | 0 | 1 | Cl | Cl | MTR |
| 294 | 2,4,6-Me$_3$Ph | Me | H | Cl | H | N | N | N | 1 | 0 | 1 | Cl | Cl | MTR |
| 295 | 2,4,6-Me$_3$Ph | Me | H | Br | H | N | N | N | 1 | 0 | 1 | Cl | Cl | MTR |
| 296 | 2,4,6-Me$_3$Ph | Me | H | I | H | N | N | N | 1 | 0 | 1 | Cl | Cl | MTR |

NA = Not Applicable
VNT = V, Nb, or Ta
MTR = Mn, Tc, or Re
The asterisk (*) in Table II above represents both anionic ligand groups (L) of the above preferred pre-catalyst compounds IIa' and for each of the above compounds both L groups are, respectively, chlorine; bromine; methyl (—CH$_3$); ethyl (—C$_2$H$_5$); propyl (—C$_3$H$_5$, each of the isomers); butyl (—C$_4$H$_9$, each of the isomers); dimethylamine; 1,3-butadiene-1,4 diyl; 1,4-pentadiene-1,5 diyl; C$_4$ alkylene; and C$_5$ alkylene. Also in Table II, B$_z$ = benzyl; Sil = siloxyl; iPrPh = isopropylphenyl; t-Bu = tert-butyl; Me$_2$ = dimethyl, Me$_3$ = trimethyl, etc.

It will be understood that the identity of each L will determine the nature of the process steps needed to form the ultimate catalyst composition which is believed to exist, during polymerization, as an activated pair of a cation, or cation like (referred to herein collectively as Cationic) component and an anion or anion like (referred to herein collectively as Anionic) component. The Cationic component is the pre-catalyst which has undergone activation typically by imparting a full or partial positive charge to the metal center Z and the Anionic component is a full or partial negatively charged component derived from the chromium immobilized support-agglomerate described herein and is believed to be in close proximity to, and provides charge balance for, the activated metal center Z under conventional polymerization reaction conditions while remaining labile. The term "labile" is used herein to mean that under polymerization conditions, the anionic component is only loosely associated at the site of the catalyst activity so as to permit displacement by a polymerizable monomer at the point of monomer addition.

Thus, the manner in which the pre-catalyst is activated typically depends on the identity of L.

From a generic standpoint, activation of pre-catalyst is believed to result from removal of at least one L group from the metal center in a manner sufficient to generate an open coordination site at said metal center.

A variety of mechanisms and materials are known or possible for accomplishing activation. Depending on the specific identity of L and the chromium immobilized support-agglomerate, such mechanisms may be induced in 1 or 2 stages (relative to a designated molecule). Activation in a single stage typically involves separately synthesizing a pre-catalyst that can be activated directly by the present chromium immobilized support-agglomerate (e.g., wherein L is initially selected as hydrocarbyl in the synthesis of the pre-catalyst). Activation in 2 stages typically involves a pre-activation first stage wherein at least one electronic withdrawing L group (e.g. Cl) is replaced with at least one less electronic withdrawing L group (e.g., alkyl) which is more easily displaced in the chromium immobilized second stage by the support-agglomerate to cause activation at the metal center Z. Accordingly, pre-activation can be induced via known alkylation reactions with organometallic compounds, such as organolithium or preferably organoaluminum hydrides or alkyls. Pre-activation permits one to use the chromium immobilized support-agglomerate in all instances for activation and eliminate use of expensive methylalumoxane or ionizing agents such as boron containing activators (or co-catalysts).

Thus, while activation mechanisms by which conventional coordination catalyst systems operate include, but are not limited to (a) abstraction of at least one L group by a Lewis acid by an abstracting moiety such as carbonium, tropylium, carbenium, ferrocenium and mixtures, and (b) protonation (by a Bronsted acid) of the L group, when L constitutes a hydride or hydrocarbyl (e.g. alkyl) group, such mechanisms typically require additional materials to the support for implementation. The same is not true for the present invention.

It is a particular advantage of the present invention that such conventional activating agents used to produce ionic catalysts can be eliminated and replaced with the chromium immobilized support-agglomerate of the present invention which performs the dual function of activation and supporting agent.

From a practical standpoint, it is preferred that L be halogen, e.g., Cl, Br, in the pre-catalyst. This stems from the fact that when L is halogen (highly electron withdrawing), the pre-catalyst is very stable and can be easily transported. However, because L in this instance is highly electron withdrawing, it may be more difficult to induce activation thereof by the chromium immobilized support-agglomerate. Thus, as indicated above, it is possible to pre-activate the pre-catalyst, by replacement of the halogens constituting L with less electron withdrawing groups such as hydrocarbyl groups, e.g., alkyl groups, using organometallic compounds. The particular point in time when the organometallic compound contacts the pre-catalyst is at the option of the manufacturer and can be (a) before, during or after contact of the chromium immobilized support-agglomerate with pre-catalyst prior to entry into the polymerization zone and/or (b) upon or during polymerization by direct addition to the polymerization zone. However, because pre-activated catalysts are less stable than the halogenated precursors thereof, organometallic compound addition, when employed, is preferably conducted in the presence of the chromium immobilized support-agglomerate. It is a further particular advantage of the present invention that activation of the pre-catalyst (having L=halogen) can be delayed by avoiding the use of the organometallic compound to induce pre-activation until polymerization occurs. Thus, such pre-catalyst can be impregnated into the chromium immobilized support-agglomerate and the same recovered without activation until used for polymerization. Since it is possible to employ lower total amounts of organometallic compound by adding it only to the reactor during polymerization, this is the preferred approach.

Thus, one preferred embodiment comprises using pre-catalyst transition metal bidentate or tridentate ligand containing compound I or II wherein each L group is a halogen atom. In this embodiment, the pre-catalyst and chromium immobilized support-agglomerate are separately mixed. In another embodiment, said pre-catalyst, chromium immobilized support-agglomerate and at least one organometallic compound (represented by Formula III below) are admixed, preferably simultaneously prior to polymerization. In this embodiment, at least one of the halogens constituting L becomes a new hydrocarbyl L group derived from the organometallic, compound during pre-activation. More specifically, when used as a scavenging and alkylating agent, the organometallic compound is typically added directly to the polymerization zone, whereas when employed as an alkylating agent alone it is desirably added to the mixture of chromium immobilized support-agglomerate and pre-catalyst.

Organometallic compounds suitable for optional use in pre-activation include those represented by Formula (III):

$$M^x(R)_s \qquad \text{III}$$

wherein M represents an element of the Group 1, 2 or 13 of the Periodic Table, a tin atom or a zinc atom; each R independently represents a hydrogen atom, a halogen atom, a hydrocarbon based radical or a substituted hydrocarbon based radical such as hydrocarbyl, typically $C_1$ to $C_{24}$ hydrocarbyl, including $C_1$ to $C_{24}$ alkyl or alkoxy and aryl, aryloxy, arylalkyl, arylalkoxy, alkylaryl or alkylaryloxy group having 6 to 24 carbon atoms, such as a hydrogen atom, halogen atom (e.g., chlorine fluorine, bromine, iodine and mixtures thereof), alkyl groups (e.g., methyl, ethyl, propyl, pentyl, hexyl, heptyl, decyl, isopropyl, butyl, isobutyl, s-butyl, t-butyl and the like), alkoxy groups (e.g., methyoxy, ethoxy, propoxy, butoxy, isopropoxy), aryl groups (e.g., phenyl, biphenyl, naphthyl), aryloxy groups (e.g., phenoxy), arylalkyl groups (e.g., benzyl, phenylethyl), arylalkoxy groups (benzyloxy), alkylaryl groups (e.g., tolyl, xylyl, cumenyl, mesityl), and alkylaryloxy groups (e.g., methylphenoxy), and perhaloarylalkyl groups, and s is equal to the oxidation number, x, of M. Preferably at least one R is hydrocarbyl, e.g., an alkyl group having 1 to 24 carbon atoms or an aryl, arylalkyl or alkylaryl group having 6 to 24 carbon atoms, e.g., to provide a source of hydrocarbyl groups for alkylation of the pre-catalyst when L is non-hydrocarbyl. The preferred organometallic compounds are those wherein M is aluminum.

Representative examples of organometallic compounds include alkyl aluminum compounds, preferably trialkyl aluminum compounds, such as trimethyl aluminum, triethyl aluminum, triisopropyl aluminum, triisobutyl aluminum, tri-n-propylaluminum, triisobutylaluminum, tri-n-butylaluminum, triamylaluminum, and the like; alkyl aluminum alkoxides such as ethyl aluminum diethoxide, diisobutyl aluminum ethoxide, di(tert-butyl) aluminum butoxide, diisopropyl aluminum ethoxide, dimethyl aluminum ethoxide, diethyl aluminum ethoxide, di-n-propyl aluminum ethoxide, di-n-butyl aluminum ethoxide, and the like; aluminum alkoxides such as aluminum ethoxide, aluminum propoxide, aluminum butoxide and the like; alkyl or aryl aluminum halides such as diethyl aluminum chloride, ethyl aluminum dichloride, diisopropyl aluminum chloride and the like; aluminum aryloxides such as aluminum phenoxide, and the like; and mixed aryl, alkyl or aryloxy, alkyl aluminum compounds and aluminum hydrides such as dimethylaluminum hydride, diethylaluminum hydride, diisopropylaluminum hydride, di-n-propylaluminum hydride, diisobutylaluminum hydride, and di-n-butylaluminum hydride. The most preferred organometallic compounds are the trialkyl aluminum compounds.

When at least one L of the transition metal compounds is halogen, the pre-catalyst and/or the organometallic compound can be mixed in an inert diluent prior to, simultaneously with, or after contact (of either one) with the chromium immobilized support-agglomerate. The pre-catalyst, when two L groups are halogen, is more stable to materials which are poisons to the activated catalyst.

In a second preferred embodiment wherein each L of the pre-catalyst is a hydrocarbyl, a hydrocarbylene or a hydrocarbyloxy group, there is no need for the addition or handling of the organometallic compound. Thus, the catalyst composition can be readily formed and used without pre-activation. However, even in this instance, it is still preferred to employ at least some organometallic compound as a scavenger during polymerization to deactivate potential poisons to the activated catalyst.

The organometallic reagent should be present in from 50 $\mu$mole to 0.1 mole, preferably from 100 $\mu$mole to 0.05 mole per gram of chromium immobilized support-agglomerate, fully described below.

The chromium immobilized support-agglomerate found useful herein are composites in the form of agglomerates of at least two components, namely, (A) at least one inorganic oxide component and (B) at least one ion-containing layered component that have been further treated to cause chromium to be immobilized thereto, such as being covalently bonded to oxygen atoms on the surface (exterior or interior) of the support-agglomerate and to additional oxygen atoms to complete the valence state of each chromium atom.

The inorganic oxide Component (A) of the support-agglomerate particles used in the present invention are derived from porous inorganic oxides including $SiO_2$, $Al_2O_3$, $AlPO_4$, $MgO$, $TiO_2$, $ZrO_2$; mixed inorganic oxides including $SiO_2 \cdot Al_2O_3$, $MgO \cdot SiO_2$, $MgO \cdot SiO_2 \cdot Al_2O_3$, $SiO_2 \cdot TiO_2$, $SiO_2 \cdot TiO_2 \cdot Al_2O_3$, $SiO_2 \cdot Cr_2O_3 \cdot Al_2O_3$ and $SiO_2 \cdot Cr_2O_3 \cdot TiO_2$ and mixtures thereof. Where the inorganic oxide (including mixed inorganic oxides) is capable of forming a gel by known commercial procedures, it is preferred to utilize the same in a gel configuration for the milling procedures described herein. If the inorganic oxide is not susceptible to gel formation, the free oxide or mixed oxides derived from other conventional techniques such as precipitation, coprecipitation, or just admixing, can be utilized directly for the milling procedures after washing.

Most preferably, Component (A) of the support-agglomerate contains typically at least 80, preferably at least 90, most preferably at least 95%, by weight, silica gel (e.g., hydrogel, aerogel, or xerogel) based on the weight of the catalyst support.

Silica hydrogel, also known as silica aquagel, is a silica gel formed in water which has its pores filled with water. A xerogel is a hydrogel with the water removed. An aerogel is a type of xerogel from which the liquid has been removed in such a way as to minimize any collapse or change in the structure as the water is removed.

Silica gel is prepared by conventional means such as by mixing an aqueous solution of an alkali metal silicate (e.g., sodium silicate) with a strong acid such as nitric or sulfuric acid, the mixing being done under suitable conditions of agitation to form a clear silica sol which sets into a hydrogel in less than about one-half hour. The resulting gel is then washed. The concentration of the $SiO_2$ in the hydrogel which is formed is usually in the range of typically between about 15 and about 40, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C.

Washing is accomplished simply by immersing the newly formed hydrogel in a continuously moving stream of water which leaches out the undesirable salts, leaving about 99.5 wt. % pure silica ($SiO_2$) behind.

The pH, temperature, and duration of the wash water will influence the physical properties of the silica, such as surface area (SA) and pore volume (PV). Silica gel washed at 65–90° C. at pH's of 8–9 for 28–36 hours will usually have SA's of 290–350 $m^2/g$ and form aerogels with PV's of 1.4 to 1.7 cc/gm. Silica gel washed at pH's of 3–5 at 50–65° C. for 15–25 hours will have SA's of 700–850 $m^2/g$ and form aerogels with PV's of 0.6–1.3 cc/g When employing a Component-A inorganic oxide containing at least 80 wt. % silica gel, the remaining balance of the inorganic oxide Component-A can comprise various additional components. These additional components may be of two types, namely (1) those which are intimately incorporated into the gel structure upon formation, e.g., by cogelling silica gel with one or more other gel forming inorganic oxide materials, and (2) those materials which are admixed with silica gel particles prior to milling or after milling in slurry form just prior to spray drying. Thus, materials includable in the former category are silica-alumina, silica-titania, silica-titania-alumina, and silica-alumina phosphate cogels.

The chromium compound (precursor Cr component) described fully herein below can be made part of the gel structure by admixing the chromium precursor with the silica hydrogel prior to milling and/or just prior to agglomeration by spray drying. The chromium precursor salt as well as other non-silica gel component employed with silica gel may be added at any time to the slurry to be agglomerated. However, it is preferably that they be present in the silica gel during or prior to milling as described hereinafter, since they will be less likely to disturb the desired agglomerate morphology after spray drying when they are also subjected to milling.

In the latter category, components which may be admixed, in slight proportions, with the silica hydrogel particles prior to milling and/or just prior to agglomeration include those prepared separately from inorganic oxides such as magnesium oxide, titanium oxide, thorium oxide, e.g., oxides of Groups 4 and 16, as well as other particulate constituents. Other particulate constituents which may be present include those constituents having catalytic properties, not adversely affected by water, spray drying or calcination, such as finely divided oxides or chemical compounds, recognizing, however, that these constituents play no part in the agglomeration procedure. Similarly, it is possible to add powders or particles of other constituents to the silica hydrogel particles to impart additional properties to the support-agglomerate obtained. Accordingly, in addition to those powders or particulates having catalytic properties, there may be added materials that possess absorbent properties, such as synthetic zeolites.

Thus, it is possible to obtain complex catalyst supports wherein amorphous silica gel contains crystallizable elements and the like. The skilled artisan will appreciate that the amounts of such additional components must be restricted in order to avoid compromising the desired agglomerate properties described herein.

Also, it is feasible to add constituents to the inorganic oxide which may be eliminated after agglomeration in order to control porosity within a desired range; such agents as sulfur, graphite, wood charcoal, and the like being particularly useful for this purpose.

When non-silica gel components are to be employed with silica gel, they may be added to the slurry to be agglomerated. However, it is preferable that they be present in the silica gel during or prior to milling as described hereinafter, since they will be less likely to disturb the desired agglomerate morphology after spray drying when they are also subjected to milling.

In view of the above, the term "silica gel", when used to describe the process steps up to and including agglomeration, is intended to include the optional inclusion of the aforementioned non-silica gel constituents permitted to be present in Component-A of the support-agglomerate.

Component (B) of the support-agglomerate is a layered material having a three-dimensional structure, which exhibits the strongest chemical bonds in only two dimensions. More specifically, the strongest chemical bonds are formed in and within two dimensional planes which are stacked on top of each other to form a three dimensional solid. The two dimensional planes are held together by weaker chemical bonds than those holding an individual plane together and generally arise from Van der Waals forces, electrostatic interactions, and hydrogen bonding. The electrostatic interactions are mediated by ions located between the layers and in addition, hydrogen bonding can occur between complimentary layers or can be mediated by interlamellar bridging molecules.

Representative examples of suitable layered materials includable in layered Component (B) can be amorphous or crystalline, preferably amorphous. Suitable layered Component (B) materials include clay, and clay minerals.

Clay is typically composed of clay minerals (i.e., crystalline silicate salts) as the main constituent. The clay or clay mineral is usually an inorganic polymeric compound of high molecular complexity constituted by a tetrahedral unit in which a central silicon atom coordinates oxygen atoms and an octahedral unit in which a central aluminum, magnesium or iron atom coordinates oxygen or hydroxide. The skeletal structures of many clays or clay minerals are not electrically neutral and have positive, most typically negative, charges on their surfaces. When possessing a negatively charged surface, they have cations in their interlaminar structures to complement such negative charges. Such interlaminar cations can be ion-exchanged by other cations. A quantification of a clay's ability to exchange interlaminar cations is called its cation exchange capacity (CEC) and is represented by milliequivalents (meq) per 100 g of clay. CEC differs depending upon the type of clay, and Clay Handbook, second edition (compiled by Japanese Clay Association, published by Gihodo Shuppan K. K.) gives the following information. Kaolinite: 3 to 15 meq/100 g, halloysite: 5 to 40 meq/100 g, montmorillonite: 80 to 150 meq/100 g, illite: 10 to 40 meq/100 g, vermiculite: 100 to 150 meq/100 g, chlorite: 10 to 40 meq/100 g, zeolite.attapulgite: 20 to 30 meq/100 g. Thus, layered Component (B) to be used in the present invention, is a material, e.g., clay or clay mineral, typically having its surface negatively charged and preferably also having the ability to exchange cations.

Thus, clay minerals generally have the characteristic layer structure described above, containing between the layers, various levels of negative charges. In this respect, the clay mineral is substantially different from metal oxides having a three-dimensional structure such as silica, alumina, and zeolite. The clay minerals are classified according to the levels of the aforementioned negative charge for the chemical formula: (1) biophilite, kaolinite, dickalite, and talc having the negative charge of 0 (zero), (2) smectite having the negative charge of from $-0.25$ to $-0.6$, (3) vermiculite having the negative charge of from $-0.6$ to $-0.9$, (4) mica having the negative charge of from about $-1$, and (5) brittle mica having a negative charge of about $-2$. Each of the above groups includes various minerals. For example, the smectite group includes montmorillonite, beidellite, saponite, nontronite hectorite, teniolite, suconite and related analogues; the mica group includes white mica, palagonite and illite. These clay minerals exist in nature, and can also be synthesized artificially with a higher purity.

Any of the natural and artificial clay minerals having a negative charge below 0 are useful in the present invention. The presently preferred clay is selected from a smectite, such as montmorillonite, e.g., sodium montmorillonite.

Further, clays and clay minerals may be used as they are without subjecting them to any treatment prior to formation of the support-agglomerate therefrom, or they may be treated by ball milling, sieving, acid treatment or the like prior to such formation. Further, they may be treated to have water added and adsorbed or may be treated for dehydration under heating before support-agglomerate formation. They may be used alone or in combination as a mixture of two or more of them for support-activation synthesis.

Component (B) preferably is formed to have pores having a diameter of at least 40 Å (e.g., 40–1000 Å) as measured by a mercury intrusion method employing a mercury porosimeter of at least 0.1 cc/g, more preferably from 0.1 to 1 cc/g. The average particle size of Component-B can vary typically from about 0.01 to about 50, preferably from about 0.1 to about 25, and most preferably from about 0.5 to about 10 microns.

It has been found that the clays utilized herein need not be and preferably are not subjected to pretreatment to obtain the benefits of the present invention. In those instances where such treatment is used, the clays used as Component (B) may be subjected to pretreatment with chemicals prior or subsequent to support-agglomerate formation. Examples of the chemical pretreatment include treatment with an acid or alkali, treatment with a salt, and treatment with an organic or inorganic compound. The last treatment can result in formation of a composite material.

The treatment of the clay mineral with the acid or alkali may not only remove impurities from the mineral, but also may elute part of metallic cations from the crystalline structure of the clay, or may destructively alter the crystalline structure into an amorphous structure. Examples of the acids used for this purpose are Bronsted acids, such as hydrochloric, sulfuric, nitric, acetic acid and the like. Sodium hydroxide, potassium hydroxide and calcium hydroxide are preferably used as alkali chemical in the alkali pretreatment of the clay mineral.

In the case where the clay mineral is pretreated with a salt or an inorganic or organic compound to give a composite material, the crystalline structure may be retained substantially without being broken and, rather a product that has been modified by ion-exchange may be obtained. Examples of the inorganic salt compounds that may be used in the pretreatment with salts include ionic halide salts, such as sodium chloride, potassium chloride, lithium chloride, magnesium chloride, aluminum chloride, iron chloride and ammonium chloride; sulfate salts, such as sodium sulfate, potassium sulfate, aluminum sulfate and ammonium sulfate; carbonate salts, such as potassium carbonate, sodium carbonate and calcium carbonate; and phosphate salts, such as sodium phosphate, potassium phosphate, aluminum phosphate and ammonium phosphate. Examples of the organic salt compounds include sodium acetate, potassium acetate, potassium oxalate, sodium citrate, sodium tartarate and the like.

As examples of the inorganic compound used for the synthesis of inorganic composite material, metal hydroxides that yield hydroxide anions, for example, aluminum hydroxide, zirconium hydroxide, chromium hydroxide and the like may be mentioned.

In the case where the clay mineral is treated with an organic compound, such compounds will typically comprise a Lewis basic functional group containing an element of the Group 15 or 16 of the Periodic Table, such as organoammonium cation, oxonium cation, sulfonium cation, and phosphonium cation. The organic compound may also preferably comprise a functional group other than the Lewis basic functional group, such as carbonium cation, tropylium cation, and a metal cation. After undergoing such treatment, the exchangeable metallic cations originally present in the clay mineral are exchanged with the enumerated organic cations. Thus, compounds that yield a carbon cation, for example, trityl chloride, tropylium bromide and the like; or a complex compound that yields metallic complex cation, for example a ferrocenium salt and the like; may be used as the organic compound in the pretreatment. In addition to these compounds, onium salts may be used for the same purpose.

Particular examples of guest organic cations that may be introduced for modification of the clay minerals, include: triphenylsulfonium, trimethylsulfonium, tetraphenylphosphonium, alkyl tri(o-tolyl) phosphonium, triphenylcarbonium, cycloheptatrienium, and ferrocenium; ammonium ions, for example aliphatic ammonium cations, such as butyl ammonium, hexyl ammonium, decyl ammonium, dodecyl ammonium, diamyl ammonium, tributyl ammonium, and N,N-dimethyl decyl ammonium; and aromatic ammonium cations such as anilinium, N-methyl anilinium, N,N-dimethyl anilinium, N-ethyl anilinium, N,N-diethyl anilinium, benzyl ammonium, toluidinium, dibenzyl ammonium, tribenzyl ammonium, N,N-2,4,6-pentamethyl anilinium and the like; and also oxonium ions, such as dimethyl oxonium, diethyl oxonium and the like. These examples are not limiting.

Ion exchange of the exchangeable cations in the clay mineral with selected organic cations is typically brought about by contacting the clay with an onium compound (salt) comprising the organic cations.

Particular examples of the onium salts which may be used, include: ammonium compounds; for example aliphatic amine hydrochloride salts, such as propylamine HCl salt, isopropylamine HCl salt, butylamine HCl salt, hexylamine HCl salt, decylamine HCl salt, dodecylamine HCl salt, diamylamine HCl salt, tributylamine HCl salt, triamylamine HCl salt, N,N-dimethyl decylamine HCl salt, N,N-dimethyl undecylamine HCl salt and the like; aromatic amine hydrochloride salts, such as aniline HCl salt, N-methylaniline HCl salt, N,N-dimethylaniline HCl salt, N-ethylaniline HCl salt, N,N-diethylaniline HCl salt, o-toluidine HCl salt, p-toluidine HCl salt, N-methyl-o-toluidine HCl salt, N-methyl-p-toluidine HCl salt, N,N-dimethyl-o-toluidine HCl salt, N,N-dimethyl-p-toluidine HCl salt, benzylamine HCl salt, dibenzylamine HCl salt, N,N-2,4,6-pentamethyl aniline HCl salt and the like; hydrofluoric, hydrobromic and hydroiodic acid salts and sulfate salts of the above-listed aliphatic and aromatic amines; and oxonium compounds, such as hydrochloric acid salts of methyl ether, ethyl ether, phenyl ether and the like. Of the onionium compounds the exemplified ammonium or oxonium compounds, preferably the ammonium compounds and more preferably the aromatic amine salts are employed in the modification of the clay mineral.

The onium compound to be reacted with the clay mineral may be in the isolated form. Alternatively, the onium compound may be formed in situ, for example by contacting the corresponding amine compound, a heteroatom-containing compound, such as an ether or sulfide compound, and a proton acid, such as hydrofluoric, hydrochloric, hydroiodic or sulfuric acid, in the reaction solvent in which the clay mineral is to be pretreated subsequently. The reaction conditions under which the clay mineral can be modified by the onium compound are not critical. In addition, the relative proportions of the reactants used therein are not critical. Preferably, however, when used the onium compound is employed in a proportion of not less than 0.5 equivalents per equivalent of the cation present in the clay mineral, and more preferably in a proportion of at least equivalent amount. The clay mineral may be used singly or in admixture with other clay mineral or minerals. Also the onium compound may be used singly or in admixture with other onium compounds.

The reaction solvent used in the modification pretreatment process may be water or a polar organic solvent. Examples of the organic solvents which may be used suitably, include alcohols, such as methyl alcohol, ethyl alcohol and the like; acetone, tetrahydrofuran, N,N-dimethyl formamide, dimethylsulfoxide, methylene chloride and the like. The solvent may be used singly or as a mixture of two or more solvents. Preferably, water or an alcohol is employed.

What can be viewed as separate and distinct classes of chemical modification treatments to which the clays can be subjected is referred to as pillaring and delamination. Pillaring is a phenomena whereby the platelets of certain clays, such as smectite clays, which are swellable, are separated by intercalation of large guest cations between the negatively charged platelet sheets, which cations function as molecular props or pillars separating the platelets and preventing the layers from collapsing under van der Waals forces.

Pillared clays are typically prepared by reacting a smectite clay, such as montmorillonite, with polyoxymetal cations such as polyoxycations of aluminum and zirconium. The reaction product is normally dried in air and calcined to convert the intercalated cations into metal oxide clusters interposed between the platelets of the clay such that the spacing between the platelets ranges from about 6 to about 10 Angstroms and is maintained at such values when the clay is heated to a temperature between about 500° C. and 700° C. When the reaction product is dried, the clay platelets, which are propped apart by the metal oxide clusters, orient themselves face-to-face, thereby forming a lamellar structure which yields an X-ray diffraction pattern containing distinct first order or (001) reflection. The extent of lamellar ordering is indicated by the X-ray powder diffraction pattern of the pillared clay. A well-ordered, air-dried, pillared montmorillonite may exhibit six or more orders of reflection. Pillared clays and their preparation are described more fully in the article entitled "Intercalated Clay Catalysts," *Science*, Vol. 220, No. 4595 pp. 365–371 (Apr. 22, 1983) and in U.S. Pat. Nos. 4,176,090; 4,216,188; 4,238,364; 4,248,739; 4,271,043; 4,367,163; 4,629,712; 4,637,992; 4,761,391; 4,859,648; and 4,995,964. The disclosures of the aforementioned articles and patents are incorporated herein by reference in their entireties.

In contrast to pillared clays, which have platelets which are ordered in a face-to-face arrangement, delaminated clays also contain large cations but the platelets are oriented edge-to-edge and edge-to-face in what can be described as a "house-of-cards" structure containing macropores of a size typically found in amorphous aluminosilicates in addition to the micropores found in pillared clays. (See U.S. Pat. No. 4,761,391 for a further discussion.) Such clays are distinct from those that have been subjected to exfoliation by high shear forces and the like which substantially destroys the house of cards structure. Thus, non-exfoliated clays should be used and non-delaminated and non-exfoliated clays are preferred.

While it is possible and permissible to modify Component (B) with guest cations as described above, such procedures add process steps to the overall preparation, and from a process point of view, are preferably not employed.

However, when Component (B) is modified by exchanging originally present cations for guest cations, the goal sought to be achieved by such exchange is to render the support-agglomerate capable of activating either the pre-catalyst or the pre-activated catalyst as described above. It is believed that the indigenous cations typically present in the aforementioned clays are already capable of accomplishing this goal.

The support-agglomerate is made from an intimate admixture of Components (A) and (B), to provide an agglomerate form of the components.

The weight ratio of Component (A) to Component (B) in the agglomerate can vary typically from about 0.25:1 to about 99:1, preferably from about 0.5:1 to about 20:1, most preferably from about 1:1 to about 10:1 (e.g., 4:1).

The term "agglomerate" refers to a product that combines particles which are held together by a variety of physical-chemical forces. More specifically, each agglomerate is preferably composed of a plurality of contiguous, constituent primary particles derived primarily from Component (A) and much smaller secondary constituent particles derived from both Component (A) and Component (B) preferably joined and connected at their points of contact.

The support-agglomerates of the present invention preferably will exhibit a higher macropore content than the constituent primary or secondary particles as a result of the interparticle voids between the constituent particles. However, such interparticle voids may be almost completely filled with the smaller secondary particles in other embodiments of the spray-dried agglomerates.

The agglomeration of Components (A) and (B) may be carried out in accordance with methods well known to the art, such as by pelletizing, extrusion, shaping into beads in a rotating coating drum, and the like. A nodulizing technique whereby composite particles having a diameter of not greater than about 0.1 mm are agglomerated to particles with a diameter of at least about 1mm by means of granulation liquid may also be employed.

The preferred agglomerates are made by drying, preferably spray drying a slurry of Components (A) and (B). More specifically, in this embodiment, the support is made by admixing Components-(A) and (B) to form a slurry, preferably an aqueous slurry, comprising typically at least 50, preferably at least 75 (e.g., at least 80), and most preferably at least 85 (e.g., at least 90), wt. % water based on the slurry weight. However, organic solvents, such as $C_5$ to $C_{12}$ alkanes, alcohols (e.g. isopropyl alcohol), may also be employed although they represent a fire hazard relative to water and often make agglomerates too fragile for use as polymerization catalysts.

To render Component (A) suitable for agglomerate formation, e.g. drying or spray drying, various milling procedures are typically employed (although not required). The goal of the milling procedure is to ultimately provide Component (A), when intended to be spray dried, with an average particle size of typically from about 0.2 to about 10 (e.g. 2 to about 10) preferably from about 4 to about 9, and most preferably from 4 to 7 microns. Desirably the milling procedures will also impart a particle size Distribution Span to the particles in the slurry of typically from 0.5 to about 3.0, and preferably from about 0.5 to about 2.0. The particle size Distribution Span is determined in accordance with the following equation.

$$\text{Distribution Span} = \frac{D_{90} - D_{10}}{D_{50}} \qquad \text{Equation 1a}$$

wherein $D_{10}$, $D_{50}$, and $D_{90}$ represent the $10^{th}$, $50^{th}$, and $90^{th}$ percentile, respectively, of the particle size (diameter) distribution, i.e. a $D_{90}$ of 100 microns means that 90 volume % of the particles have diameters less than or equal to 100 microns. Still more preferably, the milling is conducted to impart a particle size distribution to the Component (A) inorganic oxides in the slurry to be spray dried such that the Component (A) colloidal content is typically from about 2 to about 60 (e.g. 2 to about 40), preferably from about 3 to about 25, and most preferably from about 4 to about 20 wt.

The colloidal content of Component (A) to be spray dried is determined by centrifuging a sample for 30 minutes at 3600 RPM. The liquid (supernatant) which remains on top of the test tube is decanted, and analyzed for % solids. The % of colloidal material is then determined by the following equation:

$$\% \text{ colloid} = \left[ \frac{\left(\frac{1-B}{B}\right) - 2.2}{\left(\frac{1-A}{A}\right) - 2.2} \right] \times 100 \qquad \text{Equation 1b}$$

wherein
A=wt. solids in supernatant/100, and
B=wt. solids of original slurry/100

The colloidal content will possess a particle diameter in the colloidal range of typically less than about 1, preferably less than about 0.5, and typically from about 0.4 to about 1 micron. All particle size and particle size distribution measurements described herein are determined by a Mastersizer unit from Malvern Instruments, which operates on the principle of laser light diffraction and is known to all familiar in the art of small particle analysis.

As the colloidal content of the dry solids content of the Component-A slurry exceeds about 60 wt. %, the constituent particles of the agglomerate can become bound too tightly together. Conversely, while the presence of at least some colloidal content of the slurry is desired, a slurry containing no colloidal content (e.g. dry milled powder alone) will typically produce agglomerates of the support which have extremely low physical integrity to an undesirable degree. In such instances, it may be desirable to include some alternative source of binder. Thus, it is preferred that the colloidal content of the Component A (as dry solids) be within the range of from about 5 to 50, more preferably from 5–40 wt. %.

One milling procedure which has been found to impart the above-described properties, as well as the desired morphology, involves a wet milling procedure and optionally a dry milling procedure. A wet milling procedure is characterized by the presence of liquid, e.g. water, during the milling procedure. Thus, wet milling is typically performed on a slurry of the inorganic oxide particles having a solids content of typically from about 15 to about 25 weight % based on the slurry weight.

In the wet milling procedure, the washed inorganic oxide is typically subjected to a milling procedure well known in the art that is necessary to produce slurries with the particle sizes specified above. Suitable mills include hammer mills, impact mills (where particle size reduction/control is achieved by impact of the oxide with metal blades and retained by an appropriately sized screen), and sand mills (where particle size control/reduction is achieved by contact of the oxide with hard media such as sand or zirconia beads).

The colloidal particles within the wet milled material are the primary source of the colloid content in the slurry to be spray dried as described above, and are believed to act as a binder upon spray drying. More specifically, with wet milling, Component A can be slurried in a media (usually water) and the mixture then subjected to intense mechanical action, such as the high speed blades of a hammer mill or rapidly churning media of a sand mill. Wet milling reduces particle size and produces colloidal silica as well.

Accordingly, the inorganic oxide (typically while still wet) is then subjected to a milling operation as described below to prepare it for spray drying. Once the target average particle size and preferably the particle size Distribution Span is imparted to Component (A), a slurry, preferably aqueous slurry, is prepared for agglomeration, preferably by spray drying.

A dry milling procedure is characterized by the substantial absence of the presence of free flowing liquid, e.g. water or solvent. Thus, while the final dry milled material may contain some absorbed moisture, it is essentially in powder form, not a suspension or solution of particles in liquid. The dry milling refers to a process in which the particulate inorganic oxide is reduced in size by some mechanical action or the like.

The dry milling referred to typically takes particulate inorganic oxide and reduces it in size by either mechanical action, impingement onto a metal surface, or collision with other particles after entrainment into a high-velocity air stream.

In the dry milling procedure, Component-A is typically milled in a manner sufficient to reduce its average particle size to typically from about 2 to about 10, preferably from about 3 to about 7, and most preferably from about 3 to 6 microns, and its moisture content to typically less that about 50, preferably less than about 25, and most preferably less that about 15 weight %. In order to attain the dry milling particle size targets at the higher moisture contents, it may be necessary to conduct dry milling while the particles are frozen.

The dry milling is also conducted to preferably impart a particle size distribution such that the Distribution Span is typically from about 0.5 to about 3.0, preferably from about 0.5 to about 2.0, and most preferably from about 0.7 to about 1.3. Thus, the resulting dry milled material exists in the form of a powder prior to being slurried for spray drying.

The dry milling is preferably conducted in a mill capable of flash drying the inorganic oxide while milling. Flash drying is a standard industrial process where the material to be dried is quickly dispersed into a hot air chamber and exposed to an air stream of 370–537° C. The rate of air and material input is balanced such that the temperature of the outgoing air and the material entrained in it is generally 121–176° C. The whole process of drying usually takes place in less than 10 seconds, reducing the moisture content to less than about 10%. Alternatively, the inorganic oxide can be separately flash dried to the aforedescribed moisture content in a flash dryer and then placed in a dry mill and milled. Suitable dry mills include an ABB Raymond™ impact mill or an ALJET™ FLUID ENERGY MILL. Ball mills can also be used. Suitable flash drying equipment includes Bowen™ flash dryer. Other similar equipment is well known in the chemical processing industry.

Flash drying is typically accomplished by exposing the inorganic oxide to conditions of temperature and pressure sufficient to reduce the moisture content thereof to levels as described above over a period of time of typically less than about 60, preferably less than about 30, and most preferably less than about 5 seconds. Dry milling typically does not produce colloidal silica.

In accordance with one embodiment of the agglomerate formation by spray drying, at least a portion of the material constituting Component-A is derived from wet milling, and optionally but preferably at least a portion is derived from dry milling. Thus, prior to agglomeration, Component-A will typically comprise a mixture of previously wet milled inorganic oxide, e.g. silica gel, and dry milled inorganic oxide, e.g. silica gel powder. More specifically, the weight ratio (on a dry solids content basis as defined hereinafter) of the wet milled/dry milled inorganic oxide solids in the slurry can vary typically from about 9:0 to about 0.1:1 (e.g., 9:1), preferably from about 1.5:1 to about 0.1:1, and most preferably from about 0.6:1 to about 0.25:1. The particular wet milled/dry milled solids ratio of Component-A employed will be selected to achieve the target properties in the final slurry to be used in agglomerate formation.

In an alternative embodiment, a sequential milling procedure can be employed to impart the target properties of average particle size and particle size distribution. The sequential milling procedure involves dry milling a sample of the Component (A) inorganic oxide and then wet milling the previously dry milled sample.

It has been observed that drying of inorganic oxide starting material during dry milling and then using the dry milled product for wet milling tends to produce a lower colloidal content relative to mixing a separately prepared dry milled product and a separately prepared wet milled product. The reason for this phenomenon is not entirely understood. However, sufficient colloidal content is produced to bind the agglomerate together in a desirable manner.

Once the target average particle size and preferably the particle size Distribution Span is imparted to Component (A), a slurry, preferably aqueous slurry, is prepared for agglomeration, preferably by spray drying.

The Component (B) layered material, e.g. clay, is typically comprised of fine particles having an average particle size of typically less than 10, preferably less than 5, and most preferably less than 1 micron, such particle sizes ranging typically from about 0.1 to about 10, preferably from about 0.1 to about 5, and most preferably from about 0.1 to about 1 microns.

Other preferable physical properties of the clay include a total nitrogen pore volume of typically greater than 0.005 (e.g., 0.005 to 1.50), preferably greater than about 0.1 (e.g., 0.1 to 2) cc/g; a nitrogen surface area of typically greater than 10, preferably greater than 30 (e.g., 10 to 100) m$^2$/g; and an Apparent Bulk Density (ABD) of typically greater than 0.10, preferably greater than 0.25 (e.g., 0.10 to 0.75) g/cc. Milling procedures can be employed to achieve these target properties, if necessary.

To agglomerate by spray drying, Components (A) and (B) are admixed, typically in a suitable diluent, to form a slurry of the same. The diluent can be aqueous or organic. The preferred liquid slurry medium for spray drying is aqueous, typically greater than 75, preferably greater than 80, and most preferably greater than 95 wt. % water (e.g. entirely water).

The weight ratio of Component (A) to Component (B) in the slurry, can vary typically from about 0.25:1 to about 99:1, preferably from about 0.5:1 to about 20:1, and most preferably from about 1:1 to about 10:1 (e.g., 4:1). The solids content of the slurry containing the mixture of Components (A) and (B) can vary typically from about 5 to about 25, preferably from about 10 to about 20, and most preferably from about 15 to about 20 wt. % based on the slurry weight.

Accordingly, agglomerate formation is controlled to impart preferably the following properties to the support-agglomerate:

(1) A surface area of typically at least about 20, preferably at least about 30, and most preferably from at least about 50 m$^2$/g, which surface area can range typically from about 20 to about 800, preferably from about 30 to about 700, and most preferably from about 50 to about 600 m$^2$/g;

(2) A bulk density of the support-agglomerate particles of typically at least about 0.15, preferably at least about 0.20, and most preferably at least about 0.25 g/ml, which bulk density can range typically from about 0.15 to about 1, preferably from about 0.20 to about 0.75, and most preferably from about 0.25 to about 0.45 g/ml;

(3) An average pore diameter of typically from about 30 to about 300, and most preferably from about 60 to about 150 Angstroms; and (4) A total pore volume of typically from about 0.10 to about 2.0, preferably from about 0.5 to about 1.8, and most preferably from about 0.8 to about 1.6 cc/g.

(5) An attrition resistance which provides friability of suitable catalyst fragmentation for the particular polymerization process contemplated.

The particle size and particle size distribution sought to be imparted to the support-agglomerate particles is dictated and controlled by the type of polymerization reaction in which the ultimate supported catalyst will be employed. For example, a solution polymerization process typically can employ an average particle size of from about 1 to about 10 microns; a continuous stirred tank reactor (CSTR) slurry polymerization process of from about 8 to 50 microns; a loop slurry polymerization process of from about 10 to about 150 microns; and a gas phase polymerization process of from about 20 to about 120 microns. Moreover, each polymer manufacturer has its own preferences based on the particular reactor configuration.

Once the desired average particle size is determined for the support-agglomerate based on the targeted polymerization process, the particle size distribution will desirably be such that the Distribution Span is typically from about 0.5 to about 4, preferably from about 0.5 to about 3, and most preferably from about 0.5 to 2.

Accordingly, as a generalization, the average particle size of the support-agglomerates will range typically from about 4 to about 250 (e.g. about 8 to about 200), and preferably from about 8 to about 100 (e.g. about 30 to about 60) microns.

When the support-agglomerate is formed by spray drying, they can be further characterized in that typically at least 80, preferably at least 90, and most preferably at least 95 volume % of that fraction of the support-agglomerate particles smaller that the D$_{90}$ of the entire agglomerate particle size distribution possesses microspheroidal shape (i.e., morphology). Evaluation of the microspheroidal morphology is performed on that fraction of the particle size distribution of the support-agglomerates which is smaller than the D$_{90}$ to avoid distortion of the results by a few large particle chunks which because of their large volume, would constitute a non-representative sample of the agglomerate volume. The term "spheroidal" as used herein means small particles of a generally rounded, but not necessarily spherical shape. This term is intended to distinguish from irregular jagged chunks and leaf or rod like configurations. "Spheroidal" is also intended to include polylobed configurations wherein the lobes are also generally rounded, although polylobed structures are uncommon when the agglomerate is made as described herein.

Each microspheroid is preferably composed of a loosely to densely packed composite of Components (A) and (B) typically with some, to substantially no, interstitial void spaces, and typically substantially no visible boundaries, in an electron micrograph, between particles originally derived from Components (A) and (B).

However, microprobe image and elemental analysis of a cross-sectioned view of preferred agglomerate particles reveals that the Fe and Al ions associated with Component (B) are distributed in clusters of varying density around discrete sub-particles of material-bearing no iron or aluminum. This leads to the conclusion that, in the most preferred agglomerate particles, Component (B) is intimately admixed with Component (A) such that island of inorganic oxide (e.g., silica) are surrounded by a matrix of inorganic oxide (most likely derived from the colloidal constituents of the inorganic oxide) and layered material (e.g., clay). It is believed that the varying intensity (concentration) of Al and Fe, in the matrix is indicative of varying ratios of Component (A) to Component (B) in the matrix.

The microspheroidal shape of the support significantly enhances the desired morphology of the polymers derived therefrom. Thus, one is able to simultaneously significantly enhance catalyst activity and desired polymer morphology by utilizing chromium immobilized on the 2 two components of support-agglomerate.

The terms "surface area" and "pore volume" refer herein to the specific surface area and pore volume determined by nitrogen adsorption using the B.E.T. technique as described by S. Brunauer, P. Emmett, and E. Teller in Journal of American Chemical society, 60, pp. 209–319 (1939).

Bulk density is measured by quickly transferring (in 10 seconds) the sample powder into a graduated cylinder, which overflows when exactly 100 cc are reached. No further powder is added at this point. The rate of powder addition prevents settling within the cylinder. The weight of the powder is divided by 100 cc to give the density.

Spray drying conditions are typically controlled in order to impart the desired target properties described above to the support-agglomerate. The most influential spray drying conditions are the pH of the aqueous slurry to be spray dried, as well as its dry solids content. By "dry solids content" as used herein is meant the weight of solids in the slurry after such solids have been dried at 175° C. for 3 hours, and then at 955° C. for 1 hour. Thus, dry solids content is used to quantify the weight of solid ingredients, which exist in the slurry, and to avoid inclusion of adsorbed water in such weight.

Typically, the pH of the slurry will be controlled or adjusted to be from about 5 to about 10 (e.g., 8 to 9), preferably from about 7 to about 9, and the dry solids content will be controlled or adjusted to be typically from about 12 to 30, preferably from about 15 to about 25, and most preferably from about 18 to about 22 (e.g. 20) weight % based on the weight of the slurry and the dry weight of the gel.

Control of the remaining variables in the spray drying process, such as the viscosity and temperature of the feed, surface tension of the feed, feed rate, the selection and operation of the atomizer (preferably an air atomizer is employed and preferably without the use of a pressure nozzle), the atomization energy applied, the manner in which air and spray are contacted, and the rate of drying, are well within the skill of the spray dry artisan once directed by the target properties sought to be imparted to the product produced by the spray drying. (See for example U.S. Pat. No. 4,131,452.) Product separation from the drying air follows completion of the spray drying stage when the dried product remains suspended in air. Any convenient collection method can be employed, such as removal from the base of the spray dryer by the use of separation equipment.

The support-agglomerate described above is contacted with a chromium compound, such as a salt, that is at least partially soluble in mixing media, e.g. an aqueous or organic liquid. This is generally referred to as post-impregnation. The chromium salt may be contacted with the support as part of the formation of Component (A) or Component (B) or, alternately, upon mixing of Components (A) and (B) prior to milling of the combined components and/or prior to agglomeration, such as by spray drying of the components. It is preferred that an aqueous solution or suspension of the chromium salt be contacted with an aqueous slurry of Components (A) and (B) prior to the agglomeration of the components forming the support, as described herein above.

The chromium compounds suitable for use in forming the subject support-agglomerate composition used in the present invention can be selected from an inorganic or organic acid salt. For example, suitable inorganic salts are chromium halides, such as chromium dichloride, chromium chloride hexahydrate, chromium dibromide, chromium bromide hexahydrate, chromium tribromide chromium difluoride; as well as chromium nitrate; chromic anhydride, chromium phosphate; chromium$^{(II)}$ sulfate; chromium sulfate pentadecalhydrate and octadecal hydrate; chromium orthophosphate; and the like and mixtures thereof.

Organic chromium compounds suitable as a chromium atom source for forming the present support-agglomerate are salts of organic acids, such as chromium acetate, chromium acetate hydrate, chromium acetylacetonate, chromium proprionate, chromium oxalate hydrate, chromium oxalate hexahydrate; amine complexes such as hexamine chromium III chloride; chloropentamine chromium chloride; hexaurea chromium III fluorosilicate; chromocene and the like and mixtures thereof.

Certain chromium compounds found useful herein have greater solubility in organic solvents. These compounds include, for example, chromocene, bis-(triphenylsilyl) chromate and the like. In such instances, the salt may be contacted with Component (A) or Component (B) or its mixtures using an organic liquid solution followed by vacuum evaporation of the organic solvent at temperatures of from ambient to about 40° C. followed by spray drying or by impregnating the chromium into a previously formed support-agglomerate.

The preferred chromium precursors are chromium sulfate, chromium nitrate, chromium acetate and chromium acetylacetonate. The most preferred precursor chromium salts are the acetate and nitrate salts of chromium.

The chromium precursor may be complexed with the Lewis acid support-agglomerate described above by:

1) contacting a solution or suspension of the chromium precursor with Component (A), such as prior to milling and/or prior to spraying of Component (A);

2) contacting an aqueous solution of a mixture of Component (A) and Component (B) prior to milling of this mixture and/or prior to agglomerating the mixture, such as by spray drying; or 3) contacting previously formed support-agglomerate attained from Component (A) and Component (B), as described above, with a solution of the chromium precursor salt.

In each instance, the chromium precursor is introduced as an aqueous solution (preferred) or slurry (that is formed from a salt having at least partial solubility in water). The materials is normally contacted for a period of time of from about 15 to about 150 minutes, with from about 15 to 100 minutes being preferred. In certain instances, the materials are mixed for between 15 and 60 minutes and then allowed to remain in the mixer without agitation for a period of up to about 180 minutes. The materials are normally mixed at a temperature of from ambient to about 40° C.

For example, during the formation of Component A of the support-agglomerate described above, the chromium precursor salt may be added to the silica slurry prior to its agglomeration. Alternately and preferably, the chromium precursor salt may be admixed with the silica gel particles prior to milling or after milling in slurry form just prior to its spray drying.

Alternately, the chromium precursor salt may be added as part of the salt of an inorganic or organic compound that forms part of the composite of the clay Component B of the present Lewis acid support-agglomerate.

Still further and preferably, the aqueous solution of the mixture of Component (A) with Component (B) may have a chromium precursor salt added to the mixture prior to milling of the mixture of the resultant aqueous slurry and/or prior to forming an agglomerated product by spray drying the slurry (most preferred).

Finally a slurry of Lewis acid support-agglomerate product, which has been already produced in its agglomerated form, may be contacted with an aqueous solution of chromium precursor salt and subsequently dried.

Product separation from the drying air follows completion of the spray drying stage when the dried product remains suspended in the air. Any convenient collection method can be employed, such as removal from the base of the spray dryer by the use of separation equipment.

After formation, the supported chromium agglomerate is preferably sized prior to oxidation. This can be conveniently accomplished by screening or air classifying as is well known in the art. The particle size and particle size distribution selected will depend on the polymerization process to be applied, as would be well known in the art. Normally, when the catalyst composition of the present invention is contemplated for use in a slurry polymerization process, the particle size of the support-agglomerate is from 1 to 100, preferably from 10 to 60 microns.

The product of the support that has been treated with chromium precursor is subjected to oxidation after agglomeration to oxidize the chromium atom to a higher oxidation state (e.g. +3, +4, +6). Chromium in its +3 and +4 oxidation state are preferred. The oxidation will typically be conducted at sufficient temperature and time to reduce the total volatiles to between about 0.1 and 8 wt. % where the total volatiles are determined by measuring the weight loss upon destructive calcination of the sample at 1000° C. However, oxidation will typically be conducted by heating the chromium precursor treated support to temperatures of typically from about 600 to about 1800° F. (315 to 983° C.), preferably from about 800 to about 1500° F. (427 to 816° C.), and most preferably from about 800 to about 1000° F. (425 to 550° C.) for periods of typically from about 1 to about 600 (e.g., 50 to 600), and preferably from about 50 to about 300 minutes. The atmosphere of oxidation should be air or other oxygen-laden gas. Oxidation should be conducted in manners that will avoid sintering.

The resultant support-agglomerate has chromium (as Cr) present in from about 0.1 to 10 weight percent, preferably for about 0.2 to 5 weight percent and more preferably from about 0.3 to 2 weight percent of the resultant chromium immobilized support-agglomerate described above. For example, it has been observed that catalyst compositions formed according to the present invention have good activity when formed with support-agglomerates having from 0.5 to 1.5 weight percent chromium. Although not limited to the following presumption, it is believed that the chromium atoms of the precursor compound are bonded (such as covalently bonded) to the support-agglomerate through oxygen atoms. For example, residual hydroxyl groups of the inorganic oxide may provide sites which react with chromium precursor compound and result in an oxygen bridge between the chromium atom and the support-agglomerate. Another example may be the immobilization of the chromium atom to sites associated with Component (B). Thus, the chromium atom may be immobilized with sites associated with Component (A) or Component (B) or with a combination of sites associated with Component (A) and Component (B).

The formed chromium immobilized support-agglomerate has been found useful as a support for the bidentate and or tridentate transition metal chelate I and II described above. The chelates I and/or II can be impregnated into the support by forming a slurry of at least one Compound I or II with the chromium support-agglomerate at low temperature of from about ambient to about 75° C. for a sufficient time to permit the chelate to impregnate and be bound to the support-agglomerate.

The catalyst composition of the present invention can be used for polymerization, typically addition polymerization processes wherein one or more monomers are contacted with the coordination catalyst system (either in its original inert liquid or as separated solid product, as described above) by introduction into the polymerization zone under polymerization conditions.

Suitable polymerizable monomers include ethylenically unsaturated monomers, acetylenic compounds, conjugated or non-conjugated dienes, and polyenes. Preferred monomers include olefins, for example alpha-olefins having from 2 to 20,000, preferably from 2 to 20, and more preferably from 2 to 8 carbon atoms and combinations of two or more of such alpha-olefins. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene or combinations thereof, as well as long chain vinyl terminated oligomeric or polymeric reaction products formed during the polymerization and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1,1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed. The most preferred is ethylene alone or with other alpha-olefins.

In addition, the polymerization monomers may include functionalized ethylenically unsaturated monomers wherein the functional group is selected from hydroxyl, carboxylic acid, carboxylic acid esters, acetates, ethers, amides, amines and the like.

The present coordination catalyst system (composition) can be advantageously employed in a high pressure, solution, slurry or gas phase polymerization process. Methods and apparatus for effecting such polymerization reactions are well known. As used herein, the term polymerization includes copolymerization and terpolymerization, and the terms olefins and olefinic monomers include olefins, alpha-olefins, diolefins, styrenic monomers, acetylenically unsaturated monomers, cyclic olefins, and mixtures thereof.

For example, polymerization of olefin monomers can be carried out in the gas phase by fluidizing, under polymerization conditions, a bed comprising the target polyolefin powder and particulates of the present catalyst composition using a fluidizing gas stream comprising gaseous monomer. In a solution process the (co)polymerization is typically conducted by introducing the monomer into a solution or suspension of the catalyst composition in a liquid hydrocarbon under conditions of temperature and pressure such that the produced polyolefin forms as a solution in the hydrocarbon diluent. In the slurry process, the temperature, pressure and choice of diluent are such that the produced polymer forms as a suspension in a liquid hydrocarbon diluent.

The catalyst system according to the present invention can be used in similar amounts and under similar conditions known for olefin polymerization catalysts. However, due to the enhanced catalytic activity exhibited by the present compositions, lower dosages of catalyst are required for a specific production of polymer. Alternately, the same dosage of catalyst composition, as is conventionally used with its relevant coordinate catalyst composition, will produce higher yields of polymer product.

Typically for the slurry process, the temperature is from approximately 0° C. to just below the temperature at which the polymer becomes soluble in the polymerization medium. For the gas phase process, the temperature is from approximately 0° C. to just below the melting point of the polymer. For the solution process, the temperature is typically the temperature from which the polymer is soluble in the reaction medium up to approximately 275° C.

The pressure used can be selected from a relatively wide range of suitable pressures, e.g., from subatmospheric to about 20,000 psi. Preferred pressures can range from atmospheric to about 1000 psi, and most preferred from 50 to 550 psi. In the slurry or particle form process, the process is suitably performed with a liquid inert diluent such as a saturated aliphatic hydrocarbon. The hydrocarbon is typically a $C_3$ to $C_{10}$ hydrocarbon, e.g., propane, isobutane or an aromatic hydrocarbon liquid such as benzene, toluene or xylene. The polymer can be recovered directly from the gas phase process, by filtration or evaporation of the slurry from the slurry process, or evaporation of solvent in the solution process. When a scavenger agent is used in combination with the present supported catalyst, they may be introduced into the polymerization zone either sequentially or simultaneously. When introduced simultaneously, they may be first formed into a common mixture with a hydrocarbon liquid that is miscible with the hydrocarbon liquid in the reaction zone. The amount of catalyst and scavenger used will vary and be controlled in a manner to sustain the polymerization reaction within the reaction zone, as is well known to those skilled in this art.

The supported catalyst composition of the present invention can be used as the sole catalyst composition in the polymerization of olefins. Alternately, it may be used in combination with at least one supplemental active catalyst species such as metallocene, constrained geometry, bidentate or tridentate ligand containing materials.

For example, the catalyst compositions of the present invention may be admixed with at least one secondary preformed catalyst particulate that utilizes a support-agglomerate formed from a mixture comprising (A) at least one inorganic oxide component, and (B) at least one ion-containing layered component, which optionally has chromium atoms immobilized on and/or within the agglomerate.

The morphological configuration in which the supplemental catalyst species is employed will typically involve use of at least one supplemental catalytic species absorbed or adsorbed in and/or on (a) a support-agglomerate particles in which chromium is immobilized on and/or within the support; (b) a support-agglomerate particles which do not contain chromium, such as described herein; or (c) mixtures of (a) and (b). Such supplemental catalysts are disclosed in U.S. application Ser. No. 60/287,607; Ser. No. 60,287,602; Ser. No. 60/287,617; and Ser. No. 60/287,600; and concurrently filed and copending U.S. applications having Ser. No. 10/120,289; Ser. No. 10/120,291; Ser. No. 10/120,317; Ser. No. 10/120,317: and Ser. No. 10/120,310 ; the teachings of which are incorporated herein in their entirety by reference.

For example, the additional particulate may be formed by:

I. contacting substantially simultaneously or sequentially in a liquid media at least one ligand forming compound comprising at least one bidentate ligand forming compound or at least one tridentate ligand forming compound or mixtures thereof with a transition metal compound and with a support-agglomerate comprising (A) at least one inorganic oxide component, and (B) at least one ion-containing layered component. The agglomerate may further have chromium atoms immobilized on and/or within the agglomerate. The resultant particles have the catalyst component(s) contained on such support-agglomerate;

II. contacting substantially simultaneously or sequentially in a liquid media at least one coordination catalyst distinct from that used to form the present composition comprising at least one transition metal bidentate ligand containing compound or at least one transition metal tridentate chelate ligand containing compound or mixtures thereof alone or further with at least one constrained geometry transition metal compound (e.g., a metallocene or its precursors, such as a cyclopentadienyl compound and a metal selected from titanium, zirconium or hafnium) with a support-agglomerate comprising (A) at least one inorganic oxide component, and (B) at least one ion-containing layered component. The agglomerate may further have chromium atoms immobilized on and/or within the agglomerate. The resultant particles have the catalyst component(s) contained on such support-agglomerates;

III. contacting substantially simultaneously or sequentially in a liquid media a mixture comprising a) at least one transition metal bidentate ligand containing compound or at least one transition metal tridentate ligand containing compound or mixtures thereof with b) at least one metallocene or constrained geometry transition metal compound (e.g., a metallocene or its precursors, such as cyclopentadiene or its derivative compounds and a metal selected from titanium, zirconium or hafnium), and with c) a support-agglomerate comprising (A) at least one inorganic oxide component, and (B) at least one ion-containing layered component. The agglomerate may further have chromium atoms immobilized on and/or within the agglomerate. The resultant particles have the catalyst component(s) contained on such support-agglomerate; or IV. contacting substantially simultaneously or sequentially in a liquid media at least one metallocene or constrained geometry transition metal compound (e.g., a metallocene or its precursors, such as a cyclopentadiene or its derivative compounds and a metal selected from titanium, zirconium or hafnium), with a support-agglomerate comprising (A) at least one inorganic oxide component, and (B) at least one ion-containing layered component. The agglomerate may further have chromium atoms immobilized on and/or within the agglomerate. The resultant particles have the catalyst component(s) contained on such support-agglomerate.

The present catalyst may be employed with the supplemental catalyst species in any proportion. Thus, one may customize a blend to enhance one or more of the properties of the resultant catalyst composition. For example, if the particular catalyst of the present invention provides a polymer from a particular monomer which exhibits bimodal molecular weight distribution with one modality being substantially greater than the other, a second supported catalyst (supplemental catalyst) may be used to modify the bimodal nature of the resultant polymer product. The specific identity of the supplemental supported catalyst(s) and the exact ratio to be used to form the admixture will depend on the modification of the property being observed, the nature of each catalyst component and the polymerization conditions contemplated. Such conditions can be determined by simple experimentation by one skilled in this art.

For example, in an embodiment wherein the present catalyst composition is employed in a mixture with particles of supplemental catalyst specie(s), the present catalyst composition may be a component of a catalyst system that comprises from about 1 to about 99 (e.g., 10 to 90, such as 20 to 85) weight percent of support-agglomerate of a first catalyst composition of the present invention and from about 95 to about 2 (e.g., 90 to 10, such as 80 to 15, respectively) weight percent of a second supported supplemental catalyst specie(s) formed from supported bidentate or tridentate transition metal complexes, a metallocene or constrained geometry transition metal compound or precursors of the complex or of the compound, respectively, or mixtures thereof.

In another embodiment, the present catalyst may be a component of a catalyst composition in which each particle is a composite of the supported catalyst species of the present invention and at least one supplemental catalyst species. The composite particle may be formed by physically mixing chromium immobilized support-agglomerate coordination catalyst of the present invention and a second prior formed supplemental catalyst species such as described above and reforming the particulate material into a uniform mixed particulate or by introducing the present catalyst during the formation of the supplemental catalyst specie(s) or visa versa. The ratio of present catalyst to supplemental catalyst within each particle may vary widely and will depend on the particular end result desired (catalyst activity, polymer properties, etc.) The composition of the particles may be, for example, from about 5 to about 98 (e.g., 10 to 90, such as 20 to 85) weight percent of a first catalyst component composed of the chromium support-agglomerate described herein and from about 95 to about 2 (e.g., 90 to 10, such as 80 to 15, respectively) weight percent of a second supplemental catalyst component. The compounds useful in the formation of each of the above composite particles are described in the above referenced U.S. patent applications concurrently filed with this application.

It has been unexpectedly found that the present catalyst composition provides polyolefin product (e.g., polyethylene) having bimodal molecular weight distribution (Mw/Mn of greater than 16) and high molecular weight (e.g. Mw of greater than about 400,000). The bimodality of the polymer product can be observed by determining the polymer concentration with respect to molecular weight distribution. Such determination can be made using conventional gel permeation chromatography. The resultant analysis generally exhibits two concentrations at different molecular weight fractions to thus signify formation of polymer product having a high and a lower molecular weight distribution. Thus, the present catalyst composition provides an improved polymerization process wherein polymer having bimodal molecular weight distribution can be formed in a single reaction zone.

All references herein to elements or metals belonging to a certain Group refer to the Periodic Table of the Elements in Hawley's Condensed Chemical Dictionary, 12$^{th}$ Edition. Also, any references to the Group or Groups shall be to the Group or Groups as reflected in this Periodic Table of Elements using the new notation system for numbering groups.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLE 1

Preparation of Support-Agglomerate

Part A—Preparation of Base Silica Hydrogel

Silica gel was prepared by mixing an aqueous solution of sodium silicate and sulfuric acid under suitable agitation and temperature to form a silica sol that sets to a gel in about 8 minutes. The resulting gel was base washed with dilute (about 2 wt. %) ammonia ($NH_3$) solution at 65.5° C. (150° F.) for 18 to 36 hours. During this time, the silica gel was cleansed of salt by-products and the surface area was modified. The base wash was followed by a fresh water wash wherein the gel was placed in a re-circulating bath at 82° C.

The base washed gel was aged at 65–82° C. for about 36 hours and a pH of 6 to 7 for one sample designated 1A, and at a pH of 7.5 to 9 for another sample designated 1B. The surface area of the gel was thereby reduced to about 600 $m^2/g$ for Sample 1A and to 300 $m^2/g$ for Sample 1B. The resulting water washed gel of Samples 1A and 1B have a $SiO_2$ content of about 35 wt. % with the balance being water, and an Average Particle Size (APS) of Samples 1A and 1B of from 0.5 to 2.0 micron.

Part B(i)—Preparation of Wet Milled Hydrogel Sample 2A (SA 600 $m^2/g$)

A Sample 1A silica gel prepared in accordance with Part A was subjected to wet milling in a sand mill. Sufficient water was then added thereto to make a slurry of 20 wt. % solids. The bulk sample particle size was reduced with a blade mill and further processed through a wet sand mill to reduce the average particle size (APS) to <100 microns. The sample was then sand milled. The slurry was pumped through the sand mill at 1 liter per minute with a media load of 80% (4 liters) zirconia silicate 1.2 mm beads. The average particle size was reduced to 8 and 10 microns and the particle size distribution was 4/8/15 microns for $D_{10}$, $D_{50}$ and $D_{90}$. The surface area was 600 $m^2/g$. The resulting wet milled sample was designated Sample 2A. Sample 2A had a colloidal content between 20 and 25 wt. % as determined by centrifugation.

Part B(ii)—Preparation of Wet Milled Hydrogel Sample 2B (SA 300 $m^2/g$)

Example 1, Part B(i) was repeated using base silica gel Sample 1B. The resulting wet milled sample was designated Sample 2B and had a colloidal content between 15 and 30 wt. % as determined by centrifugation and a SA of 300 $m^2/g$. The resulting material was designated Sample 2B.

Part C—Preparation of Dry Milled Sample 3B (SA 300 $m^2/g$)

A base silica gel Sample 1B prepared in accordance with Part A was subjected to dry milling procedure as follows:

The sample was spray dried to a moisture content below 10 wt. %. The dried powder sample was then milled to an average particle size (APS) of about 5 microns, a surface area (SA) of still about 300 $m^2/g$, and a $N_2$ pore volume of 1.5 cc/g. The resulting sample was designated Sample 3B.

Part D—Preparations of Dry Milled Sample 3A (600 $m^2/g$)

Part C was repeated except that the base silica gel was Sample 1A prepared in accordance with Example 1, Part A. The resulting dry milled sample had a moisture content of less than 10 wt. %, an APS of 5 microns and a SA of 600 $m^2/g$. The resulting sample was designated Sample 3A.

Part E—Preparation of Silica Slurry

Six different blends (designated Runs 1 to 6) of Sample 2B and Sample 3B were prepared at weight ratios of Sample 3B (dry milled):Sample 2B (wet milled) as reported in Table I. Before blending, Sample 3B was slurried in water to a 20 wt. % solids content using a mixer. The Sample 3B slurry was then added to the 20 wt. % solids content aqueous slurry of Sample 2B at amounts sufficient to achieve the ratios reported in Table I.

TABLE I

Silica Support Slurries
Sample 3B (Dry Milled):Sample 2B (Wet Milled)

| Run Number | Ex No | Weight % Ratio | Weight Ratio |
|---|---|---|---|
| 1 | Ex 1 Part E | 79/21 | 3.75:1 |
| 2 | Ex 1 Part E | 78/22 | 3.50:1 |
| 3 | Ex 1 Part E | 75/25 | 3.00:1 |
| 4 | Ex 1 Part E | 70/30 | 2.25:1 |
| 5 | Ex 1 Part E | 60/40 | 1.50:1 |
| 6 | Ex 1 Part E | 0/100 | 0:1 |

Part F—Preparation of Alternate Silica Support Slurries

Part E was repeated except that Sample 3B (300 m$^2$/g) was replaced with Sample 3A (600 m$^2$/g) and Sample 2B (300 m$^2$/g) was replaced with Sample 2A (600 m$^2$/g). The dry milled/wet milled ratios employed are summarized at Table V and the slurries designated Runs 7 to 9.

TABLE II

Sample 3A (Dry Milled):Sample 2A (Wet Milled)

| Run Number | Weight % Ratio | Weight Ratio |
|---|---|---|
| 7 | 75/25 | 3.00:1 |
| 8 | 60/40 | 1.50:1 |
| 9 | 0/100 | 0:1 |

Part G—Preparation of Clay Slurry

A montmorillonite clay available from Southern Clay, under the trade names, Montmorillonite BP Colloidal Clay, was obtained. This clay has the following properties as summarized at Table III.

TABLE III

Chemical Composition of Montmorillonite BP Colloidal Clay

| Chemical Composition | | Physical Properties | |
|---|---|---|---|
| Component | Weight % | Appearance | Tan Powder |
| SiO2 | 69.5 | Apparent Bulk Density | 0.45 g/cc |
| Fe2O3 | 4.4 | Surface Area | 70 m$^2$/g |
| Al2O3 | 19.0 | APS | 1.5 microns |
| MgO | 2.3 | Average Pore Diameter | 114 Å |
| CaO | 1.0 | Total Pore Volume | 0.20 cc/g |
| Na2O | 2.7 | | |
| SO4 | 0.6 | | |

Part H—Preparation of Silica/Clay Slurry for Spray Drying

Each of the silica slurries of Runs 1 to 9 was combined with the clay slurry of Part G in a manner sufficient to control the weight ratio of silica:clay dry solids to be as reported at Table IV. Each slurry was adjusted with acid (sulfuric acid) or base (ammonium hydroxide) to achieve a slurry pH of 7–8.5. The APS of the slurry solids was about 4 to 5 microns, the total dry solids content of the slurry was about 15 to 18 wt. %. The resulting slurries are designated Runs 10 to 18.

TABLE IV

Spray Drying or Tray Drying Slurry and Conditions

| Run No. | Ex. No. | Source of Silica (Run Nos.) | Silica:Clay Dry Solids Ratio (w/w) |
|---|---|---|---|
| 10 | Ex 1 Pt H | 1 | 95:5 |
| 11 | Ex 1 Pt H | 2 | 90:10 |
| 12 | Ex 1 Pt H | 3 | 80:20 |
| 13 | Ex 1 Pt H | 4 | 65:35 |
| 14 | Ex 1 Pt H | 5 | 50:50 |
| 15 | Ex 1 Pt H | 6 | 25:75 |
| 16 | Ex 1 Pt H | 7 | 80:20 |
| 17 | Ex 1 Pt H | 8 | 50:50 |
| 18 | Ex 1 Pt H | 9 | 25:75 |

Part I—Spray Drying of Silica/Clay Slurry

The ph value of the silica/clay slurry was adjusted and was then pumped to a spray dryer to the mixture and to form microspheroidal agglomerates. All spray drying is conducted by using a Bowen 3-ft. diameter spray dryer with inlet-outlet temperatures of 350/150° C. and a two-fluid spray nozzle using air at 10–30 psi to atomize the slurry. The air through-put of the Niro is dampened to keep the spray chamber under 7" water vacuum and the slurry is fed at 250–300 cc/min. The product is then collected in the chamber collection pot, located directly under the drying chamber, where the coarsest fraction drops out from air entrainment. Other, smaller fractions go to a cyclone collection pot and the smallest to a baghouse. The chamber material is then screened through 200 to 250 mesh to give the desired APS of 40–55 microns. The Total Volatiles (TV %) at 954.4° C. (1750° F.) of the spray dried product is in the range of 2–20 wt. %, so further drying in a static bed oven at 150–800° C. is the total volatiles down to 0.5–5%.

The total yield of material from the spray dryer chamber collection pot and from screening the same is about 15–20 wt. %.

Table V below reports silica/clay morphological properties of the resulting agglomerates. The resulting Agglomerate Samples are designated Runs 19 to 27.

TABLE V

Spray Dried Silica/Clay Support-agglomerate Product Properties

| | | Slurry | Agglomerate Properties | | | | |
|---|---|---|---|---|---|---|---|
| Run No. | Ex. No. | Source from Table VII (Run No.) | Silica/Clay (Weight Ratio) | APS (microns) | SA (m$^2$/g) | Pore Vol. (cc/g) | Drying Procedure |
| 19 | Ex 1 | 10 | 95:5 | 45 | 275 | 1.65 | Spray |
| 20 | Ex 1 | 11 | 90:10 | 45 | 268 | 1.61 | Spray |
| 21 | Ex 1 | 12 | 80:20 | 45 | 251 | 1.48 | Spray |
| 22 | Ex 1 | 13 | 65:35 | 45 | 213 | 1.28 | Spray |
| 23 | Ex 1 | 14 | 50:50 | 45 | 185 | 1.04 | Spray |
| 24 | Ex 1 | 15 | 25:75 | 45 | 160 | 0.64 | Spray |

TABLE V-continued

Spray Dried Silica/Clay Support-agglomerate Product Properties

| | | Slurry | Agglomerate Properties | | | | |
|---|---|---|---|---|---|---|---|
| Run No. | Ex. No. | Source from Table VII (Run No.) | Silica/Clay (Weight Ratio) | APS (microns) | SA (m²/g) | Pore Vol. (cc/g) | Drying Procedure |
| 25 | Ex 1 | 16 | 80:20 | 45 | 494 | 1.16 | Spray |
| 26 | Ex 1 | 17 | 50:50 | 45 | 322 | 0.83 | Spray |
| 27 | Ex 1 | 18 | 25:75 | 45 | 192 | 0.54 | Spray |

EXAMPLE 2

A. General Procedure for Preparation of Cr Immobilized Support-Agglomerate Material The chromium immobilized support-agglomerate was prepared by spray-drying an aqueous mixture (contain about 15% solids) of clay [montmorillonite, APS (average particle size) about 1.5 $\mu$m], wet-milled silica powder (APS about 5 $\mu$m), sand-milled silica hydrogel (contain ~25% colloid; APS about 5–8 $\mu$m), and chromium acetate solution (1 wt %). The percentages of the clay, silica powder and hydrogel may be varied to meet the desired specific physical properties of the particles. The SA (surface area) is normally between 185–600 m²/g, while the PV (pore volume-$N_2$) is from 0.6–1.6 cc/g.

B. Spray-Dry Feed Chromium Immobilized Support-Agglomerate (SDF)

A solid slurry of Example I, Table 4, Run 16 was mixed with 1 wt % chromium acetate solution. This slurry was used as spray dryer feed to give spherical particles having 464 m²/g surface area and 1.24 cc/g pore volume ($N_2$). The particle size for this material was 53 micron.

EXAMPLE 3

Activation Procedures of Chromium Immobilized Support-Agglomerate

About 30 c.c. of each catalyst sample were fluidized in a quartz tube (4.8 cm O.D.) which had a sintered frit to support the catalyst powder. Dry air passed through beds containing activated alumina (typically less than 1 ppm $H_2O$) was used as fluidizing medium. The dry air flow rate was 40 liter per hour. The fluidized bed was heated at the rate of 400° C./hour to the pre-set temperature, which was then kept constant for 5 hours. The quartz tube with the activated catalyst sample was then transferred to a glass container under dry nitrogen for storage. The Cr immobilized support-agglomerate (Example 2 Part B) to be used for supporting the bi- or tri-dentate ligand containing transition metal complexes were activated in fluidized bed with a stream of dry oxygen at temperatures of 800, 1,000, and 1,100° F.

EXAMPLE 4

A. Polymerization Method

In the slurry polymerization experiments of this and the following examples, unless otherwise indicated, a 2-liter Zipperclave (Autoclave Engineers, Inc.) reactor was rendered inert by heating under vacuum at the polymerization temperature 80° C., for 90 minutes. A reactor charge consisting of a mixture of 400 ml of dry, degassed heptane and the specified amount of triisobutylaluminum and the specified supported catalyst system were injected into the reactor. While the reactor contents were stirred at 500 rpm, ethylene and hydrogen (where used) were quickly introduced into the reactor until a final reactor pressure of 200 psig was attained. The stated polymerization temperature was maintained by a circulating water bath. Ethylene was supplied on demand via a mass flow controller to maintain the reactor pressure at about 200 psig. After 60 minutes, the ethylene (and hydrogen) feed was stopped and the reactor cooled to room temperature and vented. The resulting polymer slurry was filtered and washed with methanol and acetone to deactivate any residual catalyst, filtered and dried in a vacuum oven at about 50° C. for at least three hours to constant weight. After drying, the polymer was weighed to calculate catalyst activity and a sample of dried polymer was used to determine apparent bulk density according to the procedure of ASTM 1895. Polymer molecular weight and molecular weight distribution data were obtained by GPC, where indicated.

B. Preparation of Heterogeneous Tridentate Ligand Containing Transition Metal Complex Supported by Cr Immobilized Support-Agglomerate Catalyst Three samples, each composed of a toluene (50 ml) slurry of 1-gram dry oxygen-activated Cr immobilized support-agglomerate formed at three different activation temperature (800, 1,000, 1,100° F.) were each treated with 10 mg (19 micromoles) tridentate 2,6-diacetylpyridine-bis(2,4,6-trimethylanaline)$FeCl_2$ complex at room temperature overnight (~15 h). The resulting solid slurry was filtered, washed with heptane (2×15 ml), and dried under vacuum to give brown color, free-flowing power.

C. Polymerization Results of the Heterogeneous Cr Immobilized Support-Agglomerate/Tridentate Fe Catalyst The catalyst obtained from Example 4-B was added to a heptane (400 ml) solution that contained 0.1 mmole triisobutylaluminum (1M in toluene solution). The catalyst mixture was injected to a pre-heated (80° C.) and pre-vacuumed 2-liter Zipperclave reactor. Ethylene gas was rapidly introduced into the reactor until it reached 200 psig. Ethylene consumption is then gauged by a flow meter to maintain the reactor pressure at 200 psig for one hour. After the reaction, the unreacted ethylene was removed and the heptane/PE slurry was de-activated by the addition of acetone. The supernatant liquid was removed and the granular PE powder was washed with acetone and dried in a hot (50° C.) vacuum oven for about 3 h. Performance of catalyst is listed in Table VI below:

TABLE VI

Catalyst Performance of using Cr—Fe dual catalyst.

| Cat # | Activation Temp °F. | Cat. Wt mg | PE yield g | Mw | PDI (Mw/Mn) | ABD‡ g/cc | HLMI† |
|---|---|---|---|---|---|---|---|
| 1 | 800 | 100 | 57 | 511,300 | 34.7 | 0.28 | 0.35 |
| 2 | 1,000 | 40 | 38 | 471,700 | 21.0 | 0.31 | 0.65 |
| 3 | 1,100 | 40 | 32 | 346,100 | 16.8 | 0.28 | 0.80 |

Polymerization conditions are at 80° C. and 200 psi.
†HLMI = high load melt index.
‡ABD = Apparent polymer bulk density.

The GPC chromatograms of the PE formed from the above catalysts show that each polymer is bimodal. The degree of bi-modality, molecular weight and molecular weight distribution of the PE are dependent on the activation temperature of the chromium oxide support-agglomerate used. The high molecule weight of the PE can be adjusted and the fraction can be increased if a lower temperature activated chromium oxide support-agglomerate was used to contact with tridentate 2,6-diacetylpyridine-bis(2,4,6-trimethylanaline)FeCl$_2$ complex.

The principles, preferred embodiments and modes of operation of the present invention have been described in the foregoing specification. The invention which is intended to be protected herein, however, is not to be construed as limited to be particular forms disclosed, since these are to be regarded as illustrative rather than restrictive. Variations and changes may be made by those skilled in the art, without departing from the spirit of the invention.

What is claimed is:

1. A coordinating catalyst system capable of polymerizing olefins comprising:

(I) a pre-catalyst comprising at least one non-metallocene, non-constrained geometry compound selected from bidentate ligand containing transition metal compound, tridentate ligand containing transition metal compound and mixtures thereof, wherein the transition metal is at least one member selected from Groups 3 to 10 of the Periodic table; in intimate contact with (II) chromium immobilized support-agglomerate comprising a composite of (A) at least one inorganic oxide component; and (B) at least one ion containing layered material; chromium atoms immobilized to component (A), Component (B) or both;

wherein the amount of the pre-catalyst (I) and support-agglomerate (II) provides a ratio of micromoles of pre-catalyst to grams of support-agglomerate of from about 5:1 to about 500:1.

2. The catalyst of claim 1 wherein said support-agglomerate comprises a composite of (A) at least one inorganic oxide component selected from SiO$_2$, Al$_2$O$_3$, MgO, AlPO$_4$, TiO$_2$, ZrO$_2$, Cr$_2$O$_3$, SiO$_2$.Al$_2$O$_3$, MgO.SiO$_2$.Al$_2$O$_3$, SiO$_2$.TiO$_2$ SiO$_2$.TiO$_2$.Al$_2$O$_3$, SiO$_2$.Cr$_2$O$_3$.Al$_2$O$_3$, and SiO$_2$.Cr$_2$O$_3$.TiO$_2$, and mixtures thereof; and (B) at least one ion containing layered material having interspaces between the layers, said layered material having a cationic component and an anionic component, wherein said a cationic component is present within the interspace of the layered material, said layered material being intimately dispersed with said inorganic oxide component of the support-agglomerate and said support-agglomerate has from 0.1 to 10 weight percent chromium immobilized thereto.

3. The catalyst system of claim 2 which additionally comprises at least one organometallic compound represented by the structural formula:

wherein M represents at least one element of Group 1, 2, or 13 or the Periodic Table, tin or zinc, and each R independently represents at least one of hydrogen, halogen, or hydrocarbon-based group, and "s" is a number corresponding to the oxidation number x of M; said organometallic compound being present in an amount sufficient to provide a molar ratio of organometallic compound to pre-catalyst from about 0.001:1 to about 10,000:1.

4. The catalyst system of claim 2 wherein the pre-catalyst is a bidentate ligand containing transition metal compound represented by the

formula:
wherein:
   (I) each A independently represents oxygen, sulfur, phosphorus or nitrogen;
   (II) Z represents a transition metal selected from at least one of the group of Fe, Co, Ni, Ru, Rh, Pd, Os, Ir and Pt in the +2 oxidation state, and Ti, V, Cr, Mn, Zr, and Hf in the +2, +3 or +4 oxidation state:
   (III) each L and L' independently represents a ligand group selected from at least one of hydrogen, halogen, hydrocarbon based radical, or two L groups, together represent a hydrocarbon based radical, which, together with Z, constitute a heterocyclic ring structure;
   (IV) "a" is an integer of 0 or 1 and represents the number of L' groups bound to Z to provide a neutral compound; and
   (V) the lines joining each A to each other A represent a hydrocarbon based radical joined to A by a double or single bond, the lines joining each A to Z represent a covalent or dative bond.

5. The catalyst system of claim 2 wherein the transition metal compound is a tridentate ligand containing transition metal compound represented by the formula:

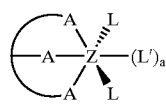

wherein:
   (I) each A independently represents oxygen, sulfur, phosphorous or nitrogen;
   (II) Z represents a transition metal selected from at least one of the group of Fe, Co, Ni, Ru, Rh, Pd, Os, Ir and Pt in the +2 oxidation state and Ti, V, Cr, Mn, Zr, and Hf in the +2, +3 or +4 oxidation state;
   (III) each L and L' independently represents a ligand group selected from at least one of hydrogen, halogen and hydrocarbon based radical, or two L groups together represent a hydrocarbon based radical, which together with Z, constitute a heterocyclic ring structure; and (IV) "a" is an integer of 0, 1, or 2 and represents the number of L' groups bound to Z to provide a neutral compound; and (V) the lines joining each A to each other A represent a hydrocarbon based radical joined to A by a double or single bond, and the lines joining each A to Z represent a covalent or dative bond.

6. The catalyst system of any one of claims 4 and 5 wherein each A represents a nitrogen atom, each L and L' is independently selected from halogen, hydrocarbyl or mixtures thereof, or two L groups together represent hydrocarbylene which together with Z constitute a 3 to 7 member heterocyclic ring structure.

7. The catalyst system of any one of claims 4 and 5 wherein at least one L of the pre-catalyst is selected from hydrocarbyl.

8. The catalyst system of claim 4 or 5 wherein Z is selected from Ni, Pd, Fe or Co.

9. The catalyst system of claim 4 or 5 wherein Z is selected from Ni or Pd and each L is independently selected from chlorine, bromine, iodine, or $C_1$–$C_8$ alkyl.

10. The catalyst system of claim 4 or 5 wherein Z is selected from iron or cobalt and each L is independently selected from chlorine, bromine, iodine, or $C_1$–$C_8$ alkyl.

11. The catalyst system of claim 2 wherein the layered material of the support-agglomerate is at least one of clay or clay minerals having a negative charge of below 0.

12. The catalyst system of claim 11 wherein the layered material is a smectite clay, the weight ratio of inorganic oxide to clay in the support-agglomerate is from about 0.25:1 to about 99:1, and the ratio of micromoles of precatalyst to grams of support-agglomerate is from about 10:1 to about 250:1.

13. The catalyst system of claim 12 wherein the smectite clay is selected from montmorillonite and hectorite, the weight ratio of inorganic oxide to clay in the support-agglomerate agglomerate is from about 0.5:1 to about 20:1, and the ratio of micromoles of pre-catalyst to grams of support-agglomerate is from about 30:1 to about 100:1.

14. The catalyst system of claim 2 wherein the inorganic oxide component (A) comprises $SiO_2$, the weight ratio of $SiO_2$ to layered material in the support-agglomerate is from about 0.1:1 to about 10:1, the ratio of micromoles of pre-catalyst to grams of support-agglomerate is from about 30:1 to about 100:1.

15. The catalyst system of any one of claim 1, 2, 3, 11, 12, 13 or 14 wherein the support-agglomerate comprises spray dried agglomerate particles comprising constituent particles of at least one or said inorganic oxides and at least one of said layered materials wherein:

(I) at least 80% of the volume of the agglomerated particles smaller than $D_{90}$ of the entire agglomerate particle size distribution possesses a microspheroidal morphology;

(II) the support-agglomerate particles possess:
(A) an average particle size of from about 4 to about 250 microns, and
(B) a surface area of from 20 to about 800 $m^2$/gm; and (III) the inorganic oxide particles forming the agglomerate particles have an average particle size, prior to spray drying of from about 0.2 to about 10 microns, and the constituent layered material particles have an average particle size, prior to spray drying of from about 0.01 to about 50 microns.

16. The catalyst system of claim 1, 2, 3, 4, 5, 11, 12, 13 or 14 wherein component (B) of the chromium immobilized support-agglomerate is present in an effective amount to provide sufficient Lewis acidity, when present in the catalyst composition, to activate the precatalyst and provide a coordination catalyst system for polymerizing ethylene monomer, said activation, expressed in Kg of polyethylene per gram of catalyst system per hour.

17. The catalyst system of claim 4 or 5 wherein the supported pre-catalyst is in particulate form and the system further comprises particulates of a second supported catalyst.

18. The catalyst system of claim 4 or 5 wherein the system comprises particles, each of said particles comprising at least one bidentate or tridentate precatalyst and at least one second supported catalyst or the precursors therefore.

19. The catalyst system of claim 6 wherein the support-agglomerate comprises spray dried agglomerate particles comprising constituent particles of at least one of said inorganic oxides and at least one of said layered materials wherein:

(I) at least 80% of the volume of the agglomerated particles smaller than $D_{90}$ of the entire agglomerate particle size distribution possesses a microspheroidal morphology:

(II) the support-agglomerate particles possess:
(A) an average particle size of from about 4 to about 250 microns, and
(B) a surface area of from 20 to about 800 $m^2$/gm; and (III) the inorganic oxide particles forming the agglomerate particles have an average particle size, prior to spray drying of from about 0.2 to about 10 microns, and the constituent layered material particles have an average particle size, prior to spray drying of from about 0.01 to about 50 microns.

20. The catalyst system of claim 7 wherein the support-agglomerate comprises spray dried agglomerate particles comprising constituent particles of at least one of said inorganic oxides and at least one of said layered materials wherein:

(IV) at least 80% of the volume of the agglomerated particles smaller than $D_{90}$ of the entire agglomerate particle size distribution possesses a microspheroidal morphology;

(V) the support-agglomerate particles possess:
(A) an average particle size of from about 4 to about 250 microns, and
(B) a surface area of from 20 to about 800 $m^2$/gm; and (VI) the inorganic oxide particles forming the agglomerate particles have an average particle size, prior to spray drying of from about 0.2 to about 10 microns, and the constituent layered material particles have an average particle size, prior to spray drying of from about 0.01 to about 50 microns.

21. The catalyst system of claim 6 wherein component (B) of the chromium immobilized support-agglomerate is present in an effective amount to provide sufficient Lewis acidity, when present in the catalyst composition, to activate the precatalyst and provide a coordination catalyst system for polymerizing ethylene monomer, said activation, expressed in Kg of polyethylene per gram of catalyst system per hour.

22. The catalyst system of claim 7 wherein component (B) of the chromium immobilized support-agglomerate is present in an effective amount to provide sufficient Lewis acidity, when present in the catalyst composition, to activate the precatalyst and provide a coordination catalyst system for polymerizing ethylene monomer, said activation, expressed in Kg of polyethylene per gram of catalyst system per hour.

23. The catalyst system of claim 8 wherein component (B) of the chromium immobilized support-agglomerate is present in an effective amount to provide sufficient Lewis acidity, when present in the catalyst composition, to activate the precatalyst and provide a coordination catalyst system for polymerizing ethylene monomer, said activation, expressed in Kg of polyethylene per gram of catalyst system per hour.

24. The catalyst system of claim 9 wherein component (B) of the chromium immobilized support-agglomerate is present in an effective amount to provide sufficient Lewis acidity, when present in the catalyst composition, to activate the precatalyst and provide a coordination catalyst system for polymerizing ethylene monomer, said activation, expressed in Kg of polyethylene per gram of catalyst system per hour.

25. The catalyst system of claim 10 wherein component (B) of the chromium immobilized support-agglomerate is present in an effective amount to provide sufficient Lewis acidity, when present in the catalyst composition, to activate the precatalyst and provide a coordination catalyst system for polymerizing ethylene monomer, said activation, expressed in Kg of polyethylene per gram of catalyst system per hour.

26. A coordinating catalyst system formed by the process comprising:
   a) contacting, in a liquid medium, a chromium compound having solubility in the media with a support-agglomerate precursor comprising (A) at least one inorganic oxide, (B) at least one ion-containing layered clay or mixtures of (A) and (B);
   b) agglomerating a mixture of (A) and (B) wherein said (A) and (B) are present in a weight ratio of from 0.25:1 to 99:1;
   c) subjecting the resultant agglomerated product to oxidation conditions to cause the chromium atoms to have a higher valence state than said atoms in the chromium compound and causing the chromium atoms to be immobilized to Component (A) or Component (B) or both to provide a chromium immobilized support-agglomerate;
   d) contacting in a liquid hydrocarbon, the chromium immobilized support-agglomerate with a pre-catalyst comprising a pre-catalyst selected from at least one non-metallocene, non-constrained geometry compound selected from bidentate transition metal compound, tridentate transition metal compound or mixtures thereof, wherein the transition metal is at least one member selected from Groups 3 to 10 of the Periodic Table to cause said pre-catalyst to be bound to said chromium support-agglomerate.

27. The catalyst prepared according to claim 26 wherein support-agglomerate comprising a composite of (A) at least one inorganic oxide component selected from $SiO_2$, $Al_2O_3$, MgO, $AlPO_4$, $TiO_2$, $ZrO_2$, $Cr_2O_3$, $SiO_2.Al_2O_3$, $MgO.SiO_2$, $MgO.SiO_2.Al_2O_3$, $SiO_2.TiO_2$ $SiO_2.TiO_2.Al_2O_3$, $SiO_2.Cr_2O_3.Al_2O_3$ and $SiO_2.Cr_2O_3.TiO_2$, and mixtures thereof and (B) at least one ion containing layered material having interspaces between the layers, said layered material having a cationic component and an anionic component, wherein said cationic component is present within the interspace of the layered material, said layered material being intimately dispersed with said inorganic oxide component of the support-agglomerate; and (C) chromium atoms covalently bonded to oxygen atoms of components (A), (B) or both; wherein the amount of the pre-catalyst and support-agglomerate provides a ratio of micromoles of pre-catalyst to grams of support-agglomerate of from about 5:1 to about 500:1.

28. The catalyst system of claim 27 prepared by the additional step of including at least one organometallic compound in the liquid hydrocarbon of step d), said organometallic compound being represented by the structure formula:

wherein M represents at least one element of Groups 1, 2, or 13 of the Periodic Table, tin or zinc, and each R independently represents at least one of hydrogen, halogen, or hydrocarbon-based group, and "s" is a number corresponding to the oxidation number, x, of M, said organometallic compound being present in an amount sufficient to provide a molar ratio of organometallic compound to pre-catalyst of from about 0.001:1 to about 250:1.

29. The catalyst system of claim 27 wherein the transition metal compound is a bidentate ligand containing transition metal compound represented by the formula:

I wherein:
   (I) each A independently represents oxygen, sulfur, phosphorus or nitrogen;
   (II) Z represents a transition metal selected from at least one of the group of Fe, Ce, Ni, Ru, Rh, Pd, Os, Ir and Pt in the +2 oxidation state, and Ti, V, Cr, Mn, Zr, and Hf in the +2, +3 or +4 oxidation state;
   (III) each L and L' independently represents a ligand group selected from at least one of hydrogen, halogen, and hydrocarbon based radical, or two L groups together represent a hydrocarbon based radical which, together with Z, constitute a heterocyclic ring structure; and
   (IV) "a" is an integer of 0 or 1 and represents the number of L' groups bound to Z to provide a neutral compound; and
   (V) the lines joining each A to each other A represent a hydrocarbon based radical joined to A by a double or single bond, and the lines joining each A to Z represent a covalent or dative bond.

30. The catalyst system of claim 27 wherein the transition metal compound is a tridentate ligand containing transition metal compound represented by the formula:

II wherein:
   (I) each A independently represents oxygen, sulfur, phosphorous or nitrogen;
   (II) Z represents a transition metal selected from at least one member of the group of Fe, Co, Ni, Ru, Rh, Pd, Os, Ir and Pt in the +2 oxidation state and Ti, V, Cr, Mn, Zr, and Hf in the +2, +3 or +4 oxidation state;
   (III) each L and L' independently represents a ligand group selected from at least one of hydrogen, halogen, and hydrocarbon based radical, or two L groups together represent a hydrocarbon based radical which, together with Z, constitute a heterocyclic ring structure; and (IV) "a" is an integer of 0, 1 or 2 and represents the number of L' groups bound to Z to provide a neutral compound; and (V) the lines joining each A to each other A represent a hydrocarbon based radical joined to A by a double or single bond, and the lines joining each A to Z represent a covalent or dative bond.

31. The catalyst system of claim 29 or 30 wherein each A represents nitrogen, each L and L' is independently halogen, hydrocarbyl, or mixtures thereof, or two L groups together represent a hydrocarbylene group which, together with Z, constitute a 3 to 7 member heterocyclic ring structure.

32. The catalyst system of claim 28 wherein M is aluminum, "s" is 3, and $R^{12}$ is $C_1$ to $C_{24}$ alkyl, and each L of the pre-catalyst is selected from halogen.

33. The catalyst composition of claim 29 or 30 wherein at least one L of the pre-catalyst is hydrocarbyl.

34. The catalyst system of claim 29 or 30 wherein Z is selected from at least one of Ni, Pd, Fe, or Co.

35. The catalyst system of claim 29 or 30 wherein Z is selected from Ni or Pd and each L is independently selected from chlorine, bromine, iodine, and $C_1$–$C_8$ alkyl.

36. The catalyst system of claim 29 or 30 wherein Z is selected from iron and cobalt and each L is independently selected from chlorine, bromine, iodine, and $C_1$–$C_8$ alkyl.

37. The catalyst system of claim 28 wherein M is aluminum, R is alkyl or alkoxy, "x" is 3, Z is selected from at least one of Ni and Pd, and L is halogen.

38. The catalyst system of claim 28 wherein M is aluminum, R is alkyl or alkoxy, "x" is 3, Z is selected from at least one of Fe or Co, and L is halogen.

39. The catalyst system of claim 27 wherein the layered material is a smectite clay, the weight ratio of inorganic oxide to clay in the support-agglomerate is from about 0.25:1 to about 99:1, and the ratio of micromoles of pre-catalyst to grams of support-agglomerate is from about 10:1 to about 250:1.

40. The catalyst system of claim 39 wherein the smectite clay is selected from montmorillonite or hectorite or mixtures thereof, the weight ratio of inorganic oxide to clay in the support-agglomerate agglomerate is from about 0.5:1 to about 20:1, and the ratio of micromoles of pre-catalyst to grams of support-agglomerate is from about 30:1 to about 100:1.

41. The catalyst system of claim 27 wherein the inorganic oxide component comprises $SiO_2$, the weight ration of $SiO_2$ to layered material in the support-agglomerate is from about 0.1:1 to about 10:1, and the ratio of micromoles of pre-catalyst to grams of support-agglomerate is from about 80:1 to about 100:1.

42. The catalyst system of claim 29 or 30 wherein the support-agglomerate comprises spray dried agglomerate particles comprising constituent particles of at least one of said inorganic oxides and at least one of said layered materials wherein:

(VI) at least 80% of the volume of the agglomerated particles smaller than $D_{90}$ of the entire agglomerate particle size distribution possesses a microspheroidal morphology;

(VII) the support-agglomerate particles possess:
(A) an average particle size of from about 4 to about 250 microns, and
(B) a surface area of from 20 to about 800 m²/gm;

(VIII) the constituent inorganic oxide particles from which the agglomerate particles are derived have an average particle size, prior to spray drying, of from about 2 to about 10 microns, and the constituent layered material particles have an average particle size, prior to spray drying, of from about 0.01 to about 50 microns.

* * * * *